United States Patent
Hayakawa et al.

(10) Patent No.: US 9,591,274 B2
(45) Date of Patent: Mar. 7, 2017

(54) THREE-DIMENSIONAL OBJECT DETECTION DEVICE, AND THREE-DIMENSIONAL OBJECT DETECTION METHOD

(71) Applicants: Nissan Motor Co., Ltd., Yokohama-shi, Kanagawa (JP); Clarion Co., Ltd., Saitama-shi, Saitama (JP)

(72) Inventors: Yasuhisa Hayakawa, Yokohama (JP); Osamu Fukata, Commerce Township, MI (US); Masayuki Takemura, Hitachi (JP); Akira Utagawa, Hitachinaka (JP); Shoji Muramatsu, Hitachi (JP); Kota Irie, Sagamihara (JP)

(73) Assignees: Nissan Motor Co., Ltd., Yokohama (JP); Clarion Co., Ltd., Saitama (JP)

( * ) Notice: Subject to any disclaimer, the term of this patent is extended or adjusted under 35 U.S.C. 154(b) by 293 days.

(21) Appl. No.: 14/410,760

(22) PCT Filed: Jul. 26, 2013

(86) PCT No.: PCT/JP2013/070309
§ 371 (c)(1),
(2) Date: Dec. 23, 2014

(87) PCT Pub. No.: WO2014/017625
PCT Pub. Date: Jan. 30, 2014

(65) Prior Publication Data
US 2015/0195496 A1  Jul. 9, 2015

(30) Foreign Application Priority Data

Jul. 27, 2012 (JP) .................................. 2012-166528
Jul. 27, 2012 (JP) .................................. 2012-166529

(51) Int. Cl.
H04N 7/18 (2006.01)
G06K 9/00 (2006.01)
(Continued)

(52) U.S. Cl.
CPC ............... H04N 7/188 (2013.01); B60R 1/00 (2013.01); G06K 9/00201 (2013.01);
(Continued)

(58) Field of Classification Search
CPC .. H04N 7/188; H04N 2101/00; G06T 7/0042; G06T 7/0085; G06K 9/00201; G06K 9/00805; B60R 1/00
(Continued)

(56) References Cited

U.S. PATENT DOCUMENTS

2004/0016870 A1* 1/2004 Pawlicki ................ H04N 5/247
250/208.1

FOREIGN PATENT DOCUMENTS

| JP | 2008-219063 A | 9/2008 |
| JP | 2009-37284 A | 2/2009 |
| JP | 2006-311216 A | 11/2009 |

* cited by examiner

*Primary Examiner* — Hee-Yong Kim
(74) *Attorney, Agent, or Firm* — Global IP Counselors, LLP

(57) ABSTRACT

A three-dimensional object detection device has an image capturing unit, an object detection unit, first and second edge intensity calculation units, a day/night assessment unit and a controller. The day/night assessment unit assess whether it is currently daytime or nighttime when detecting a three-dimensional object based on the captured images. Upon assesses it is daytime, edges of a subject are extracted from a first edge extraction area, including a horizon reference area, and a threshold value for detecting the three-dimensional object is set based on the intensity of the edges in the first edge extraction area. Upon assesses it is nighttime, the
(Continued)

edges of a subject are extracted from a second edge extraction area, including a road edge reference area, and a threshold value for detecting the three-dimensional object is set based on the intensity of the edges that are extracted from the second edge extraction area.

22 Claims, 31 Drawing Sheets

(51) Int. Cl.
  *B60R 1/00*    (2006.01)
  *G06T 7/00*    (2006.01)
  *H04N 5/232*   (2006.01)
  *H04N 5/217*   (2011.01)
  *H04N 101/00*  (2006.01)
  *G06K 9/20*   (2006.01)
  *G06K 9/46*   (2006.01)

(52) U.S. Cl.
  CPC .......... *G06T 7/0042* (2013.01); *G06T 7/0083* (2013.01); *G06T 7/0085* (2013.01); *H04N 5/217* (2013.01); *H04N 5/232* (2013.01); *B60R 2300/607* (2013.01); *B60R 2300/8026* (2013.01); *G03B 2217/005* (2013.01); *G06K 9/00805* (2013.01); *G06K 9/2027* (2013.01); *G06K 9/4604* (2013.01); *G06T 2207/10028* (2013.01); *G06T 2207/20148* (2013.01); *G06T 2207/30261* (2013.01); *H04N 2101/00* (2013.01)

(58) Field of Classification Search
  USPC .......................................... 348/118; 382/103
  See application file for complete search history.

THREE-DIMENSIONAL OBJECT DETECTION DEVICE, AND THREE-DIMENSIONAL OBJECT DETECTION METHOD

CROSS-REFERENCE TO RELATED APPLICATIONS

This application is a U.S. National stage application of International Application No. PCT/JP2013/070309, filed Jul. 26, 2013, which claims priority to Japanese Patent Application No. 2012-166528 filed in Japan on Jul. 27, 2012 and Japanese Patent Application No. 2012-166529 filed in Japan on Jul. 27, 2012.

BACKGROUND

Field of the Invention

The present invention relates to a three-dimensional object detection device and a three-dimensional object detection method.

Background Information

In a conventionally known technique, a three-dimensional object near a host vehicle is detected based on a captured image captured by a camera (see Japanese Laid-Open Patent Application No. 2006-311216).

SUMMARY

When detecting a three-dimensional object near a host vehicle based on a captured image captured by a camera and foreign matter, such as a water stain, is adhered to the camera lens, clouding the lens (a white thin film has formed on the lens surface), there are cases in which a part of the light flux from a subject will be blocked or irregularly reflected when the light environment differ between daytime and night, and the image of the subject that is captured by the camera becomes blurred; as a result, a three-dimensional object could not be appropriately detected.

The problem to be solved by the present invention is to provide a three-dimensional object detection device that is capable of appropriately detecting a three-dimensional object, even when the lens is clouded.

In this invention, a three-dimensional object detection device, which detects a three-dimensional object based on a captured image, extracts the edges of a subject in a first edge extraction area, including a horizon reference area that references the horizon, and calculates the intensity of the edges based on the distribution of the edges extracted from the first edge extraction area as a first edge intensity; the three-dimensional object detection device then extracts the edges of a subject in a second edge extraction area, including a road edge reference area that references the road edge, and calculates the intensity of the edges based on the distribution of the edges extracted from the second edge extraction area as a second edge intensity. The three-dimensional object detection device then controls the detection of a three-dimensional object based on the first edge intensity in the first edge extraction area during the daytime while controlling the detection of a three-dimensional object based on the second edge intensity in the second edge extraction area when an assessment has been made that nighttime has fallen, thereby solving the problem.

According to the present invention, by extracting the edges from a first edge extraction area from which the extraction of a predetermined quantity of edges are expected during the daytime or by extracting the edges from a second edge extraction area from which the extraction of a predetermined quantity of edges are expected during the nighttime, and then calculating the intensity of the edges, appropriately determining whether or not the lens is clouded according to the surrounding light environment based on the intensity of the edges is possible. Then, by controlling the detection of a three-dimensional object based on the intensity of the edges, appropriately detecting a three-dimensional object even when the lens is clouded is possible.

BRIEF DESCRIPTION OF THE DRAWINGS

Referring now to the attached drawings which form a part of this original disclosure.

DETAILED DESCRIPTION OF THE EMBODIMENTS

Embodiment 1

Figure 1:
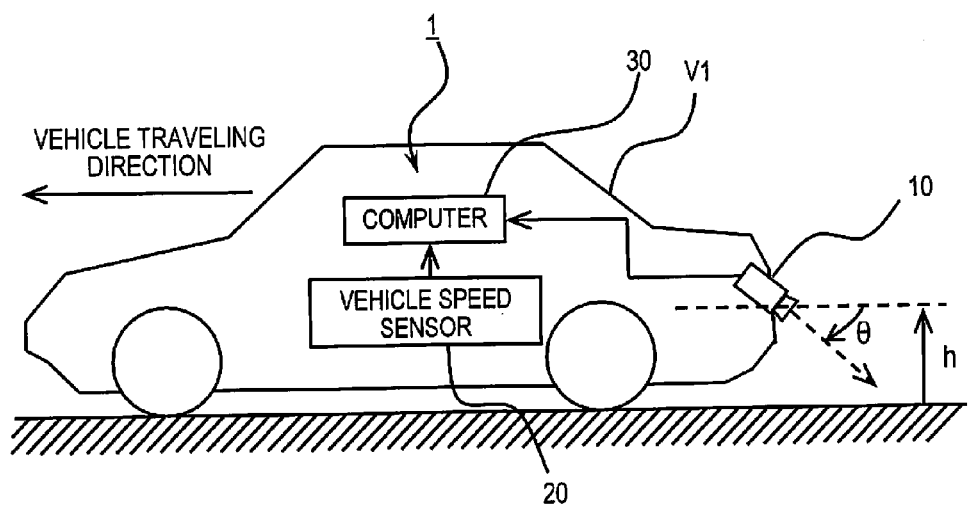
FIG. 1 is a schematic overview of a vehicle equipped with a three-dimensional object detection device.

FIG. 1 is a schematic overview of a vehicle equipped with a three-dimensional object detection device 1 according to the present embodiment. An objective of the three-dimensional object detection device 1 according to the present embodiment is to detect another vehicle (which may hereinafter be referred to as adjacent vehicle V2) present in an adjacent lane where contact is possible should a host vehicle V1 change lanes. The three-dimensional object detection device 1 according to the present embodiment is provided with a camera 10, a vehicle speed sensor 20, and a computer 30, as illustrated in FIG. 1.

The camera 10 is attached to the host vehicle V1 so that the optical axis is an angle θ downward from the horizontal axis in a location at a height h at the rear of the host vehicle V1, as illustrated in FIG. 1. From this position, the camera 10 captures a predetermined area of the surrounding environment of the host vehicle V1. The vehicle speed sensor 20 detects the driving speed of the host vehicle V1 and calculates the vehicle speed from a wheel speed detected by, for example, a wheel speed sensor for detecting the rotational speed of a wheel. The computer 30 detects when an adjacent vehicle is present in an adjacent lane rearward of the host vehicle.

Figure 2:
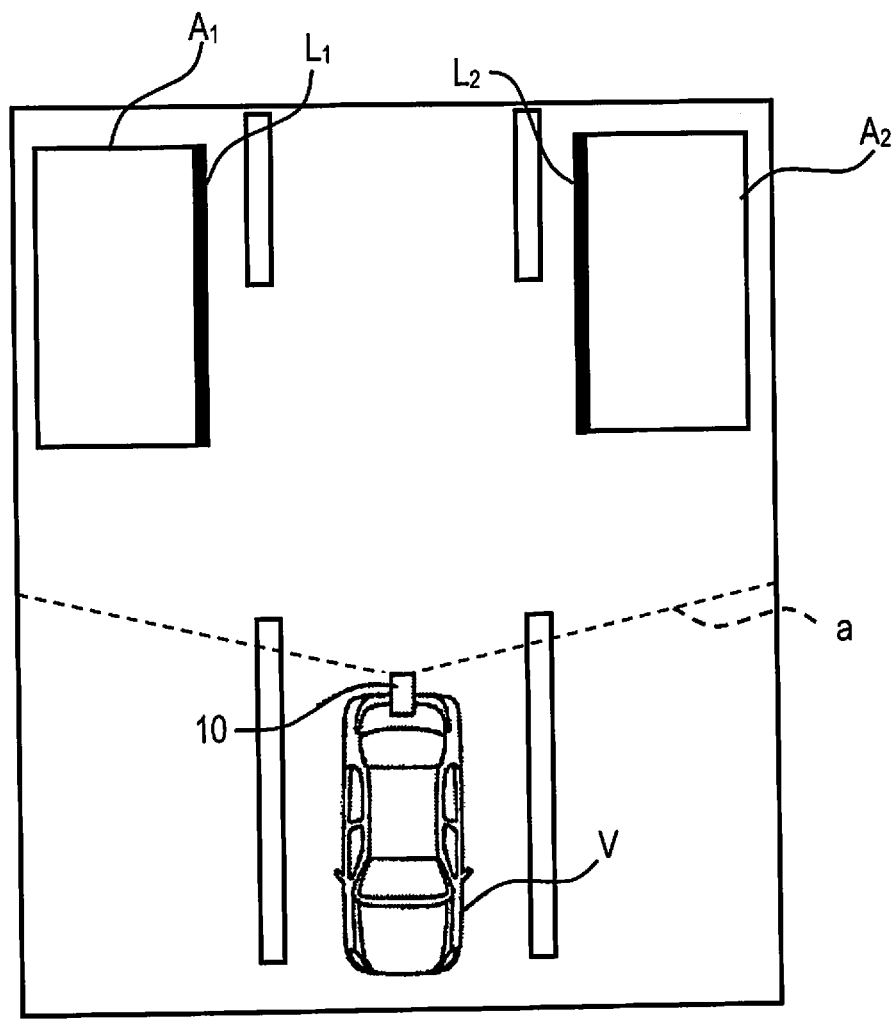
FIG. 2 is a plan view illustrating the driving state of the vehicle in FIG. 1.

FIG. 2 is a plan view illustrating the driving state of the host vehicle V1 in FIG. 1. As illustrated in the drawing, the camera 10 captures the rear side of the vehicle at a predetermined view angle a. At this time, the view angle a of the camera 10 is set to a view angle that allows the left and right lanes (the adjacent lanes) to be captured in addition to the lane in which the host vehicle V1 is driving.

Figure 3:
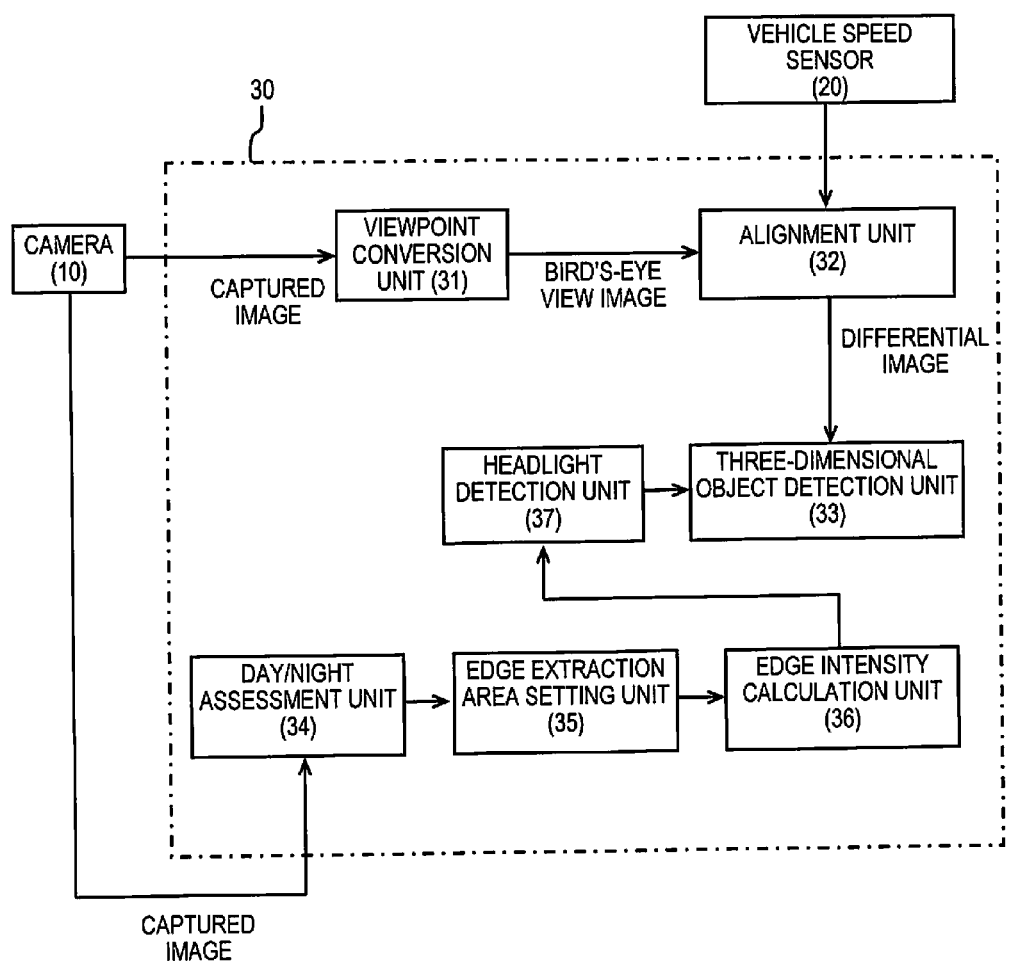
FIG. 3 is a block view illustrating the details of a computer according to the first embodiment.

FIG. 3 is a block view illustrating the details of the computer 30 according to the first embodiment. The camera 10 and the vehicle speed sensor 20 are also illustrated in FIG. 3 in order to distinctly indicate the connection relationships.

As illustrated in FIG. 3, the computer 30 is provided with a viewpoint conversion unit 31, an alignment unit 32, a three-dimensional object detection unit 33, a day/night assessment unit 34, an edge extraction area setting unit 35, an edge intensity calculation unit 36, and a threshold value changing unit 37. The configurations of these units are described below.

Captured image data of the predetermined area obtained by the camera 10 is input into the viewpoint conversion unit 31, and the captured image data thus input is converted into bird's-eye view image data, which is a bird's-eye view state. A bird's-eye view state is a state of viewing from a viewpoint of an imaginary camera that is looking down from above, in particular, vertically downward. Viewpoint conversion can be carried out in the manner described in, for example, Japanese Laid-Open Patent Application No. 2008-219063. The reason that captured image data is converted into bird's-eye view image data is based on the principle that perpendicular edges unique to a three-dimensional object are converted into a straight-line group that passes through a specific fixed point by viewpoint conversion into bird's-eye view image data; utilizing this principle allows a planar object to be differentiated from a three-dimensional object.

Figure 4:
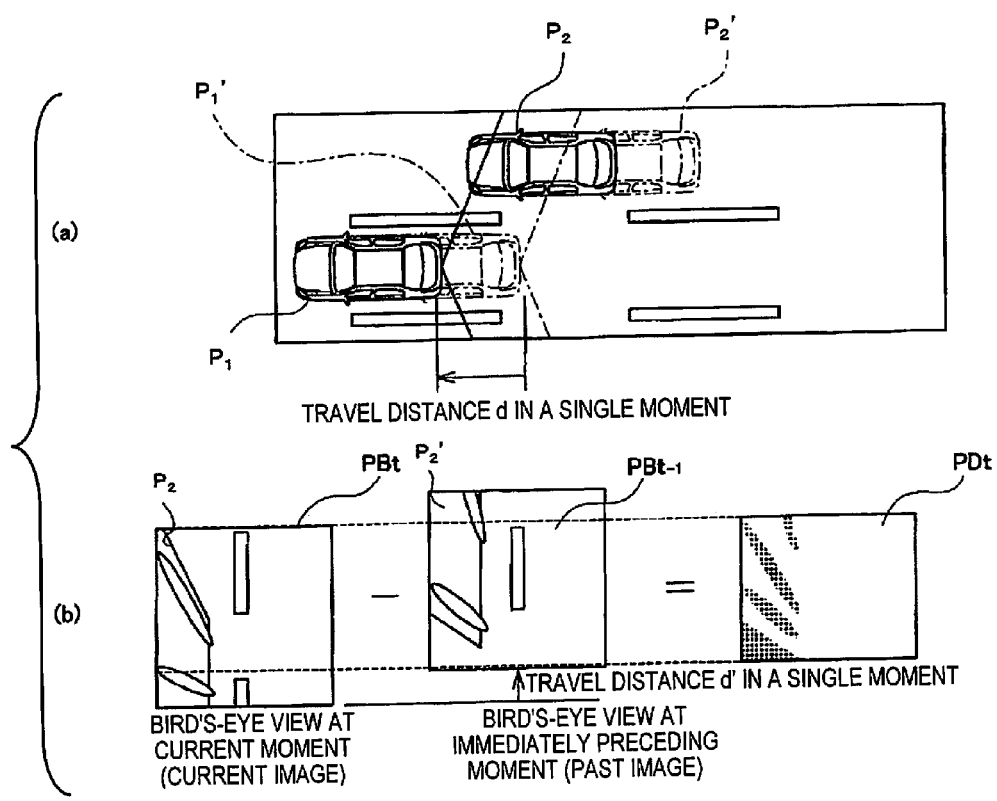
FIG. 4 is a view showing the general overview of the processing of the alignment unit, with part (a) of FIG. 4 being a plan view illustrating the moving state of the vehicle, and part (b) of FIG. 4 being an image illustrating a general overview of the alignment.

The bird's-eye view image data obtained by viewpoint conversion carried out by the viewpoint conversion unit 31 is sequentially input into the alignment unit 32, and the input positions of the bird's-eye view image data at different times are aligned. FIG. 4 is a view showing the general overview of the processing of the alignment unit 32. Part (a) of FIG. 4 is a plan view illustrating the moving state of the host vehicle V1, and part (b) of FIG. 4 is an image illustrating a general overview of the alignment.

As illustrated in part (a) of FIG. 4, the host vehicle V1 at the current moment is positioned at $P_1$, and the host vehicle V1 at a single moment prior is positioned at $P_1'$. An assumption is made that an adjacent vehicle V2 is positioned at the rear of the host vehicle V1 and is driving parallel to the host vehicle V1; additionally, an assumption is made that the adjacent vehicle V2 at the current moment is positioned at $P_2$ and that the adjacent vehicle V2 at a single moment prior is positioned at $P_2'$. Also, an assumption is made that the host vehicle V1 has moved a distance d in a single moment. The phrase "at a single moment prior" may be a moment in the past at a time set in advance (for example, a single control cycle) from the current moment, or this may be a moment in the past at an arbitrary time.

In such a state, a bird's-eye view image $PB_t$ at the current moment is illustrated in part (b) of FIG. 4. The white lines drawn on the road surface are rectangular in this bird's-eye view image $PB_t$ and are relatively accurate in a planar view, but the adjacent vehicle V2 (position $P_2$) is collapsed. The same applies to the bird's-eye view image $PB_{t-1}$ at a single moment prior; the white lines drawn on the road surface are rectangular and are relatively accurate in a planar view, but the adjacent vehicle V2 (position $P_2'$) is collapsed. As previously described, the perpendicular edges of a three-dimensional object (the edges that stand erect in three-dimensional space from the road surface are also included in a strict meaning of a perpendicular edge) appear as a straight-line group along a collapsing direction due to the operation for converting the viewpoint into bird's-eye view image data; however, because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this is carried out, the alignment unit 32 offsets the bird's-eye view image $PB_{t-1}$ at a single moment prior and matches the position with the bird's-eye view image $PB_t$ at the current moment. The left-side image and the center image in part (b) of FIG. 4 illustrate the offset state by a travel distance d'. The offset amount d' is the amount of movement in the bird's-eye view image data that corresponds to the actual travel distance d of the host vehicle V1 illustrated in part (a) of FIG. 4 and is determined based on a signal from the vehicle speed sensor 20 and the time from a single moment prior to the current moment.

The alignment unit 32 in the present embodiment aligns in a bird's-eye view the positions of the bird's-eye view images obtained at different times and obtains the aligned bird's-eye view images; however, the "alignment" process may precisely be carried out corresponding to the type of objects to be detected or to the required precision for detection. For example, the operation may be a strict alignment process in which alignment is conducted based on the same time and the same position or based on a loose alignment in which the coordinates of each bird's-eye view image are grasped.

After alignment, the alignment unit 32 obtains the difference between the bird's-eye view images $PB_t$ and $PB_{t-1}$ and generates differential image $PD_1$ data. In the present embodiment, the alignment unit 32 takes the absolute value of the difference in the pixel values of the bird's-eye view images $PB_t$ and PBt−1 in order correspond to the variation in the illumination environment; when the absolute value is equal to or greater than a predetermined threshold value th, the pixel values of the differential image $PD_t$ are set to "1;" and when the absolute value is less than a predetermined threshold value th, the pixel values of the differential image $PD_t$ are set to "0," which allows differential image $PD_t$ data, such as that illustrated on the right side of part (b) of FIG. 4, to be generated. In the present embodiment, the value of the difference threshold value th is changed by the threshold value changing unit 37 mentioned below; when the difference threshold value th is changed by the threshold value changing unit 37, the pixel values of the differential image $PD_t$ are detected using the difference threshold value th that is changed by the threshold value changing unit 37.

The three-dimensional object detection unit 33 then detects a differential waveform based on the differential image $PD_t$ data illustrated in part (b) of FIG. 4. In this case, the three-dimensional object detection unit 33 calculates the travel distance of the three-dimensional object in real space. The three-dimensional object detection unit 33 first generates a first differential waveform when the three-dimensional object is detected and the travel distance is to be calculated.

In generating the differential waveform, the three-dimensional object detection unit 33 sets a detection area (a detection frame) in the differential image $PD_t$. An objective of the three-dimensional object detection device 1 of the present example is to calculate the travel distance for the adjacent vehicle with which there is a possibility of contact should the host vehicle V1 change lanes. Accordingly, in the present example, rectangular detection areas (the detection frames) A1, A2 are set behind the host vehicle V1, as illustrated in FIG. 2. Such detection areas A1, A2 may be set from a relative position to the host vehicle V1, or they may be set based on the position of the white lines. When set based on the position of the white lines, the three-dimensional object detection device 1 may use, for example, what is known as white line recognition techniques.

The three-dimensional object detection unit 33 recognizes as ground lines L1, L2 the borders of the detection areas A1, A2 thus set on the host vehicle V1 side (the side along the traveling direction), as illustrated in FIG. 2. Generally, a ground line refers to a line in which a three-dimensional object is in contact with the ground; however, in the present embodiment, a ground line is not a line in contact with the ground but is rather set in the manner described above. Even in such a case, the difference between the ground line according to the present embodiment and a normal ground line that is determined from the position of the adjacent vehicle V2 is not exceedingly great as determined by experience, and there is no problem in actuality.

Figure 5:
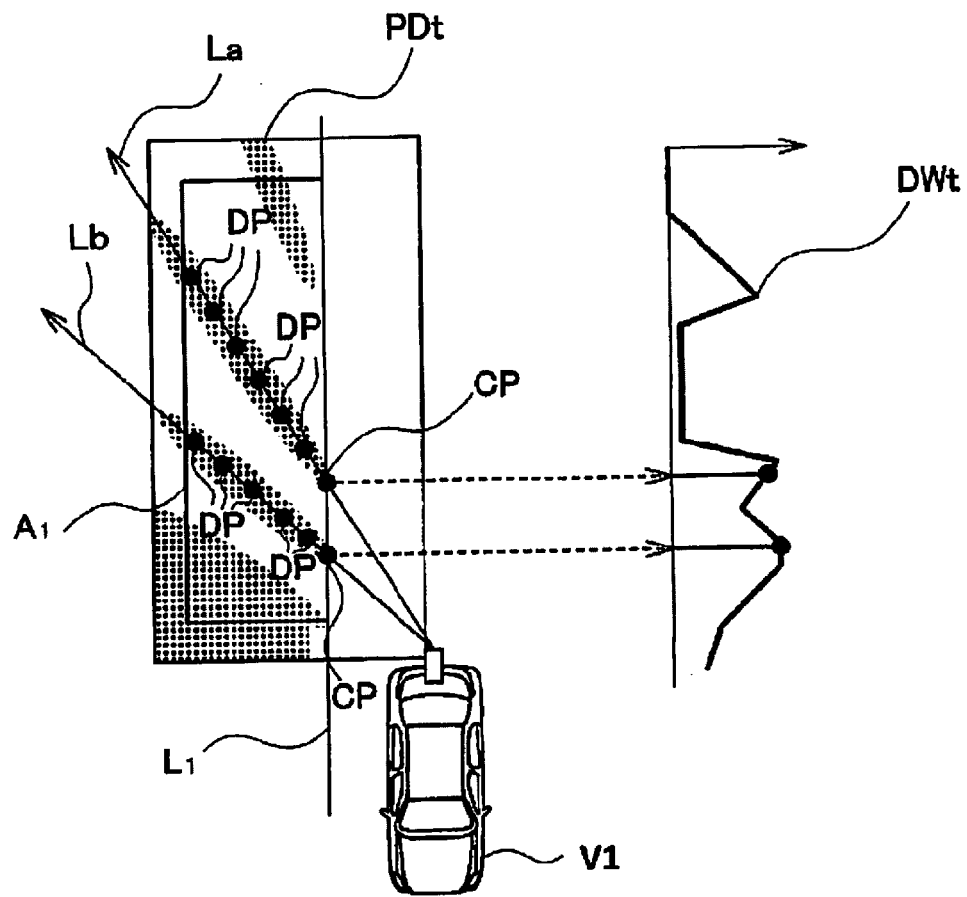
FIG. 5 is a schematic view illustrating the manner in which a differential waveform is generated by the three-dimensional object detection unit.

FIG. 5 is a schematic view illustrating the manner in which a differential waveform is generated by the three-dimensional object detection unit 33. As illustrated in FIG. 5, the three-dimensional object detection unit 33 generates a differential waveform $DW_t$ from the portion that corresponds to the detection areas A1, A2 in the differential image $PD_t$ (the drawing on the right in part (b) of FIG. 4) calculated by the alignment unit 32. In this case, the three-dimensional object detection unit 33 generates the differential waveform $DW_t$ along the collapsing direction of the three-dimensional object by viewpoint conversion. In the example illustrated in FIG. 5, only the detection area A1 will be described for the sake of convenience, but the differential waveform DWt is also generated for the detection area A2 using the same procedure.

More specifically, first, the three-dimensional object detection unit 33 defines a line La in the direction in which the three-dimensional object collapses in the differential image $PD_t$ data. The three-dimensional object detection unit 33 then counts the number of difference pixels DP indicating a predetermined difference on the line La. In the present embodiment, the difference pixels DP indicating a predetermined difference have pixel values in the differential image $PD_t$ that are represented by "0" and "1," with the pixels indicated by a "1" being counted as difference pixels DP.

The three-dimensional object detection unit 33 counts the number of difference pixels DP and then determines the crossing point CP of the line La and the ground line L1. The three-dimensional object detection unit 33 then correlates the crossing point CP and the count number; decides the horizontal-axis position, in particular, the position on the axis in the vertical direction in the drawing on the right in FIG. 5, based on the position of the crossing point CP; decides the vertical-axis position, in particular, the position on the axis in the lateral direction in the drawing on the right in FIG. 5, from the count number; and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution, thereby generating a differential waveform $DW_t$ as illustrated in the drawing on the right in FIG. 5.

Here, the difference pixels PD in the differential image $PD_t$ data are pixels that have changed in the image at different moments; in other words, they are locations that can be construed to be where a three-dimensional object was present. Accordingly, in locations where a three-dimensional object was present, the number of pixels is counted along the direction in which the three-dimensional object collapses to form a frequency distribution, thereby generating a differential waveform $DW_t$. In particular, the number of pixels is counted along the direction in which the three-dimensional object collapses, and a differential waveform $DW_t$ is therefore generated from information about the height direction in relation to the three-dimensional object.

The lines La and Lb in the direction in which the three-dimensional object collapses have different distances that overlap the detection area A1, as illustrated in the drawing on the left in FIG. 5. Accordingly, the number of difference pixels DP is greater on the line La than on the line Lb when an assumption is made that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is determined from the count number of the difference pixels DP. In a specific example, there are six difference pixels DP on the line La, and there are five difference pixels DP on the line Lb in the drawing on the left in FIG. 5. Accordingly, when the vertical-axis position is determined from the count number in FIG. 5, the three-dimensional object detection unit 33 divides the count number by the overlapping distance or performs normalization in another manner. The values of the differential waveform $DW_t$ that correspond to the lines La, Lb in the direction in which the three-dimensional object collapses are thereby made to be substantially the same, as illustrated in the differential waveform $DW_t$.

Figure 6:
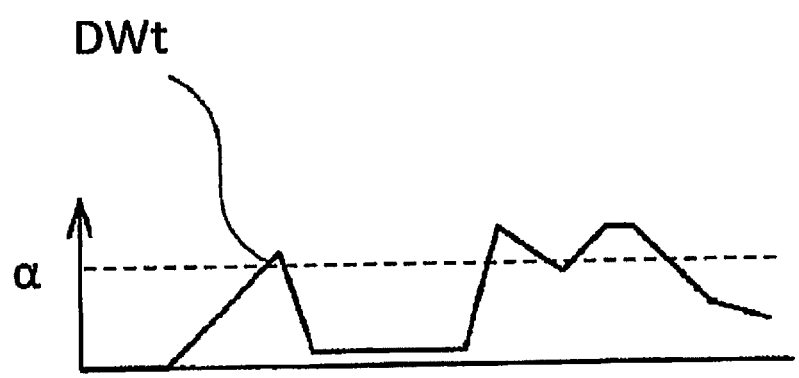
FIG. 6 is a view illustrating an example of the threshold value α for detecting a differential waveform and a three-dimensional object.

After the differential waveform $DW_t$ has been generated, the three-dimensional object detection unit 33 detects an adjacent vehicle that is present in the adjacent lane based on the generated differential waveform $DW_t$. FIG. 6 is a view showing the method for detecting a three-dimensional object by the three-dimensional object detection unit 33 and shows an example of the threshold value α for detecting a differential waveform $DW_t$ and a three-dimensional object. The three-dimensional object detection unit 33 determines whether or not a three-dimensional object is present in the detection areas A1, A2 by determining whether the peak of the generated differential waveform $DW_t$ is at a predetermined threshold value α corresponding to the peak position of the differential waveform $DW_t$ or greater, as illustrated in FIG. 6. The three-dimensional object detection unit 33 then determines that a three-dimensional object is not present in the detection areas A1, A2 when the peak of the differential waveform $DW_t$ is less than the predetermined threshold value α; when the peak of the differential waveform $DW_t$ is at a predetermined threshold value α or greater, the determination is that a three-dimensional object is present in the detection areas A1, A2.

The three-dimensional object detection unit 33 calculates the travelling speed of the three-dimensional object by comparing the differential waveform $DW_t$ at the current moment with the differential waveform $DW_{t-1}$ at a single moment prior. In other words, the three-dimensional object detection unit 33 calculates the travelling speed of the three-dimensional object from the change in time of the differential waveforms $DW_t$, $DW_{t-1}$.

Figure 7:
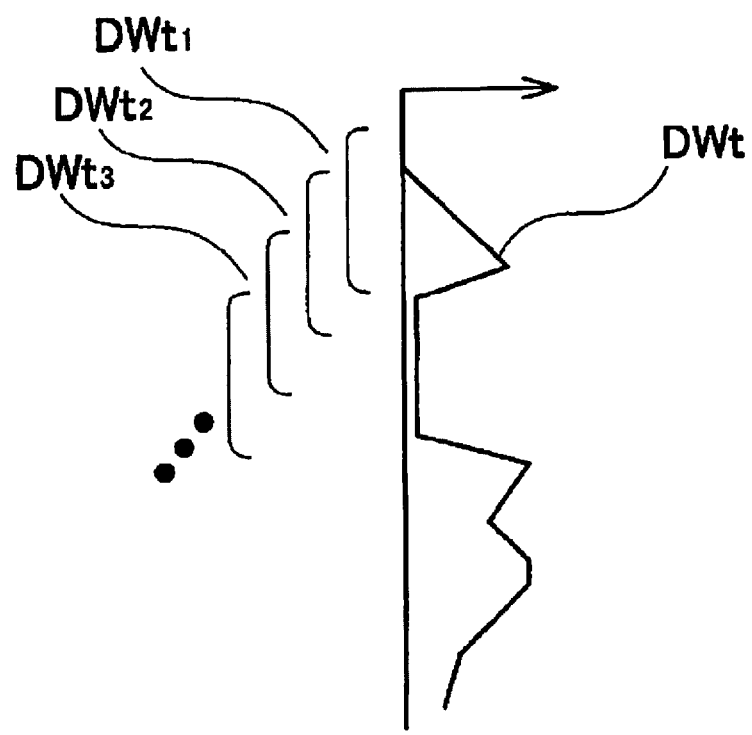
FIG. 7 is a view illustrating the small areas divided by the three-dimensional object detection means.

More specifically, the three-dimensional object detection unit 33 divides the differential waveform $DW_t$ into a plurality of small areas $DWt1$ to $DW_{tn}$ (where n is an arbitrary integer of 2 or greater), as illustrated in FIG. 7. FIG. 7 is a view illustrating the small areas $DWt1$ to $DW_{tn}$ divided by the three-dimensional object detection unit 33. The small areas $DWt1$ to $DW_{tn}$ are divided so as to be mutually overlapping, as illustrated in, for example, FIG. 7. For example, the small area DWt1 and the small area DWt2 overlap each other, and the small area DWt2 and the small area DWt3 overlap each other.

Next, the three-dimensional object detection unit 33 determines the offset amount (the amount of movement in the horizontal-axis direction (the vertical direction in FIG. 7) of the differential waveform) for each of the small areas $DWt1$ to $DW_{tn}$. Here, the offset amount is determined from the difference (the distance in the horizontal-axis direction) between the differential waveform $DWt-1$ at a single moment prior and the differential waveform $DW_t$ at the current moment. In this case, the three-dimensional object detection unit 33 moves the differential waveform $DWt-1$ at a single moment prior in the horizontal-axis direction for each of the small areas $DWt1$ to $DW_{tn}$, thereby assessing the position (the position in the horizontal-axis direction) in which the error from the differential waveform $DW_t$ at the current moment is at a minimum; then, the three-dimensional object detection unit determines as the offset amount the movement amount in the horizontal-axis direction at the position in which the error from the original position of the differential waveform $DWt-1$ is at a minimum. The three-dimensional object detection unit 33 then counts the offset amount determined for each of the small areas $DWt1$ to $DW_{tn}$ and forms a histogram.

Figure 8:
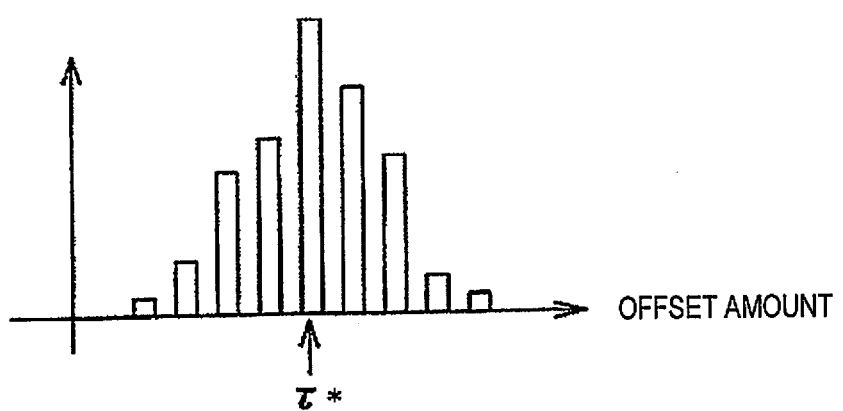
FIG. 8 is a view illustrating an example of a histogram obtained by the three-dimensional object detection unit.

FIG. 8 is a view illustrating an example of the histogram obtained by the three-dimensional object detection unit 33. As illustrated in FIG. 8, some amount of variability occurs in the offset amount, which is the movement amount in which the error between the small areas $DWt1$ to $DW_{tn}$ and the differential waveform $DWt-1$ at a single moment prior is at a minimum. Accordingly, the three-dimensional object detection unit 33 forms the offset amounts including the variability into a histogram and calculates the travel distance from the histogram. At this point, the three-dimensional object detection unit 33 calculates the travel distance of the three-dimensional object (the adjacent vehicle V2) from the maximum value in the histogram. In other words, in the example illustrated in FIG. 8, the three-dimensional object detection unit 33 calculates the offset amount indicating the maximum value of the histogram as the travel distance τ*. In this manner, in the present embodiment, a more highly accurate travel distance can be calculated from the maximum value, even when the offset amount varies. The travel distance τ* is the relative travel distance of the three-dimensional object (the adjacent vehicle V2) in relation to the host vehicle. Accordingly, the three-dimensional object detection unit 33 calculates the absolute travel distance based on the travel distance τ* thus obtained and the vehicle speed sensor 20 when the absolute travel distance is to be calculated.

In this manner, in the present embodiment, the travel distance of the three-dimensional object (the adjacent vehicle V2) is calculated from the offset amount of the differential waveform $DW_t$ when the error in the differential waveform $DW_t$ generated at different moments is at a minimum; this allows the travel distance to be calculated from the offset amount, which is information about one dimension in a waveform, and allows the computation costs to be kept low when the travel distance is calculated. Also, dividing the differential waveform $DW_t$ generated at different moments into a plurality of small areas DWt1 to $DW_m$ allows a plurality of waveforms representing the locations of the three-dimensional object to be obtained, thereby allowing the offset amount at each location of the three-dimensional object to be determined and allowing the travel distance to be determined from a plurality of offset amounts. Therefore, the precision of calculating the travel distance can be improved. In the present embodiment, the travel distance of the three-dimensional object is calculated from the change in time of the differential waveform $DW_t$, which includes the height direction information. Consequently, in contrast to the focus being solely on the movement of a single point, the detection location prior to a change in time and the detection location after a change in time are specified with the height direction information included and accordingly readily end up being the same location; the travel distance is calculated from the change in time at the same location; and the precision for calculating the travel distance can be improved.

Figure 9:
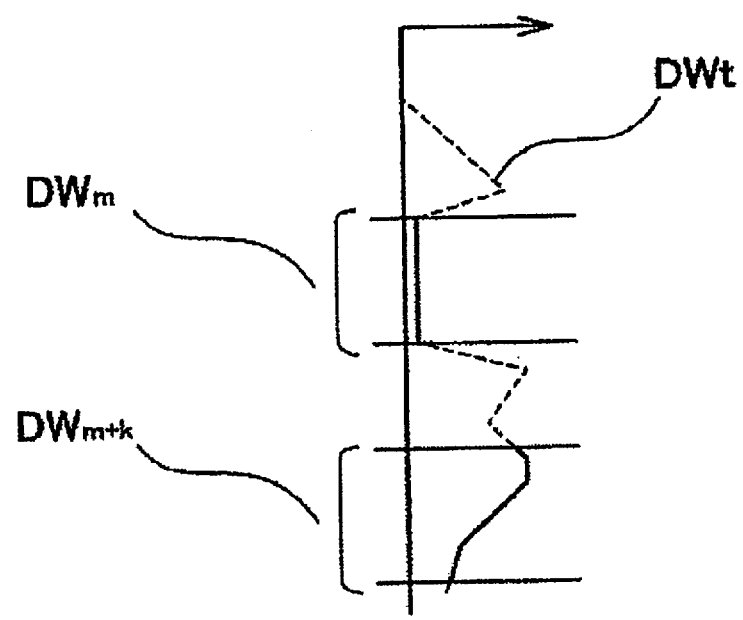
FIG. 9 is a view illustrating the weighting used by the three-dimensional object detection unit.

When a histogram is to be formed, the three-dimensional object detection unit 33 may impart a weighting to the plurality of small areas DWt1 to $DW_m$ and may count the offset amounts determined for each of the small areas DWt1 to DWtn in accordance with the weighting to form a histogram. FIG. 9 is a view illustrating the weighting used by the three-dimensional object detection unit 33.

As illustrated in FIG. 9, a small area $DW_m$ (where m is an integer 1 or greater, and n is −1 or less) is flat. In other words, in the small area $DW_m$, there is little difference between the maximum and minimum values of the count of the number of pixels indicating a predetermined difference. The three-dimensional object detection unit 33 reduces the weighting of this type of small area $DW_m$. This is because the flat small area $DW_m$ lacks a characteristic, and there is a high possibility that an error will be magnified when the offset amount is calculated.

On the other hand, a small area $DW_{m+k}$ (where k is an integer n−m or less) has abundant undulation. In other words, in the small area $DW_m$, there is a considerable difference between the maximum and the minimum values of the count of the number of pixels indicating a predetermined difference. The three-dimensional object detection unit 33 increases the weighting of this type of small area $DW_m$. This is because the small area $DW_{m+k}$ abundant in undulation is characteristic and there is a high possibility that the offset amount will be accurately calculated. Weighting the small areas in this manner facilitates a more precise calculation of the travel distance.

The differential waveform $DW_t$ is divided into a plurality of small areas DWt1 to $DW_{tn}$ in the present embodiment in order to enhance the precision for calculating the travel distance, but a division into the small areas DWt1 to $DW_{tm}$ is not required when the precision for calculating travel distance is not necessary. In this case, the three-dimensional object detection unit 33 calculates the travel distance from the offset amount of the differential waveform $DW_t$ when the error between the differential waveform $DW_t$ and the differential waveform DWt−1 is at a minimum. In other words, the method for determining the offset amount between the differential waveform $DW_{t-1}$ at a single moment prior and the differential waveform $DW_t$ at the current moment is not limited to the details described above.

The three-dimensional object detection unit 33 in the present embodiment determines the travelling speed of the host vehicle V1 (the camera 10) and determines the offset amount for a stationary object from the determined travelling speed. After the offset amount of the stationary object has been determined, the three-dimensional object detection unit 33 ignores the offset amount that corresponds to the stationary object within the maximum value of the histogram and calculates the travel distance of the three-dimensional object.

Figure 10:
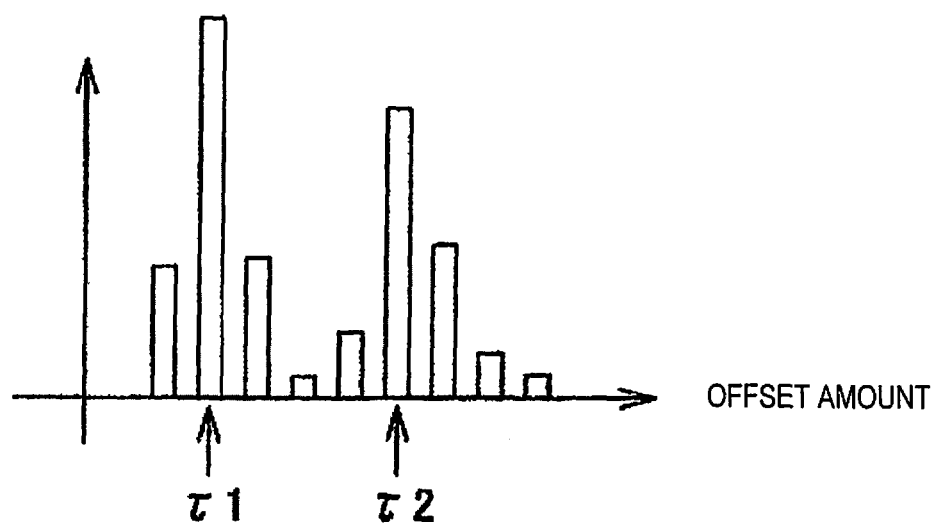
FIG. 10 is a view illustrating another example of the histogram obtained by the three-dimensional object detection unit.

FIG. 10 is a view illustrating another example of the histogram obtained by the three-dimensional object detection unit 33. When a stationary object other than the three-dimensional object is present within the view angle of the camera 10, two maximum values τ1, τ2 appear in the resulting histogram. In this case, one of the two maximum values τ1, τ2 is the offset amount of the stationary object. Consequently, the three-dimensional object detection unit 33 determines the offset amount for the stationary object from the travelling speed, ignores the maximum value that corresponds to the offset amount, and calculates the travel distance of the three-dimensional object using the remaining maximum value. As a result, preventing a situation in which a stationary object reduces the precision for calculating the travel distance of the three-dimensional object is possible.

Even when the offset amount corresponding to the stationary object is ignored, there may be a plurality of three-dimensional objects present within the view angle of the camera 10 when there is a plurality of maximum values. However, a plurality of three-dimensional objects present within the detection areas A1, A2 occurs very rarely. Accordingly, the three-dimensional object detection unit 33 stops calculating the travel distance. In the present embodiment, preventing a situation in which an erroneous travel distance is calculated, such as when there is a plurality of maximum values, is thereby possible.

In this way, in the present embodiment, detecting an adjacent vehicle V2 by detecting a three-dimensional object that is present in the detection areas A1, A2 and determining whether or not the detected three-dimensional object is an adjacent vehicle V2 is possible.

Additionally, the present embodiment is provided with a function to assess whether or not the lens is clouded and change the difference threshold th mentioned above according to the turbidity of the lens in order to appropriately detect a three-dimensional object even when the lens of the camera 10 is clouded (when white thin film has caused by a water stain or the like to form on the lens surface). In order to realize this function, the computer 30 of the present embodiment is provided with a day/night assessment unit 34, an edge extraction area setting unit 35, an edge intensity calculation unit 36, and a threshold value changing unit 37. Each of these configurations is described below.

The day/night assessment unit 34 assesses whether is the present is daytime or nighttime based on a captured image captured by the camera 10. The method for assessing day/night by the day/night assessment unit 34 is not particularly limited; for example, the day/night assessment unit 34 can calculate the average luminance of the entire captured image and determine that the present is daytime when the calculated average luminance is a predetermined value or greater; when the calculated average luminance is less than the predetermined value, the determination is that the present is nighttime. Alternatively, the day/night assessment unit 34 may assess whether the present is day/night based on the time or based on the detection results of a sensor, such as a luminometer.

The edge extraction area setting unit 35 sets an area in the captured image from which a predetermined quantity of edges can be expected to be extracted as the edge extraction area. The edge extraction area setting unit 35 sets a different area as the edge extraction area when an assessment has been made that the present is nighttime by the day/night assessment unit 34, as compared to when an assessment has been made that the present is daytime. The method to set the edge extraction area will be described below referring to the edge extraction area that is set during daytime as the daytime edge extraction area and referring to the edge extraction area set during nighttime as the nighttime edge extraction area.

Figure 11:
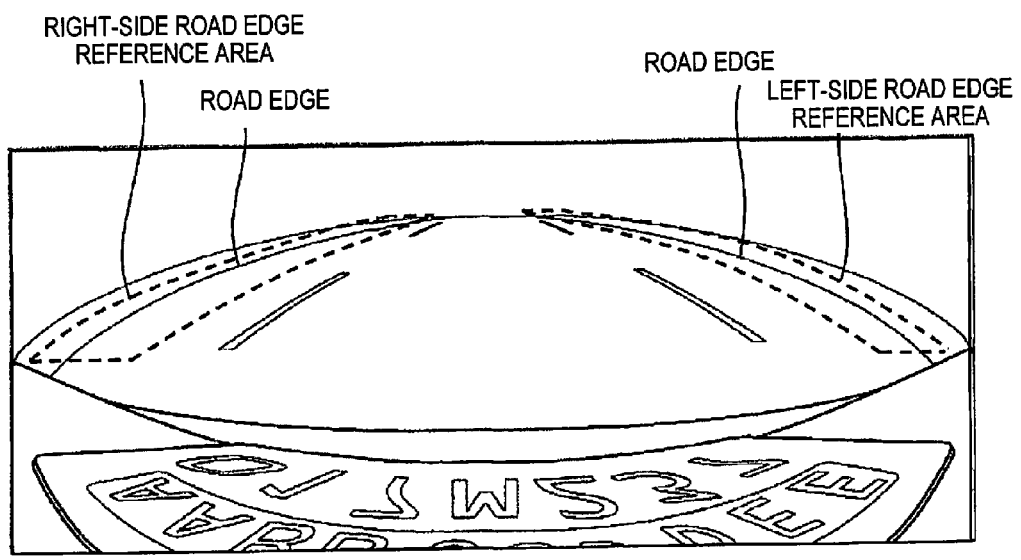
FIG. 11 is a view illustrating an example of a nighttime edge extraction area.

Specifically, the edge extraction area setting unit 35 sets a pair of left and right road edge reference areas (the left-side road edge reference area and the right-side road edge reference area) as the nighttime edge extraction areas when an assessment has been made that the present is nighttime by the day/night assessment unit 34, as illustrated in FIG. 11. This pair of left and right road edge reference areas are areas that respectively include the road edge positioned on the left side and the road edge positioned on the right side of the driving lane of the host vehicle V1; these areas are the areas from which the extraction of a predetermined quantity of edges is expected in the image area corresponding to these road edges.

Figure 12:
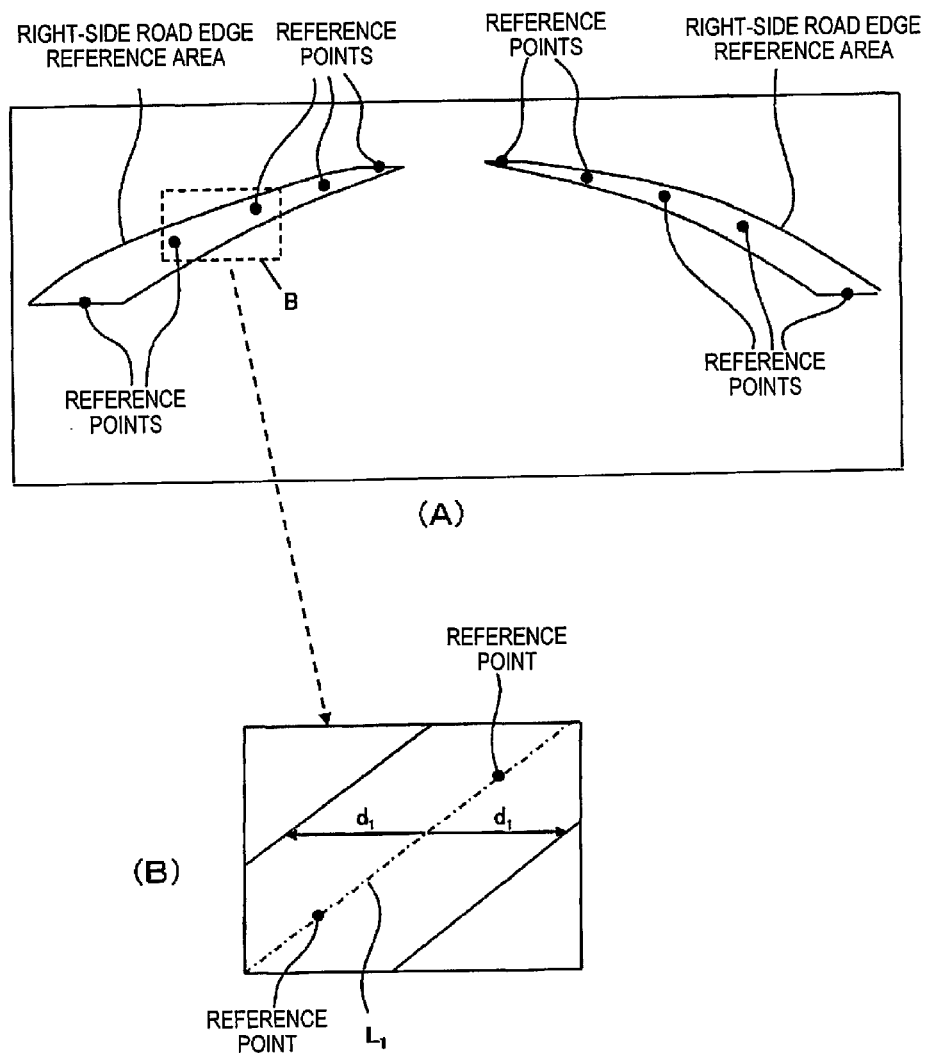
FIG. 12 is a view showing the method for setting the nighttime edge extraction area.

The edge extraction area setting unit 35 stores in a memory (not diagrammed) of the computer 30 a plurality of reference points for setting the pair of left and right road edge reference areas using a world coordinate system having the camera 10 as the origin. The edge extraction area setting unit 35 then acquires the plurality of reference points for setting the road edge reference areas from the memory of the computer 30 and converts the acquired reference points from the world coordinate system into a camera coordinate system. The image (A) of FIG. 12 is a view illustrating the reference points of the road edge reference areas that have been converted into a camera coordinate system. The edge extraction area setting unit 35 sets the areas that are obtained by connecting the reference points that have been converted into the camera coordinate system with a straight line $L_1$ and then by expanding from the straight line $L_1$ to the left and the right directions by a predetermined distance $d_1$, as the left-side road edge reference area and the right-side road edge reference area, respectively, as illustrated in the image (B) of FIG. 12. The image (B) of FIG. 12 is an enlarged view of the B portion in the image (A) of FIG. 12.

Figure 13:
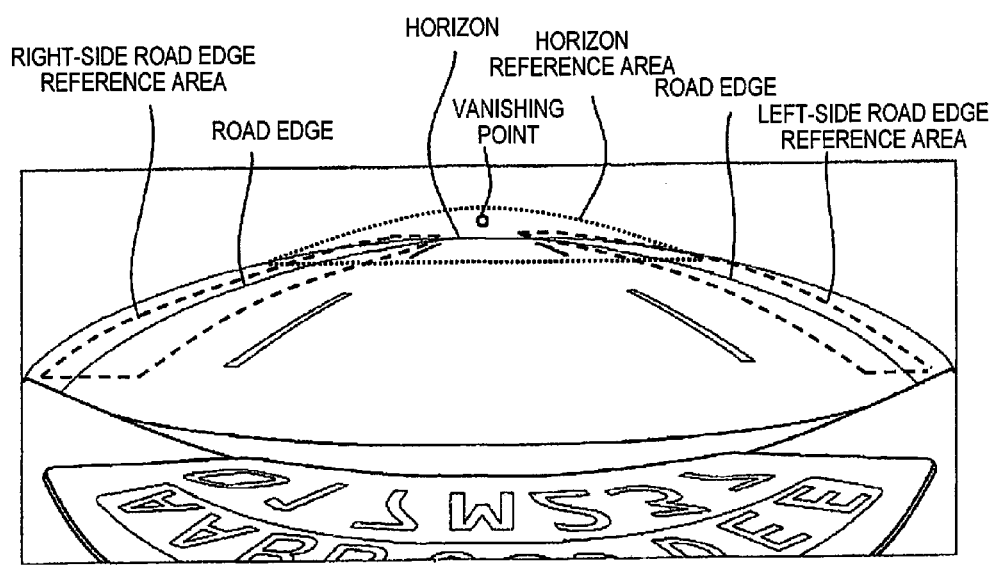
FIG. 13 is a view illustrating an example of a daytime edge extraction area.

When an assessment has been made by the day/night assessment unit 34 that the present is daytime, the edge extraction area setting unit 35 sets, in addition to the pair of left and right road edge reference areas that reference the road edges, a horizon reference area that references the horizon near the vanishing point, as the daytime edge extraction area, as illustrated in FIG. 13. The horizon reference area is an area that includes the horizon, as well as an area from which the extraction of a predetermined quantity of edges is expected in the image area corresponding to the horizon. The pair of left and right road edge reference areas in the daytime edge extraction area can be set in the same way as the pair of left and right road edge reference areas in the nighttime edge extraction area; therefore, the description thereof has been omitted.

Figure 14:
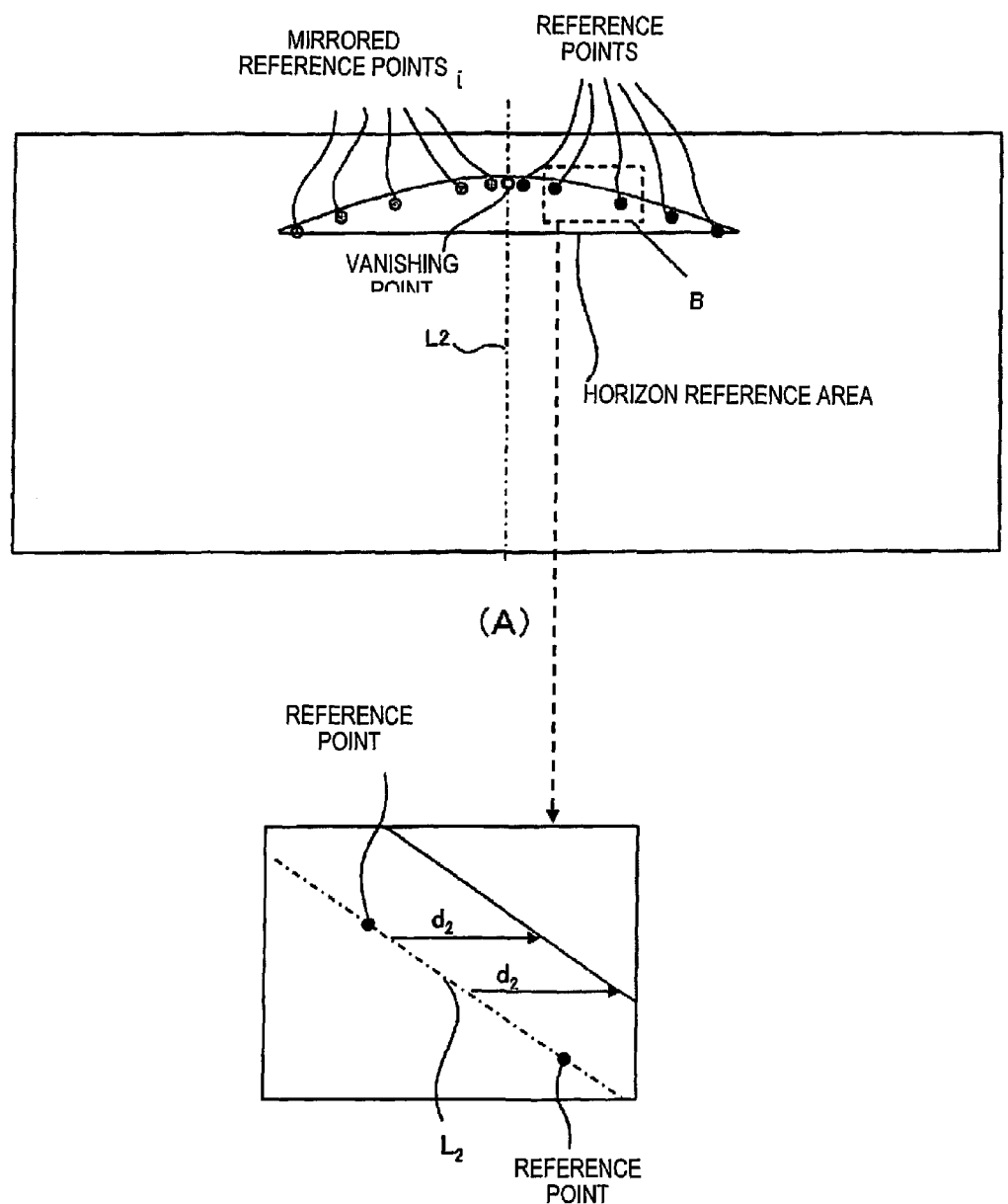
FIG. 14 is a view showing the method for setting the daytime edge extraction area.

The edge extraction area setting unit 35 stores in a memory (not diagrammed) of the computer 30 a plurality of reference points for setting the horizon reference area using a world coordinate system having the camera 10 as the origin in the same way as with the pair of left and right road edge reference areas. The edge extraction area setting unit 35 then acquires the plurality of reference points for setting the horizon reference area from the memory of the computer 30 and converts the acquired reference points from the world coordinate system into the camera coordinate system. The image (A) of FIG. 14 is a view illustrating the reference points of the horizon reference area that have been converted into a camera coordinate system. In the present embodiment, only the reference points corresponding to the right side portion of the screen are stored in the memory, and the edge extraction area setting unit 35 first converts the reference points corresponding to the right side portion into the camera coordinate system, as illustrated in the image (A) of FIG. 14. The edge extraction area setting unit 35 then mirrors the reference points corresponding to the right side portion about a straight line L2 that passes the vanishing point and sets the reference points corresponding to the left side portion. In addition, the edge extraction area setting unit 35 sets the area obtained by connecting adjacent reference points with the straight line $L_2$ and then by expanding outward from the straight line $L_2$ (that is, in the right direction in the portion on the right side of the straight line $L_2$ and in the left direction in the portion on the left side of the straight line $L_2$) by a predetermined distance $d_2$ as the horizon reference area, as illustrated in the image (B) of FIG. 14. The image (B) of FIG. 14 is an enlarged view of the B portion in the image (A) of FIG. 14.

The edge extraction area setting unit 35 sets a different edge extraction area when an assessment has been made that the present is nighttime, as compared to when an assessment has been made that the present is daytime. In the daytime, the edges can be stably extracted from the horizon near the vanishing point, which is in the distance with little change in the landscape, by setting the horizon reference area that references the horizon near the vanishing point as the daytime edge extraction area. Additionally, in the daytime, the edges can be appropriately extracted from the pair of left and right road edge reference areas when there is difficulty extracting the edges of the horizon due to the presence of forests and woods on the horizon near the vanishing point; when there is difficulty extracting the edges of the horizon due to the setting sun or smears, the edges can be extracted by setting the pair of left and right road edge reference areas as the daytime edge extraction area, in addition to setting the horizon reference area. On the other hand, during the nighttime, there is difficulty stably extracting the edges of the horizon near the vanishing point because, in addition to the difficulty of extracting edges from the distant horizon because of low luminance, a headlight of another vehicle that is following immediately behind the host vehicle V1 may appear and disappear on the horizon near the vanishing point. Accordingly, during the nighttime, the pair of left and right road edge reference areas are set as the nighttime edge extraction area.

The edge intensity calculation unit 36 extracts the edges of a subject from the edge extraction area that is set by the edge extraction area setting unit 35 and calculates the intensity of the edges in the edge extraction area. Specifically, the edge intensity calculation unit 36 first extracts the edges of a subject from the daytime edge extraction area, that is, from both the horizon reference area and the pair of left and right road edge reference areas, when an assessment has been made that the present is daytime by the day/night assessment unit 34; the edge intensity calculation unit extracts the edges of a subject from the nighttime edge extraction area, that is, from both the pair of left and right road edge reference areas, when an assessment has been made that the present is nighttime by the day/night assessment unit 34. The edge intensity calculation unit 36 is able to extract the edges of the subject from a captured image, for example, by using a Laplacian filter in a predetermined image range within the captured image that includes the edge extraction area.

The edge intensity calculation unit 36 generates a histogram based on the intensity of the extracted edges after extracting the edges from the edge extraction area. The edge intensity calculation unit 36 generates a histogram for each of the daytime edge extraction areas, that is, for both the horizon reference area and the pair of left and right road edge reference areas, when an assessment has been made that the present is daytime by the day/night assessment unit 34; the edge intensity calculation unit generates a histogram for the nighttime edge extraction area, that is, for each of the pair of left and right road edge reference areas, when an assessment has been made that the present is nighttime by the day/night assessment unit 34.

Figure 15:
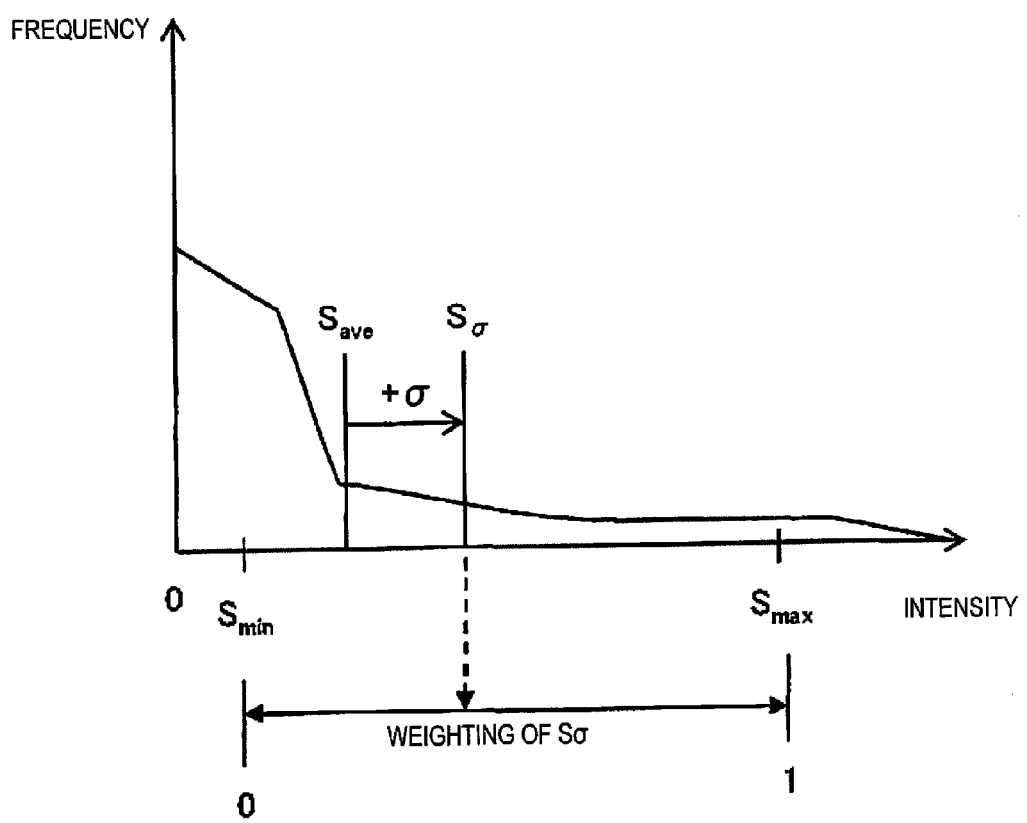
FIG. 15 is a view showing the method for calculating the weighting of the edge intensity deviation Sσ.

FIG. 15 is a view illustrating an example of a histogram based on the intensity of the edges. The edge intensity calculation unit 36 generates a histogram according to the intensity of the edges based on the edges in the edge extraction area, as illustrated in FIG. 15.

The edge intensity calculation unit 36 calculates the average value of the intensity of the edges in each edge extraction area as the edge intensity average value $S_{ave}$ based on the generated histogram, calculates the standard deviation $\sigma$ of the intensity of the edges in each edge extraction area, and calculates a value that is the sum of the edge intensity average value $S_{ave}$ and the standard deviation $\sigma$ of the intensity of the edges as the edge intensity deviation $S\sigma$, as illustrated in FIG. 15.

The edge intensity calculation unit 36 calculates the weighting of the edge intensity deviation $S\sigma$ based on the value of the edge intensity deviation $S\sigma$, as illustrated in FIG. 15. Specifically, the edge intensity calculation unit 36 calculates the weighting of the edge intensity deviation $S\sigma$ as 0 when the value of the edge intensity deviation $S\sigma$ is a predetermined edge intensity lower limit value $S_{min}$ or smaller; when the edge intensity deviation $S\sigma$ is a predetermined edge intensity upper limit value $S_{max}$ or greater, the edge intensity calculation unit calculates the weighting of the edge intensity deviation $S\sigma$ as 1, as illustrated in FIG. 15. In addition, the edge intensity calculation unit 36 calculates the weighting of the edge intensity deviation $S\sigma$ in the range from 0 to 1 according to the value of the edge intensity deviation $S\sigma$ when the value of the edge intensity deviation $S\sigma$ is within the range of the edge intensity lower limit value $S_{min}$ and the edge intensity upper limit value $S_{max}$.

As a result, when an assessment has been made that the present is daytime by the day/night assessment unit 34, the weighting of the edge intensity deviation $S\sigma$ is calculated for the daytime edge extraction area, that is, for both the horizon reference area and the pair of left and right road edge reference areas; when an assessment has been made that the present is nighttime by the day/night assessment unit 34, the weighting of the edge intensity deviation $S\sigma$ is calculated for the nighttime edge extraction area, that is, for each of the pair of left and right road edge reference areas.

The edge intensity lower limit value $S_{min}$ and the edge intensity upper limit value $S_{max}$ are unique values that are appropriately set by experimentation or by another means, and a different value is set depending on whether the present is daytime or nighttime. Specifically, both the edge intensity lower limit value $S_{min}$ and the edge intensity upper limit value $S_{max}$ are set to be relatively high values because, during the daytime, the luminance of the background is high and the edges of a subject are easily detected; both the edge intensity lower limit value $S_{min}$ and the edge intensity upper limit value $S_{max}$ are set to be relatively low values because, during the nighttime, the luminance of the background is low and the edges of the subject are not easily detected. In this manner, appropriately determining the ease with which the edges can be detected with a consideration given to the difference in the light environment between day and night is possible by changing the edge intensity lower limit value $S_{min}$ and the edge intensity upper limit value $S_{max}$ depending on whether the present is day or night; as a result, appropriately determining whether or not the lens is clouded is possible.

Figure 16:
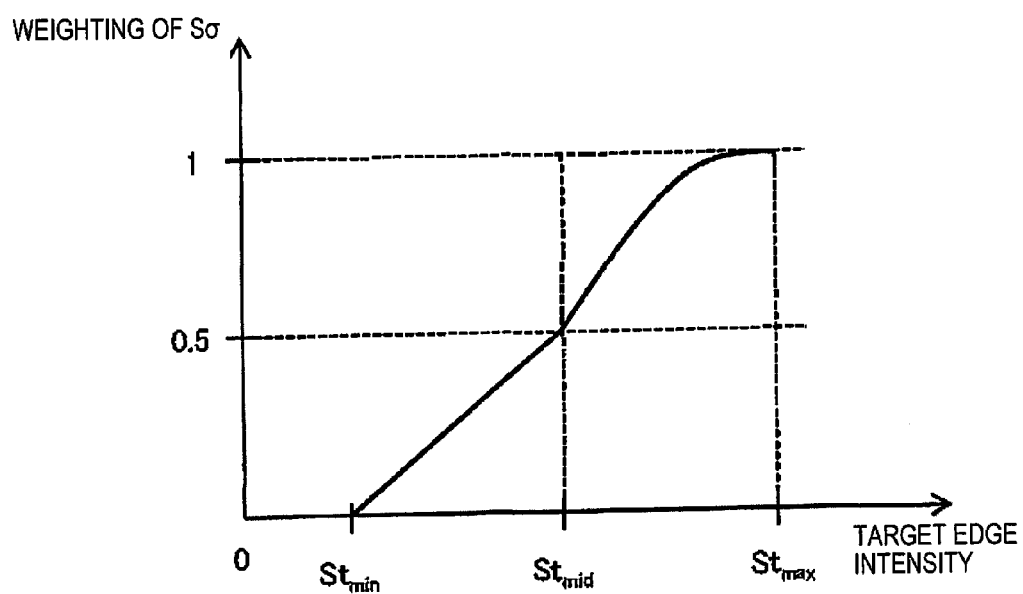
FIG. 16 is a view showing the method for calculating the target edge intensity.

The edge intensity calculation unit 36 then calculates the intensity of the edges in each edge extraction area based on the calculated weighting of the edge intensity deviation $S\sigma$ as the target edge intensity, as illustrated in FIG. 16. FIG. 16 is a view illustrating the relationship between the weighting of the edge intensity deviation $S\sigma$ and the target edge intensity. As illustrated in FIG. 16, a lower limit value $St_{min}$ and an upper limit value $St_{max}$ are set for the target edge intensity; when the weighting of the edge intensity deviation $S\sigma$ is 0, a value of the lower limit value $ST_{min}$ is calculated as the target edge intensity; when the weighting of the edge intensity deviation $S\sigma$ is 1, a value of the upper limit value $St_{max}$ is calculated as the target edge intensity. The weighting of the edge intensity deviation $S\sigma$ and the target edge intensity are in a linear (proportional) relationship between the lower limit value $St_{min}$ and an intermediate value $St_{mid}$, and they are in a relationship that is corrected by gamma conversion between the intermediate value $St_{mid}$ and the upper limit value $St_{max}$, as illustrated in FIG. 16. The edge intensity calculation unit 36 calculates a target edge intensity according to the weighting of the edge intensity deviation $S\sigma$ within a range from the lower limit value $St_{min}$ to the intermediate value $St_{mid}$ when the weighting of the edge intensity deviation $S\sigma$ is from 0 to 0.5; the edge intensity calculation unit calculates a target edge intensity according to the weighting of the edge intensity deviation $S\sigma$ within a value range from the intermediate value $St_{mid}$ to the upper limit value $St_{max}$ when the weighting of the edge intensity deviation $S\sigma$ is from 0.5 to 1 by using a map that illustrates the relationship between the edge intensity deviation $S\sigma$ and the target edge intensity, as that illustrated in FIG. 16. The lower limit value $St_{min}$ and the upper limit value $St_{max}$ of the target edge intensity can be appropriately set by experimentation or by another means, and a different value is set depending on whether the present is daytime or nighttime.

When an assessment has been made that the present is daytime, the edge intensity calculation unit 36 assesses whether the target edge intensity detected in the horizon reference area within the daytime edge extraction area is a predetermined value or greater and specifies the target edge intensity detected in the horizon reference area as a specific edge intensity that is used for setting the difference threshold th when the target edge intensity detected in the horizon reference area is a predetermined value or greater. On the other hand, when the target edge intensity detected in the horizon reference area is less than the predetermined value, the edge intensity calculation unit 36 specifies the highest target edge intensity from among the target edge intensities detected in the horizon reference area and the pair of left and right road edge reference areas as the specific edge intensity that is used for setting the difference threshold th. The predetermined value described above is appropriately set by experimentation or by another means; if the target edge intensity is equal to or greater than this predetermined value, a predetermined quantity of edges attributable to the horizon has been detected, and a value that facilitates the appropriate assessment of the turbidity of the lens will be set.

In this manner, when the target edge intensity in the horizon reference area is a predetermined value or greater, the edges that are attributable to the horizon can be stably extracted from the horizon reference area, which is in the distance with little change in the landscape, by preferentially specifying the target edge intensity that is detected in the horizon reference area as the specific edge intensity; the turbidity of the lens can be assessed with a high degree of precision by using the target edge intensity attributable to the horizon that is extracted in this way. On the other hand, when the target edge intensity in the horizon reference area is less than the predetermined value, by specifying the highest target edge intensity from among the target edge intensities in the horizon reference area and the pair of left and right road edge reference areas as the specific edge intensity, the lens turbidity can be calculated based on the target edge intensity in the left-side road edge reference area or the right-side road edge reference area even when there is difficulty extracting the edges from the horizon reference area due to the presence of forests and woods on the horizon in the horizon reference area or when there is difficulty extracting the edges from the horizon reference area due to the setting sun or smears; therefore, assessing the turbidity of the lens with a high degree of precision is possible.

When a determination has been made that the present is nighttime, the edge intensity calculation unit 36 specifies the target edge intensity in the left-side road edge reference area from among the pair of left and right road edge reference areas that are set as the nighttime edge extraction areas as the specific edge intensity for setting the difference threshold th of a left-side detection area A2; then, the edge intensity calculation unit specifies the target edge intensity in the right-side road edge reference area as the specific edge intensity for setting the difference threshold th of the right-side detection area A1. When, during the nighttime, a light source such as a street light is present on the right side of the host vehicle V1 while a light source is not present on the left side of the host vehicle V1, the light environment will differ greatly between the left and right detection areas A1, A2, and the ease with which a three-dimensional object can be detected will also differ greatly due to this type of light environment surrounding the host vehicle V1. Accordingly, in the present embodiment, appropriately setting a difference threshold th according to the light environment in each of the pair of left and right detection areas A1, A2 is possible by specifying the target edge intensity in the left-side road edge reference area as the specific edge intensity for setting the difference threshold th of the left-side detection area A2 and by specifying the target edge intensity in the right-side road edge reference area as the specific edge intensity for setting the difference threshold th of the right-side detection area A1; as a result, the detection of a three-dimensional object can be carried out with a high degree of precision.

The edge intensity calculation unit 36 then stores the specific edge intensity specified in this way in the memory (not diagrammed) of the computer 30. Additionally, the edge intensity calculation unit 36 has repeatedly calculated the specific edge intensity at a predetermined cycle and will calculate the final intensity of the edges in the edge extraction area with consideration given to the specific edge intensities that have been calculated in the past as the final edge intensity. For example, of the plurality of specific edge intensities that are stored in the memory, the edge intensity calculation unit 36 may decrease the weighting more for the specific edge intensities that have been more recently stored and calculate the moving average value of the plurality of specific edge intensities that have been calculated within a predetermined period of time as the final edge intensity.

Figure 17:
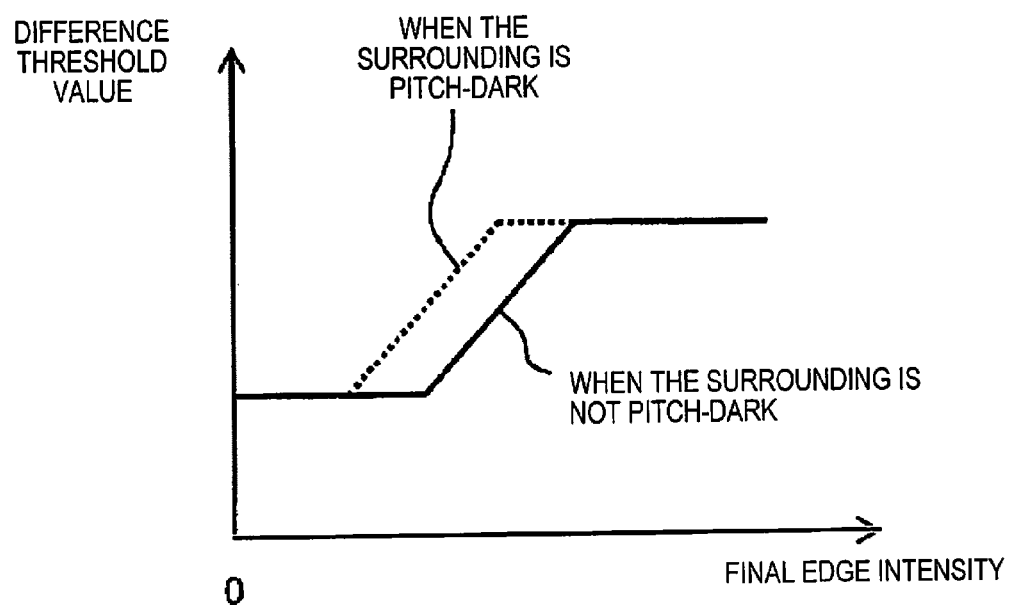
FIG. 17 is a view illustrating an example of the relationship between the target edge intensity and the difference threshold.

The threshold value changing unit 37 changes the difference threshold th described above based of the final edge intensity that is calculated by the edge intensity calculation unit 36. When foreign matter such as a water stain has adhered to the lens and the lens is clouded, there are cases in which the image of the subject cannot be captured clearly due to a part of the light flux from the subject being blocked or being irregularly reflected by the foreign matter. Accordingly, the higher the turbidity of the lens, the lower the intensity of the edges of the subject will be; as a result, the final edge intensity that is calculated by the edge intensity calculation unit 36 tends to decrease. Therefore, the threshold value changing unit 37 determines that the lens is more clouded the lower the final edge intensity and changes the difference threshold th in the detection areas A1, A2 to a lower value, as illustrated in FIG. 17. As a result, detecting a three-dimensional object even when the lens is clouded becomes easier; additionally, appropriately detecting an adjacent vehicle V2 is possible. On the other hand, the threshold value changing unit 37 determines that the lens is less clouded the higher the final edge intensity becomes and changes the difference threshold th in the detection areas A1, A2 to a higher value. Accordingly, noise can be effectively suppressed; as a result, effectively preventing an erroneous detection of a three-dimensional object is possible. FIG. 17 is a view illustrating the relationship between the difference threshold th and the edge intensity.

Additionally, when the surrounding is pitch-dark, detecting the edges of the subject is difficult, and the final edge intensity tends to be calculated at a low value; therefore, there are cases in which there are erroneous assessments that the lens is clouded and the difference threshold th is calculated at a low value even if the lens is not actually clouded; as a result, an erroneous detection of a three-dimensional object occurs due to noise and the like. Accordingly, when a determination can be made that the luminance of the surrounding is ultra-low luminance and that the surrounding is pitch-dark, the threshold value changing unit 37 changes the relationship between the difference threshold th and the final edge intensity so that the difference threshold th is calculated at a relatively high value even when the final edge intensity is relatively low, as compared to when the surrounding is not pitch-dark, as illustrated in FIG. 17. As a result, effectively preventing the occurrence of an erroneous detection of a three-dimensional object when the surrounding is pitch-dark becomes possible. The threshold value changing unit 37 is able to assess that the surrounding is pitch dark when the luminance of the entire captured image is equal to or less than a predetermined luminance with which a determination can be made that the surrounding is pitch dark.

Figure 18:
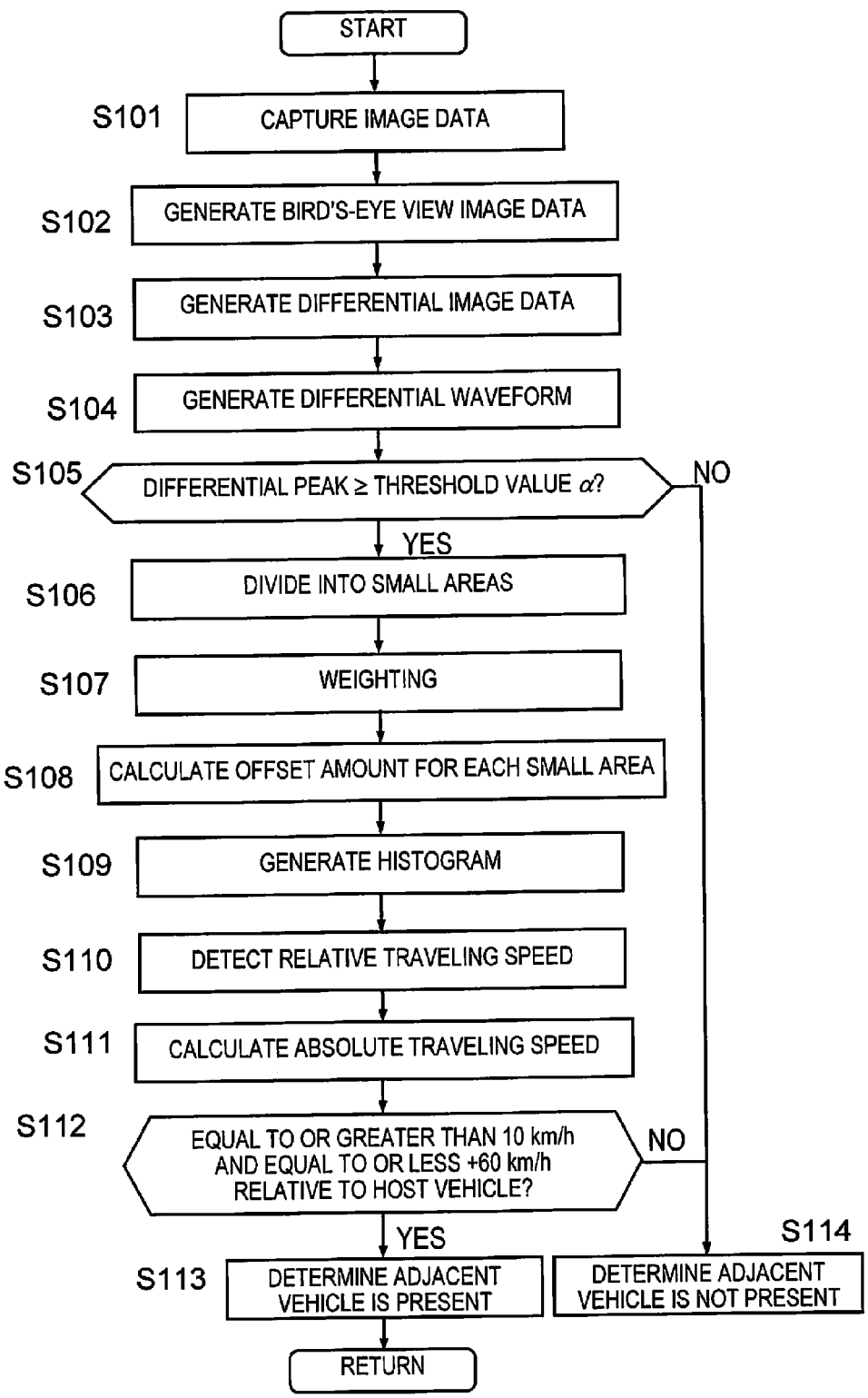
FIG. 18 is a flowchart illustrating an adjacent vehicle detection process according to the first embodiment.

Described next is the process for detecting an adjacent vehicle in accordance with the present embodiment. FIG. 18 is a flowchart illustrating the operation for detecting an adjacent vehicle according to the first embodiment. First, data of a captured image is acquired by the computer 30 from the camera 10 (Step S101), and data of a bird's-eye view image $PB_t$ is generated (Step S102) by the viewpoint conversion unit 31 based on the data of the captured image thus acquired, as illustrated in FIG. 18.

The alignment unit 32 aligns the bird's-eye view image $PB_t$ data and the bird's-eye view image $PB_{t-1}$ data at a single moment prior and generates differential image $PD_1$ data (Step S103). Specifically, the alignment unit 32 takes the absolute value of the difference in the pixel values of the bird's-eye view images $PB_t$ and $PB_{t-1}$; when the absolute value is equal to or greater than a predetermined threshold value th, the pixel values of the differential image $PD_1$ are set to "1;" when the absolute value is less than a predetermined threshold value th, the pixel values of the differential image $PD_1$ are set to "0." There are cases in which the difference threshold value th for calculating the pixel values of the differential image $PD_t$ is changed in the threshold value changing process mentioned below; in the case that the difference threshold value th is changed, the changed difference threshold value th will be used in this Step S103. The three-dimensional object detection unit 33 then counts the number of difference pixels DP having a pixel value of "1" from the differential image PD data and generates a differential waveform $DW_t$ (Step S104).

The three-dimensional object detection unit 33 then determines whether the peak of the differential waveform $DW_t$ is at a threshold value α or greater (Step S105). When the peak of the differential waveform $DW_1$ is not at the threshold value α or greater, in particular, when there is essentially no difference, the thought is that a three-dimensional object is not present in the captured image. Accordingly, when a determination has been made that the peak of the differential waveform $DW_t$ is not at the threshold value α or greater (Step S105=No), the three-dimensional object detection unit 33 determines that a three-dimensional object is not present and that an adjacent vehicle V2 is not present (Step S114). The operation then returns to Step S101 and repeats the operation illustrated in FIG. 18.

On the other hand, when the peak of the differential waveform $DW_t$ is determined to be at a threshold value α or greater (Step S105=Yes), a determination is made by the three-dimensional object detection unit 33 that a three-dimensional object is present in an adjacent lane, the operation proceeds to Step S106, and the three-dimensional object detection unit 33 divides the differential waveform $DW_t$ into a plurality of small areas $DW_{t1}$ to $DW_{tn}$. The three-dimensional object detection unit 33 next weights each of the small areas $DW_{t1}$ to $DW_{tn}$ (Step S107), calculates the offset amount for each of the small areas $DW_{t1}$ to $DW_{tn}$ (Step S108), and generates a histogram with consideration given to the weightings (Step S109).

The three-dimensional object detection unit 33 then calculates the relative travel distance, which is the travel distance of the three-dimensional object in relation to the host vehicle V1, based on the histogram (Step S110). Next, the three-dimensional object detection unit 33 calculates the absolute travelling speed of the three-dimensional object from the relative travel distance (Step S111). At this time, the three-dimensional object detection unit 33 time-differentiates the relative travel distance to thereby calculate the relative travelling speed, adds the host vehicle speed detected by the vehicle speed sensor 20, and calculates the relative travelling speed.

The three-dimensional object detection unit 33 then determines whether the absolute travelling speed of the three-dimensional object is 10 km/h or more and whether the relative travelling speed of the three-dimensional object in relation to the host vehicle V1 is +60 km/h or less (Step S112). When both conditions have been satisfied (Step S112=Yes), the three-dimensional object detection unit 33 determines that the detected three-dimensional object is an adjacent vehicle V2 that is present in an adjacent lane and that an adjacent vehicle V2 is present in the adjacent lane (Step S113). Then, the operation illustrated in FIG. 18 ends. On the other hand, when either one of the conditions has not been satisfied (Step S112=No), the three-dimensional object detection unit 33 determines that an adjacent vehicle V2 is not present in an adjacent lane (Step S114). The operation then returns to Step S101 and repeats the operation illustrated in FIG. 18.

In the present embodiment, the detection areas A1, A2 are to the left and right of the rear of the host vehicle V1, and focus is placed on whether the host vehicle V1 may possibly make contact with another object should a lane change be made. Accordingly, the operation of Step S112 is implemented. In other words, assuming that the system in the present embodiment is actuated on an expressway, when the speed of an adjacent vehicle V2 is less than 10 km/h, there would rarely be a problem even if an adjacent vehicle V2 were to be present because the adjacent vehicle V2 would be positioned far behind the host vehicle V1 when a lane change is made. Similarly, when the relative travelling speed of an adjacent vehicle V2 exceeds +60 km/h in relation to the host vehicle V1 (specifically, when the adjacent vehicle V2 is moving at a speed 60 km/h greater than the speed of the host vehicle V1), there would rarely be a problem because the adjacent vehicle V2 would be positioned ahead of the host vehicle V1 when a lane change is made. Accordingly, a statement can be made that Step S112 determines if an adjacent vehicle V2 can pose a problem when a lane change is made.

In Step S112, a determination is made whether the absolute travelling speed of the adjacent vehicle V2 is 10 km/h or greater and whether the relative travelling speed of the adjacent vehicle V2 in relation to the host vehicle V1 is +60 km/h or less, thereby obtaining the following effect. For example, a possible case is that the absolute travelling speed of a stationary object is detected to be several kilometers per hour, depending on the attachment error of the camera 10. Accordingly, determining whether the speed is 10 km/h or greater enables the reduction of the possibility that the stationary object will be determined to be an adjacent vehicle V2. Also, there is a possibility that the relative speed of an adjacent vehicle V2 in relation to the host vehicle V1 will be detected to be in excess of +60 km/h due to noise. Accordingly, determining whether the relative speed is +60 km/h or less enables the reduction of the possibility of an erroneous detection due to noise.

Furthermore, in lieu of the operation of Step S112, a determination can be made as to whether the absolute travelling speed of the adjacent vehicle V2 is not negative or not 0 km/h. In addition, in the present embodiment, since focus is placed on whether the host vehicle V1 may possibly make contact with another object should a lane change be made, a warning sound may be emitted to the driver of the host vehicle, or a corresponding warning may be displayed by a predetermined display device when an adjacent vehicle V2 is detected in Step S113.

Figure 19:
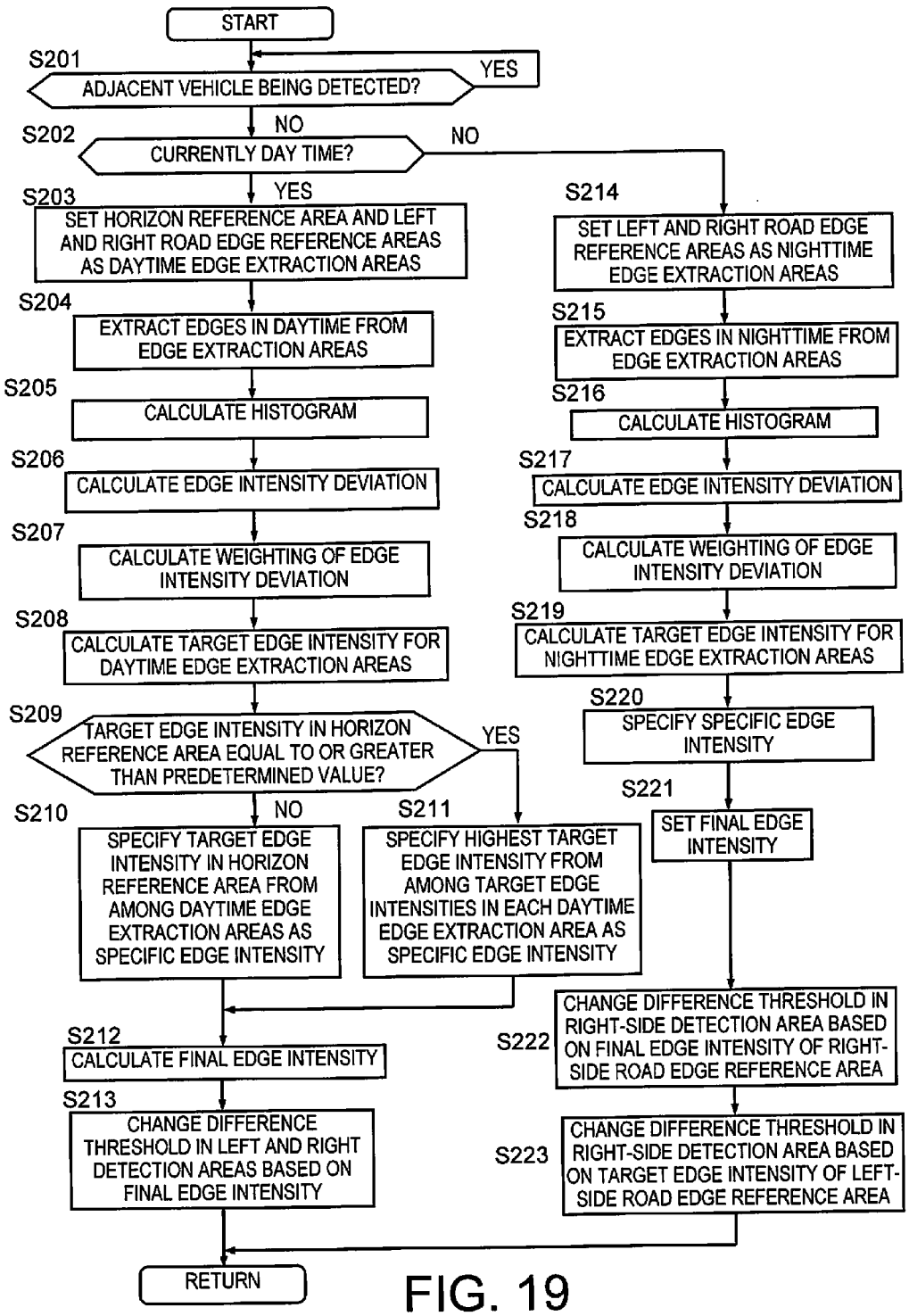
FIG. 19 is a flowchart illustrating the threshold value changing process according to the first embodiment.

Described next with reference to FIG. 19 is a threshold value changing process according to the first embodiment. FIG. 19 is a flowchart illustrating the threshold value changing process according to the first embodiment. The threshold value changing process described below is carried out in parallel with the adjacent vehicle detection process illustrated in FIG. 18, and the difference threshold th that is set by this threshold value changing process is applied as the difference threshold th in the adjacent vehicle detection process illustrated in FIG. 18.

First, in Step S201, a determination is made regarding whether or not an adjacent vehicle V2 is being detected by the computer 30, as illustrated in FIG. 19. For example, when a determination is made that an adjacent vehicle V2 is present in an adjacent lane in the adjacent vehicle detection process illustrated in FIG. 18, the computer 30 determines that an adjacent vehicle is being detected and waits in Step S201; when a determination is made that an adjacent vehicle V2 is not being detected, the operation proceeds to Step S202.

In Step S202, a determination is made whether the present is nighttime or daytime by the day/night assessment unit 34. For example, the day/night assessment unit 34 can calculate the average luminance of the entire captured image and determine that the present is daytime when the calculated average luminance is a predetermined value or greater; when the calculated average luminance is less than the predetermined value, the day/night assessment unit can assess that the present is nighttime. When an assessment has been made that the present is daytime, the operation proceeds to Step S203; when an assessment has been made that the present is nighttime, the operation proceeds to Step S214. First, the threshold value changing process when an assessment has been made that the present is daytime will be described below.

In Step S203, the daytime edge extraction area is set by the edge extraction area setting unit 35. When an assessment has been made that the present is daytime, the edge extraction area setting unit 35 sets the horizon reference area that references the horizon near the vanishing point and the pair of left and right road edge reference areas that reference the road edge as the daytime edge extraction areas, as illustrated in FIG. 13.

In Step S204, the extraction of the edges of the subject is carried out by the edge intensity calculation unit 36 in the daytime edge extraction area, that is, in the horizon reference area and each of the pair of left and right road edge reference areas.

Then, in Step S205, a histogram is generated based on the intensity of the edges by the edge intensity calculation unit 36, based on the edges extracted in Step S204, for the horizon reference area and each of the pair of left and right road edge reference areas, which are the daytime edge extraction areas, as illustrated in FIG. 15.

In Step S206, the edge intensity calculation unit 36 calculates an average value of the intensity of the edges for the horizon reference area and each of the pair of left and right road edge reference areas as the edge intensity average value $S_{ave}$ based on the histogram generated in Step S205, calculates the standard deviation $\sigma$ of the intensity of the edges, and calculates a value that is the sum of the edge intensity average value $S_{ave}$ and the standard deviation $\sigma$ of the intensity of the edges as the edge intensity deviation $S\sigma$, as illustrated in FIG. 15.

In Step S207, the edge intensity calculation unit 36 calculates the weighting of the edge intensity deviation $S\sigma$ for the horizon reference area and each of the pair of left and right road edge reference areas based on the edge intensity deviation $S\sigma$ calculated in Step S206. Specifically, the edge intensity calculation unit 36 calculates the weighting of the edge intensity deviation $S\sigma$ as 0 when the value of the edge intensity deviation $S\sigma$ is an edge intensity lower limit value $S_{min}$ or smaller; the edge intensity calculation unit calculates the weighting of the edge intensity deviation $S\sigma$ as 1 when the edge intensity deviation $S\sigma$ is an edge intensity upper limit value $S_{max}$ (or greater, as illustrated in FIG. 15. In addition, the edge intensity calculation unit 36 calculates the weighting of the edge intensity deviation $S\sigma$ in the range from 0 to 1 according to the value of the edge intensity deviation $S\sigma$ when the value of the edge intensity deviation $S\sigma$ is within the range of the edge intensity lower limit value $S_{min}$ to the edge intensity upper limit value $S_{max}$.

In Step S208, the edge intensity calculation unit 36 calculates the weighting of the intensity of the edges for the horizon reference area and each of the pair of left and right road edge reference areas as the target edge intensity, based on the edge intensity deviation $S\sigma$ calculated in Step S207. The edge intensity calculation unit 36 can calculate the target edge intensity based on the weighting of the edge intensity deviation $S\sigma$ by using a map that illustrates the relationship between the weighting of the edge intensity deviation $S\sigma$ and the target edge intensity, as illustrated in FIG. 16

Then, in Step S209, the edge intensity calculation unit 36 determines whether the target edge intensity in the horizon reference area, from among the target edge intensities in each area of the daytime edge extraction areas calculated in Step S208, is a predetermined value or greater. When the target edge intensity in the horizon reference area is a predetermined value or greater, the operation proceeds to Step S210, and the edge intensity calculation unit 36 specifies the target edge intensity in the horizon reference area from among the daytime edge extraction areas as the specific edge intensity. On the other hand, when the target edge intensity in the horizon reference area is less than the predetermined value, the operation proceeds to Step S211, and the edge intensity calculation unit 36 specifies the target edge intensity with the highest value from among the target edge intensities in the horizon reference area and the pair of left and right road edge reference areas, which are the daytime edge extraction areas, as the specific edge intensity.

In Step S212, the edge intensity calculation unit 36 calculates the final intensity of the edges in the edge extraction area as the final edge intensity based on the specific edge intensity specified in Step S210 or Step S211. For example, the edge intensity calculation unit 36 can acquire the specific edge intensities calculated in the past from the memory (not diagrammed) of the computer 30, can decrease the weighting more for the specific edge intensities that have been more recently stored from among the plurality of specific edge intensities that have been calculated between the current time and a predetermined time in the past, and can calculate the moving average value of the plurality of specific edge intensities as the final edge intensity.

In Step S213, the threshold value changing unit 37 changes the difference threshold th in the pair of left and right detection areas A1, A2 based on the final edge intensity calculated in Step S212. Specifically, the threshold value changing unit 37 determines that the lens is more clouded the lower the final edge intensity and changes the difference threshold th in the detection areas A1, A2 to a lower value, as illustrated in FIG. 17. Therefore, detecting a three-dimensional object even when the lens is clouded becomes easier; as a result, appropriately detecting an adjacent vehicle V2 is possible. On the other hand, the threshold value changing unit 37 determines that the lens is less clouded as the final edge intensity becomes higher and changes the difference threshold th in the detection areas A1, A2 to a higher value. Accordingly, the generation of noise is suppressed, and as a result, effectively preventing an erroneous detection of a three-dimensional object is possible.

In the present embodiment, when an assessment has been made that the present is daytime, the threshold value changing unit 37 sets the difference threshold th to be the same value as calculated, based on the final edge intensity, to the pair of left and right detection areas A1, A2, as in Step S213. During the daytime, since there is little variability in the light environment that surrounds the host vehicle V1, regardless of whether the difference threshold th is calculated based on the edges of the horizon reference area or the edges of the pair of left and right road edge reference areas, the calculated difference threshold th can be set as the difference threshold th in the pair of left and right detection areas A1, A2. Accordingly, during the daytime, calculating the difference threshold th based on edges that best correspond to the turbidity of the lens from among the edges that are extracted from the horizon reference area and the pair of left and right road edge reference areas is possible, and the difference threshold th can be set for both the right-side detection area A1 and the left-side detection area A2; as a result, appropriately detecting a three-dimensional object in the right-side detection area A1 and the left-side detection area A2 is possible.

Next, the threshold value changing process when an assessment has been made that the present is nighttime will be described. When an assessment has been made that the present is nighttime in Step S202, the operation proceeds to Step S214. In Step S214, the nighttime edge extraction area is set by the edge extraction area setting unit 35. Specifically, the edge extraction area setting unit 35 sets a left-side road edge reference area and a right-side road edge reference area, which reference the left and right road edges, as the nighttime edge extraction areas, as illustrated in FIG. 11.

In Step S215 to Step S219, the same operation as in Steps S204 to S208 is carried out in the left-side road edge reference area and the right-side road edge reference area that have been set as the nighttime edge extraction areas. Specifically, in the pair of left and right road edge reference areas that have been set as the nighttime edge extraction areas, the edges of the subject are extracted (Step S215), and histograms corresponding to each of the pair of left and right road edge reference areas are generated based on the edges that are extracted from the pair of left and right road edge reference areas, as illustrated in FIG. 15 (Step S216).

Next, the edge intensity deviation Sσ is calculated for each of the pair of left and right road edge reference areas based on the generated histograms (Step S217), and the weightings for these edge intensity deviations Sσ are calculated (Step S218). Then, as illustrated in FIG. 16, the intensities of the edges in the left-side road edge reference area and the right-side road edge reference area that are set as the nighttime edge extraction areas are calculated as the target edge intensities, based on the calculated weightings of the edge intensity deviations Sσ (Step S219).

In Step S220, the edge intensity calculation unit 36 specifies the specific edge intensity. Specifically, the edge intensity calculation unit 36 specifies the target edge intensity in the left-side road edge reference area from among the pair of left and right road edge reference areas that have been set as the nighttime edge extraction areas as the specific edge intensity for setting the difference threshold th in the left-side detection area A2; then, the edge intensity calculation unit specifies the target edge intensity in the right-side road edge reference area as the specific edge intensity for setting the difference threshold th in the right-side detection area A1. The specified specific edge intensities are stored in the memory (not diagrammed) of the computer 30 along with the specified time.

In Step S221, the edge intensity calculation unit 36 calculates the final edge intensity. For example, during the nighttime, the edge intensity calculation unit 36 can acquire the specific edge intensities calculated in the past from the memory (not diagrammed) of the computer 30, can decrease the weighting more for the specific edge intensities that have been more recently stored from among the plurality of specific edge intensities that have been calculated between the current time and a predetermined time in the past, and can calculate the moving average value of the plurality of specific edge intensities as the final edge intensity. When a determination has been made that the present is nighttime, the edge intensity calculation unit 36 calculates the final edge intensity for setting the difference threshold th in the right-side detection area A1 based on the specific edge intensity for setting the difference threshold th in the right-side detection area A1, and calculates the final edge intensity for setting the difference threshold th in the left-side detection area A2, based on the specific edge intensity for setting the difference threshold th in the left-side detection area A2.

In Step S222, the threshold value changing unit 37 sets the difference threshold th in the right-side detection area A1 from among the pair of left and right detection areas A1, A2; in Step S223, the threshold value changing unit 37 sets the difference threshold in the left-side detection area A2 from among the pair of left and right detection areas A1, A2. Specifically, the threshold value changing unit 37 determines that the lens is more clouded the lower that the final edge intensity calculated in Step S221 is and changes the difference threshold th in the detection areas A1, A2 to a lower value, as illustrated in FIG. 17. Therefore, detecting a three-dimensional object even when the lens is clouded becomes easier, and as a result, appropriately detecting an adjacent vehicle V2 is possible. On the other hand, the threshold value changing unit 37 determines that the lens is less clouded the higher the final edge intensity is and changes the difference threshold th in the detection areas A1, A2 to a higher value. Accordingly, the generation of noise is suppressed, and as a result, effectively preventing an erroneous detection of a three-dimensional object is possible.

When an assessment is being made that the present is nighttime, the threshold value changing unit 37 calculates the difference threshold th in the right-side detection area A1, based on the final edge intensity in the right-side road edge reference area calculated in Step S221, and sets the difference threshold th in the right-side detection area A1, as illustrated in FIG. 17. Similarly, in Step S223, the threshold value changing unit 37 calculates the difference threshold th in the left-side detection area A2, based on the final edge intensity in the left-side road edge reference area calculated in Step S221, and sets the difference threshold th in the left-side detection area A2, as illustrated in FIG. 17. The threshold value changing unit 37 sets the difference threshold th in the left-side detection area A2 and the difference threshold th in the right-side detection area A1 separately in this manner when an assessment is being made that the present is nighttime. Accordingly, appropriately detecting a three-dimensional object even when the light environment differs in the right side and the left side of the host vehicle V1 at night is possible.

Additionally, when the surrounding is pitch-dark, the threshold value changing unit 37 changes the relationship between the difference threshold th and the target edge intensity so that the difference threshold th is calculated at a relatively high value even when the final edge intensity is relatively low, when compared to when the surrounding is not pitch-dark, as illustrated by the broken line in FIG. 17. As a result, effectively preventing the occurrence of an erroneous detection of a three-dimensional object when the surrounding is pitch-dark is possible, and detecting the edges of the subject due to the lens being erroneously assessed as being clouded is difficult.

As described above, in the first embodiment, during the daytime or the nighttime, an area from which a predetermined quantity of edges can be expected to be extracted is set as an edge extraction area, and a difference threshold th is calculated based on the intensity of the edges in the edge extraction area. Specifically, a determination is made that the lens is more clouded as the intensity of the edges (the final edge intensity) in the edge extraction area decreases, and the difference threshold th is set to a low value, as illustrated in FIG. 17. As a result, detecting a three-dimensional object becomes easier, and appropriately detecting a three-dimensional object even when the lens is clouded is possible. Additionally, a determination is made that the lens is less clouded as the intensity of the edges (the final edge intensity) in the edge extraction area increases, and the difference threshold th is set to a high value, as illustrated in FIG. 17. As a result, effectively preventing an erroneous detection of a three-dimensional object caused by noise or the like when the lens is not clouded becomes possible.

In the first embodiment, when an assessment has been made that the present is daytime, the difference thresholds th with the same value are set in the pair of left and right detection areas A1, A2; when an assessment has been made that the present is nighttime, the difference thresholds th are set according to the light environment of each of the pair of left and right detection areas A1, A2. Accordingly, in the first embodiment, the difference in the difference thresholds th between the pair of left and right detection areas A1, A2 when an assessment has been made that the present is daytime becomes equal to or less than the difference in the difference thresholds th between the pair of left and right detection areas A1, A2 when an assessment has been made that the present is nighttime. When an assessment has been made that the present is daytime, the difference in the light environment between the right-side detection area A1 and the left-side detection area A2 will be determined to be little; therefore, appropriate difference thresholds th based on the final edges can be set for both the right-side detection area A1 and the left-side detection area A2, thereby allowing for an appropriate detection of a three-dimensional object in the right-side detection area A1 and the left-side detection area A2. When an assessment has been made that the present is nighttime, a determination will be made that there are cases in which there is a considerable difference in the light environment between the right-side detection area A1 and the left-side detection area A2 due to the effect of a light source or the like; therefore, appropriately detecting a three-dimensional object according to the surrounding light environment becomes possible by setting difference thresholds th according to the light environment of each of the pair of left and right detection areas A1, A2.

Additionally, in the first embodiment, a determination is made regarding whether or not an adjacent vehicle V2 is being detected; when an adjacent vehicle V2 is being detected, changing the difference threshold based on the intensity of the edges in the edge extraction area is prohibited. Therefore, reducing the effect of the edges that is attributable to an adjacent vehicle V2 is possible when calculating the intensity of the edges in an edge extraction area that references the horizon, the road edge, and the like; also, appropriately detecting the intensity of the edges corresponding to the turbidity of the lens is possible.

Embodiment 2

Figure 20:
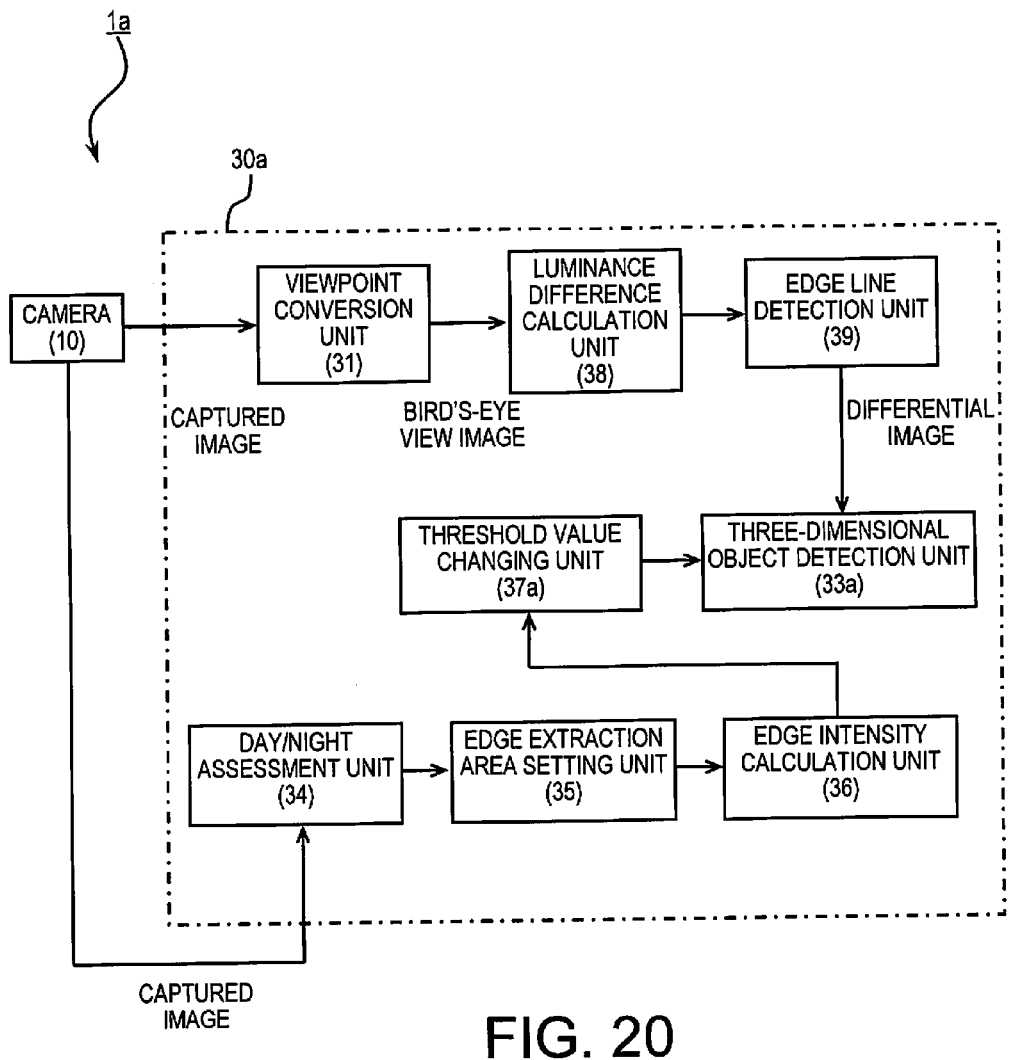
FIG. 20 is a block view illustrating the details of a computer according to the second embodiment.

Described next is a three-dimensional object detection device 1a according to the second embodiment. The three-dimensional object detection device 1a according to the second embodiment is the same as that of the first embodiment, except that a computer 30a is provided in lieu of the computer 30 of the first embodiment, as illustrated in FIG. 20; the operation is as described below. Here, FIG. 20 is a block view illustrating the details of the computer 30a according to the second embodiment.

The three-dimensional object detection device 1a according to the second embodiment is provided with a camera 10 and a computer 30a, as illustrated in FIG. 20. The computer 30a is provided with a viewpoint conversion unit 31, a luminance difference calculation unit 38, an edge line detection unit 39, a three-dimensional object detection unit 33a, a day/night assessment unit 34, an edge extraction area setting unit 35, an edge intensity calculation unit 36, and a threshold value changing unit 37a. The configuration of the three-dimensional object detection device 1a according to the second embodiment is described below. The configurations of the viewpoint conversion unit 31, the day/night assessment unit 34, the edge extraction area setting unit 35, and the edge intensity calculation unit 36 are the same as in those in the first embodiment; therefore, the descriptions thereof have been omitted.

Figure 21:
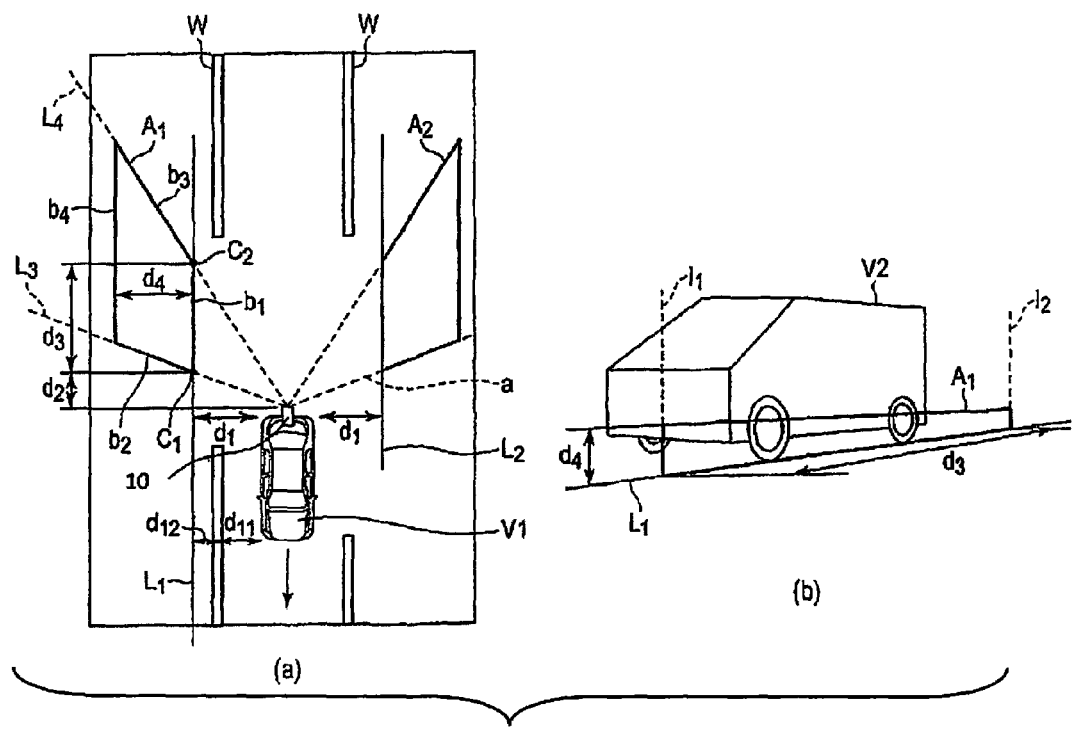
FIG. 21 is a view illustrating the driving state of the vehicle, with part (a) of FIG. 21 being a plan view illustrating the positional relationship between the detection areas, and part (b) of FIG. 21 being a perspective view illustrating the positional relationship between the detection areas in real space.

FIG. 21 is a view illustrating the image range of the camera 10 in FIG. 20. Part (a) of FIG. 21 is a plan view, and part (b) of FIG. 21 is a perspective view in real space rearward from the host vehicle V1. The camera 10 is set to a predetermined view angle a, and the rear side of the host vehicle V1 that is included in the predetermined view angle a is captured, as illustrated in part (a) of FIG. 21. The view angle a of the camera 10 is set so that the adjacent lanes are included in the capture range of the camera 10 in addition to the lane in which the host vehicle V1 is driving, in the same manner as that illustrated in FIG. 2.

The detection areas A1, A2 in the present example are trapezoidal in a plan view (a bird's-eye view state), and the position, the size, and the shape of the detection areas A1, A2 are determined based on the distances $d_1$ to $d_4$. The detection areas A1, A2 of the example illustrated in the drawing are not limited to being trapezoidal, and they may also be rectangular or another shape in a bird's-eye view state, as illustrated in FIG. 2.

Here, the distance d1 is the distance from the host vehicle V1 to the ground lines L1, L2. The ground lines L1, L2 refer to lines through which a three-dimensional object, which is present in a lane adjacent to the lane in which the host vehicle V1 is driving, is in contact with the ground. In the present embodiment, an objective is to detect an adjacent vehicle V2 or the like (including two-wheel vehicles or the like) driving in the left or right lane behind the host vehicle V1 and adjacent to the lane of the host vehicle V1. Accordingly, the distance d1, which is the position of the ground lines L1, L2 of the adjacent vehicle V2, can be decided so as to be substantially fixed from the distance d11 from the host vehicle V1 to a white line W and from the distance d12 from the white line W to the position in which the adjacent vehicle V2 is predicted to drive.

The distance d1 is not limited to being fixed and may be variable. In this case, the computer 30a recognizes the position of the white line W in relation to the host vehicle V1 using white line recognition or another technique, and the distance d11 is determined based on the position of the recognized white line W. The distance d1 is thereby variably set using the determined distance d11. In the present embodiment described below, the position in which the adjacent vehicle V2 is driving (the distance d12 from the white line W) and the position in which the host vehicle V1 is driving (the distance d11 from the white line W) is mostly predictable, and the distance d1 is fixed.

A distance d2 is the distance extending from the rear end part of the host vehicle V1 in the vehicle traveling direction. The distance d2 is determined so that the detection areas A1, A2 are accommodated within at least the view angle a of the camera 10. In the present embodiment in particular, the distance d2 is set so as to be in contact with a range partitioned within the view angle a. The distance d3 indicates the length of the detection areas A1, A2 in the vehicle traveling direction. The distance d3 is determined based on the size of the three-dimensional object to be detected. In the present embodiment, the object to be detected is an adjacent vehicle V2 or the like; therefore, the distance d3 is set to a length that includes the adjacent vehicle V2.

The distance d4 indicates the height, which has been set so that the tires of the adjacent vehicle V2 or the like are included in real space, as illustrated in part (b) of FIG. 21. In a bird's-eye view image, the distance d4 is the length illustrated in part (a) of FIG. 21. The distance d4 may also be a length that does not include the lanes further adjacent to the left and right adjacent lanes in the bird's-eye view image (in particular, the adjacent-adjacent lanes that are two lanes away). This is because, when the lanes that are two lanes away from the lane of the host vehicle V1 are included, distinguishing whether an adjacent vehicle V2 is present in the adjacent lanes to the left and right of the lane in which the host vehicle V1 is driving is no longer possible, and distinguishing whether an adjacent-adjacent vehicle is present in an adjacent-adjacent lane that is two lanes away is also no longer possible.

As described above, the distances d1 to d4 are determined, and the position, the size, and the shape of the detection areas A1, A2 are thereby determined. More specifically, the position of the top side b1 of the detection areas A1, A2 that form a trapezoid is determined by the distance d1. The starting position C1 of the top side b1 is determined by the distance d2. The end position C2 of the top side b1 is determined by the distance d3. The lateral side b2 of the detection areas A1, A2 that form a trapezoid is determined by a straight line L3 that extends from the camera 10 toward the starting position C1. Similarly, the lateral side b3 of the detection areas A1, A2 that form a trapezoid is determined by a straight line L4 that extends from the camera 10 toward the end position C2. The position of the lower side b4 of the detection areas A1, A2 that form a trapezoid is determined by the distance d4. In this manner, the areas surrounded by the sides b1 to b4 are the detection areas A1, A2. The detection areas A1, A2 are regular squares (rectangles) in the real space that is rear of the host vehicle V1, as illustrated in part (b) of FIG. 21.

The luminance difference calculation unit 38 calculates luminance differences in the bird's-eye view image data, which has undergone viewpoint conversion by the viewpoint conversion unit 31, in order to detect the edges of a three-dimensional object included in the bird's-eye view image. For each of a plurality of positions along a perpendicular imaginary line that extends along the perpendicular direction in real space, the luminance difference calculation unit 38 calculates the luminance difference between two pixels near each position. The luminance difference calculation unit 38 is capable of calculating the luminance difference by a method for setting a single perpendicular imaginary line that extends in the perpendicular direction in real space or by a method for setting two perpendicular imaginary lines.

Described below is the specific method for setting two perpendicular imaginary lines. The luminance difference calculation unit 38 sets a first perpendicular imaginary line that corresponds to a line segment that extends in the perpendicular direction in real space and a second perpendicular imaginary line that is different from the first perpendicular imaginary line and that corresponds to the line segment extending in the perpendicular direction in real space. The luminance difference calculation unit 38 determines the luminance difference between a point on the first perpendicular imaginary line and a point on the second perpendicular imaginary line in continuous fashion along the first perpendicular imaginary line and the second perpendicular imaginary line. The operation of the luminance difference calculation unit 38 is described in detail below.

Figure 22:
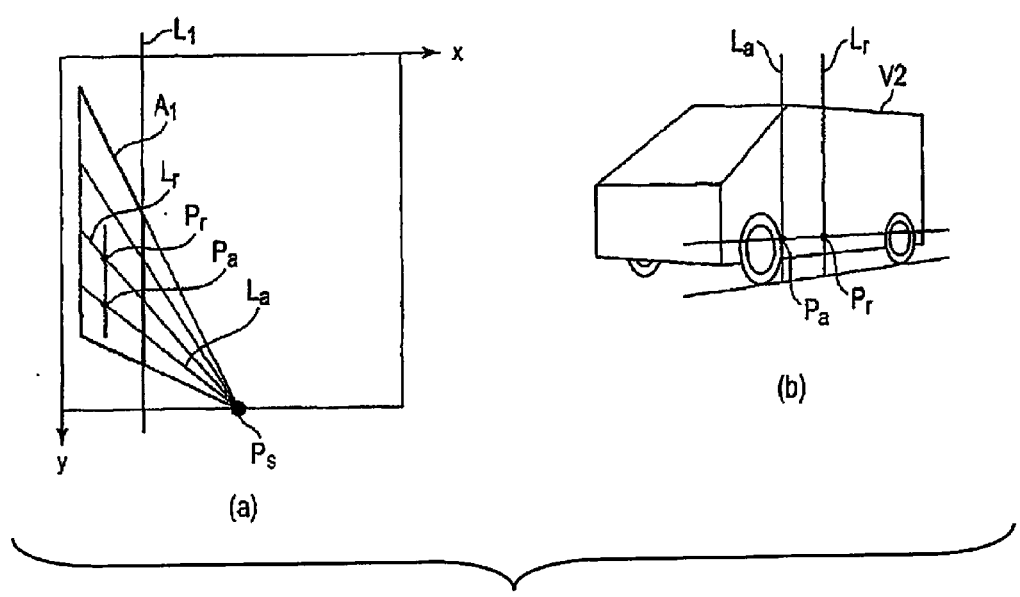
FIG. 22 is a view showing the operation of a luminance difference calculation unit according to the second embodiment, with part (a) of FIG. 22 being a view illustrating the positional relationship between an attention line, a reference line, an attention point, and a reference point in the bird's-eye view image, and part (b) of FIG. 22 being a view illustrating the positional relationship between the attention line, the reference line, the attention point, and the reference point in real space.

The luminance difference calculation unit 38 sets a first perpendicular imaginary line La (hereinafter referred to as the attention line La) that corresponds to a line segment extending in the perpendicular direction in real space and that passes through the detection area A1, as illustrated in part (a) of FIG. 22. The luminance difference calculation unit 38 sets a second perpendicular imaginary line Lr (hereinafter referred to as the reference line Lr) that is different from the attention line La, corresponds to the line segment extending in the perpendicular direction in real space, and passes through the detection area A1. Here, the reference line Lr is set in a position at a distance from the attention line La by a predetermined distance in real space. The lines that correspond to the line segments extending in the perpendicular direction in real space are lines that spread out in the radial direction from the position Ps of the camera 10 in a bird's-eye view image. These lines spreading out in the radial direction are lines that follow the collapsing direction of the three-dimensional object when converted into a bird's-eye view.

The luminance difference calculation unit 38 sets an attention point Pa on the attention line La (a point on the first perpendicular imaginary line). The luminance difference calculation unit 38 sets a reference point Pr on the reference line Lr (a point on the second perpendicular imaginary line). The attention line La, the attention point Pa, the reference line Lr, and the reference point Pr have the relationship in real space that is illustrated in part (b) of FIG. 22. As is apparent from part (b) of FIG. 22, the attention line La and the reference line Lr are lines extending in the perpendicular direction in real space, and the attention point Pa and the reference point Pr are points set to be substantially the same height in real space. The attention point Pa and the reference point Pr are not necessarily required to be rigorously kept at the same height, and a certain amount of error that allows for the attention point Pa and the reference point Pr to be deemed to be at the same height is allowed.

The luminance difference calculation unit 38 determines the luminance difference between the attention point Pa and the reference point Pr. If the luminance difference between the attention point Pa and the reference point Pr is great, there is a possibility that an edge is present between the attention point Pa and the reference point Pr. In the second embodiment in particular, a perpendicular imaginary line is set as a line segment extending in the perpendicular direction in real space in relation to the bird's-eye view image in order to detect a three-dimensional object present in the detection areas A1, A2. Therefore, there is a high possibility that there is an edge of a three-dimensional object in the location where the attention line La has been set when the luminance difference between the attention line La and the reference line Lr is high. Accordingly, the edge line detection unit 39 illustrated in FIG. 20 detects an edge line based on the luminance difference between the attention point Pa and the reference point Pr.

Figure 23:
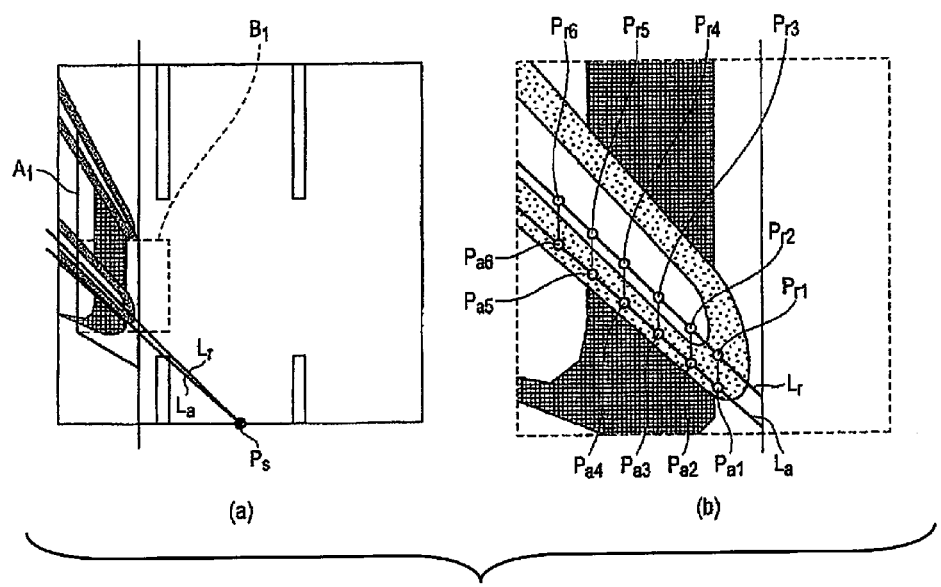
FIG. 23 is a view showing the detailed operation of the luminance difference calculation unit according to the second embodiment, with part (a) of FIG. 23 being a view illustrating the detection area in the bird's-eye view image, and part (b) of FIG. 23 being a view illustrating the positional relationship between the attention line, the reference line, the attention point, and the reference point in the bird's-eye view image.

This point will be described in greater detail. FIG. 23 is a view showing the detailed operation of the luminance difference calculation unit 38. Part (a) of FIG. 23 illustrates a bird's-eye view image of the bird's-eye view state, and part (b) of FIG. 23 is an enlarged view of a part B1 of the bird's-eye view image illustrated in part (a) of FIG. 23. In FIG. 23, only the detection area A1 is illustrated and described, but the luminance difference is calculated using the same procedure for detection area A2.

When the adjacent vehicle V2 is being displayed in the captured image captured by the camera 10, the adjacent vehicle V2 appears in the detection area A1 in the bird's-eye view image, as illustrated in part (a) of FIG. 23. The attention line La is set on a rubber portion of a tire of the adjacent vehicle V2 in the bird's-eye view image in part (b) of FIG. 23, as illustrated in the enlarged view of area B1 in part (a) of FIG. 23. In this state, first, the luminance difference calculation unit 38 sets the reference line Lr. The reference line Lr is set along the perpendicular direction in a position set at a predetermined distance in real space from the attention line La. Specifically, in the three-dimensional object detection device 1a according to the present embodiment, the reference line Lr is set in a position at a distance of 10 cm away in real space from the attention line La. The reference line Lr is thereby set on the wheel of the tire of the adjacent vehicle V2 set, for example, at a distance that corresponds to 10 cm from the rubber of the tire of the adjacent vehicle V2 in the bird's-eye view image.

Next, the luminance difference calculation unit 38 sets a plurality of attention points Pa1 to PaN on the attention line La. In part (b) of FIG. 23, six attention points Pa1 to Pa6 (hereinafter referred to as attention point Pai when indicating an arbitrary point) are set for the convenience of the description. An arbitrary number of attention points Pa may be set on the attention line La. In the description below, N attention points Pa are set on the attention line La.

The luminance difference calculation unit 38 subsequently sets the reference points Pr1 to PrN so that they have the same height as the attention points Pa1 to PaN in real space. The luminance difference calculation unit 38 calculates the luminance difference between the attention point Pa and the reference point Pr pairs at the same height. The luminance difference calculation unit 38 thereby calculates the luminance difference between two pixels for each of the plurality of positions (1–N) along the perpendicular imaginary line extending in the perpendicular direction in real space. The luminance difference calculation unit 38 calculates the luminance difference between, for example, a first attention point Pa1 and a first reference point Pr1 and calculates the luminance difference between a second attention point Pa2 and a second reference point Pr2. The luminance difference calculation unit 38 thereby determines the luminance difference in a continuous fashion along the attention line La and the reference line Lr. In other words, the luminance difference calculation unit 38 sequentially determines the luminance difference between the third to $N^{th}$ attention points Pa3 to PaN and the third to $N^{th}$ reference points Pr3 to PrN.

The luminance difference calculation unit 38 repeats the operation of setting the above-described reference line Lr, setting the attention point Pa, setting the reference point Pr, and calculating the luminance difference while shifting the attention line La within the detection area A1. In other words, the luminance difference calculation unit 38 repeatedly executes the above-described operation while changing the positions of the attention line La and the reference line Lr by the same distance in real space along the direction in which the ground line L1 extends. The luminance difference calculation unit 38, for example, sets the line that was the reference line Lr in the previous operation to be the attention line La, sets the reference line Lr in relation to the attention line La, and sequentially determines the luminance difference.

In this manner, in the second embodiment, determining the luminance difference from the attention point Pa on the attention line La and the reference point Pr on the reference line Lr, which are at substantially the same height in real space, allows the luminance difference to be distinctly detected when an edge extending in the perpendicular direction is present. The precision for detecting a three-dimensional object can be enhanced without the operation for detecting the three-dimensional object being affected even when the three-dimensional object is enlarged in accordance with the height from the road surface by conversion into a bird's-eye view image in order to compare the luminance between the perpendicular imaginary lines extending in the perpendicular direction in real space.

Returning to FIG. 20, the edge line detection unit 39 detects the edge line from the continuous luminance difference calculated by the luminance difference calculation unit 38. For example, in the case illustrated in part (b) of FIG. 23, the first attention point Pa1 and the first reference point Pr1 are positioned at the same tire portion, and the luminance difference is therefore small. On the other hand, the second to sixth attention points Pa2 to Pa6 are positioned at the rubber portions of the tire, and the second to sixth reference points Pr2 to Pr6 are positioned at the wheel portion of the tire. Therefore, the luminance difference between the second to sixth attention points Pa2 to Pa6 and the second to sixth reference points Pr2 to Pr6 is great. Accordingly, the edge line detection unit 39 is capable of detecting that an edge is present between the second to sixth attention points Pa2 to Pa6 and the second to sixth reference points Pr2 to Pr6 where the luminance difference is great.

Specifically, when an edge line is to be detected, the edge line detection unit 39 first assigns an attribute to the $i^{th}$ attention point Pai from the luminance difference between the $i^{th}$ attention point Pai (coordinates (xi, yi)) to the $i^{th}$ reference point Pri (coordinates (xi', yi')) in accordance with formula 1 noted below.

when $I(xi, yi) > I(xi', yi') + t$ $s(xi, yi) = 1$ when $I(xi, yi) < I(xi', yi') - t$ $s(xi, yi) = -1$ when the above do not hold true;

$s(xi, yi) = 0$  Formula 1

In formula 1 above, t represents an edge threshold value, I(xi, yi) represents the luminance value of the $i^{th}$ attention point Pai, and I(xi', yi') represents the luminance value of the $i^{th}$ reference point Pri. In accordance with formula 1, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the threshold value t from the reference point Pri. The attribute s(xi, yi) of the attention point Pai is '0' when the luminance value of the attention point Pai and the luminance value of the reference point Pri are in a relationship other than that stated above. In the present embodiment, there are cases in which the edge threshold value t is changed by the threshold value changing unit 37a mentioned below; when the edge threshold value t is changed by the threshold value changing unit 37a, the attribute s(xi, yi) of the attention point Pai is detected using the edge threshold value t that is changed by the threshold value changing unit 37a.

Next, the edge line detection unit 39 assesses whether the attention line La is an edge line from the continuity c(xi, yi) of the attribute s along the attention line La based on the following formula 2.

when s(xi, yi)=s(xi+1, yi+1) (excluding when 0=0)

$$c(xi, yi)=1$$

when the above does not hold true.

$$c(xi, yi)=0 \quad \text{Formula 2}$$

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 39 determines the sum of the continuities c of all of the attention points Pa on the attention line La. The edge line detection unit 39 divides the sum of the continuities c thus determined by the number N of attention points Pa to thereby normalize the continuity c. The edge line detection unit 39 determines the attention line La to be an edge line when the normalized value has exceeded a threshold value θ. The threshold value θ is set in advance by experimentation or by another means.

In other words, the edge line detection unit 39 determines whether the attention line La is an edge line based on formula 3 noted below. The edge line detection unit 39 then determines whether all of the attention lines La drawn on the detection area A1 are edge lines.

$$\Sigma c(xi, yi)/N > \theta \quad \text{Formula 3}$$

Figure 24:
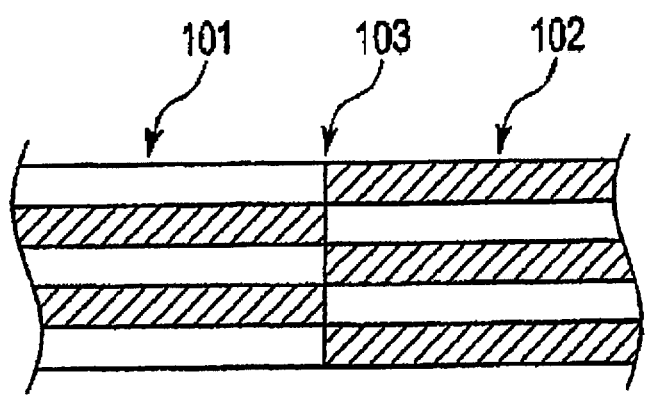
FIG. 24 is a view illustrating an image example of an edge detection operation.

In this manner, in the second embodiment, an attribute is assigned to the attention point Pa based on the luminance difference between the attention point Pa on the attention line La and the reference point Pr on the reference line Lr; then, a determination is made regarding whether the attention line La is an edge line based on the continuity c of the attributes along the attention line La. Therefore, the boundaries between the areas having high luminance and the areas having low luminance are detected as edge lines, and the edges can be detected in accordance with the natural senses of a human. The results of the above will be described. FIG. 24 is a view illustrating an image example showing the processing of the edge line detection unit 39. This image example is an image in which a first stripe pattern 101, indicating a stripe pattern in which the areas of high luminance and the areas of low luminance are repeated, and a second stripe pattern 102, indicating a stripe pattern in which the areas of low luminance and the areas of high luminance are repeated, are adjacent to each other. Also, in this image example, the areas with the first stripe pattern 101 in which the luminance is high and the areas with the second stripe pattern 102 in which the luminance is low are adjacent to each other; also, the areas with the first stripe pattern 101 in which the luminance is low and the areas with the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the areas of low luminance and the areas of high luminance are adjacent to each other, the location 103 is recognized as an edge when an edge is detected only by the luminance difference. However, in addition to the luminance difference at the location 103, the edge line detection unit 39 assesses the location 103 to be an edge line only when there is continuity in the attributes of the luminance difference. Therefore, the edge line detection unit 39 is capable of suppressing an erroneous assessment in which the location 103, which is not recognized as an edge line by human senses, is recognized to be an edge line, and the edges can be detected by human senses.

Returning to FIG. 20, the three-dimensional object detection unit 33a detects a three-dimensional object based on the quantity of edge lines detected by the edge line detection unit 39. As described above, the three-dimensional object detection device 1a according to the present embodiment detects an edge line extending in the perpendicular direction in real space. Detecting many edge lines extending in the perpendicular direction indicates that there is a high possibility that a three-dimensional object is present in the detection areas A1, A2. Accordingly, the three-dimensional object detection unit 33a detects a three-dimensional object based on the quantity of edge lines detected by the edge line detection unit 39. Specifically, the three-dimensional object detection unit 33a determines whether the quantity of edge lines detected by the edge line detection unit 39 is a predetermined threshold value β or greater; when the quantity of edge lines is a predetermined threshold value β or greater, the edge lines detected by the edge line detection unit 39 are determined to be the edge lines of a three-dimensional object.

Furthermore, prior to detecting the three-dimensional object, the three-dimensional object detection unit 33a assesses whether the edge lines detected by the edge line detection unit 39 are correct. The three-dimensional object detection unit 33a assesses whether a change in the luminance of the edge lines is a predetermined threshold value tb or greater along the edge lines of the bird's-eye view image. When the change in the luminance of the edge lines in the bird's-eye view image is a threshold value tb or greater, the edge lines are determined to have been detected by an erroneous assessment. On the other hand, when the change in the luminance of the edge lines in the bird's-eye view image is less than the threshold value tb, an assessment is made that the edge lines are correct. The threshold value tb is set in advance by experimentation or by another means.

Figure 25:
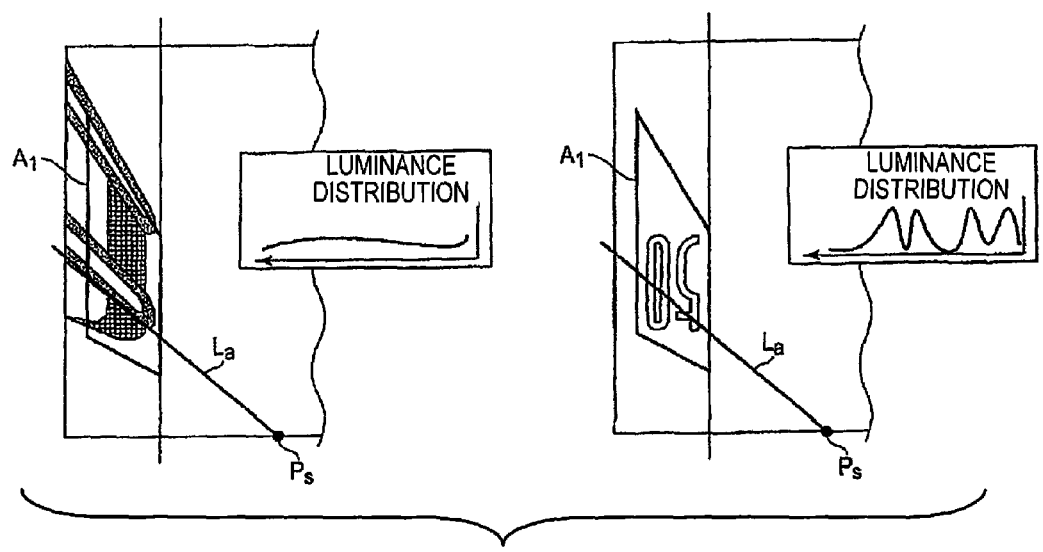
FIG. 25 is a view illustrating the edge line and the luminance distribution on the edge line, with part (a) of FIG. 25 being a view illustrating the luminance distribution when a three-dimensional object (an adjacent vehicle) is present in the detection area, and part (b) of FIG. 25 being a view illustrating the luminance distribution when a three-dimensional object is not present in the detection area.

FIG. 25 is a view illustrating the luminance distribution on the edge line. Part (a) of FIG. 25 illustrates the edge line and the luminance distribution when an adjacent vehicle V2 as a three-dimensional object is present in the detection area A1, and part (b) of FIG. 25 illustrates the edge line and the luminance distribution when a three-dimensional object is not present in the detection area A1.

As illustrated in part (a) of FIG. 25, an assumption is made that a the attention line La set on the tire rubber portion of the adjacent vehicle V2 has been determined to be an edge line in the bird's-eye view image. In this case, the change in luminance on the attention line La in the bird's-eye view image is gradual. This is due to the image captured by the camera 10 being converted in viewpoint into a bird's-eye view image, whereby the tire of the adjacent vehicle is enlarged within the bird's-eye view image. On the other hand, the attention line La set in the white character portion "50" drawn on the road surface in the bird's-eye view image is assumed to have been erroneously assessed to be an edge line, as illustrated in part (b) of FIG. 25. In this case, the change in the luminance of the attention line La in the bird's-eye view image has considerable undulations. This is because the road and other portions of low luminance are mixed with the portions of high luminance in the white characters on the edge line.

The three-dimensional object assessment unit 33a assesses whether an edge line has been detected by an erroneous assessment based on the differences in the luminance distribution on the attention line La as described above. For example, a three-dimensional object included in a captured image tends to appear in an enlarged state in a bird's-eye view image when the captured image acquired by the camera 10 is converted into a bird's-eye view image. As described above, when the tire of an adjacent vehicle V2 is enlarged, the changes in the luminance of the bird's-eye view image in the enlarged direction tend to be small because the tire as a single location is enlarged. In contrast, when a character or the like drawn on the road surface has been erroneously assessed to be an edge line, areas such as the character portion having high luminance and areas such as the road surface portion having low luminance are included in the bird's-eye view image in an intermixed fashion. In such a case, the changes in luminance in the enlarged direction tend to be greater. Accordingly, the three-dimensional object detection unit 33a determines that the edge line has been detected by an erroneous assessment when the change in luminance along the edge line is at a predetermined threshold value tb or greater and determines that the edge line is not attributable to a three-dimensional object. A reduction in the precision for detecting a three-dimensional object is thereby suppressed when white characters such as a "50" on the road surface, roadside vegetation, and the like are assessed to be edge lines. On the other hand, the three-dimensional object detection unit 33a determines that an edge line is the edge line of a three-dimensional object and determines that a three-dimensional object is present when the changes in luminance along the edge line are less than a predetermined threshold value tb.

Specifically, the three-dimensional object detection unit 33a calculates the change in luminance of the edge line using formula 4 or 5 noted below. The change in luminance of the edge line corresponds to the evaluation value in real space in the perpendicular direction. Formula 4 evaluates the luminance distribution using the total value of the square of the difference between the $i^{th}$ luminance value I(xi, yi) and the adjacent $i^{th}$+1 luminance value I(xi+1, yi+1) on the attention line La. Formula 5 evaluates the luminance distribution using the total value of the absolute value of the difference between the $i^{th}$ luminance value I(xi, yi) and the adjacent $i^{th}$+1 luminance value I(xi+1, yi+1) on the attention line La.

Evaluation value in the perpendicular equivalent direction=$\Sigma[\{I(xi, yi)-I(xi+1, yi+1)\}_2]$ Formula 4

Evaluation value in the perpendicular equivalent direction=$\Sigma|I(xi, yi)-I(xi+1, yi+1)|$ Formula 5

No limitation is imposed in the use of formula 5, and binarizing an attribute b of an adjacent luminance value using a threshold value t2 is possible; then, the binarized attribute b for all of the attention points Pa are added, as in formula 6 noted below.

Evaluation value in the perpendicular equivalent direction=$\Sigma b(xi, yi)$

However, when |I(xi, yi)−I(xi+1, yi+1)|>t2

$b(xi, yi)=1$ when the above does not hold true.

$b(xi, yi)=0$ Formula 6

The attribute b(xi, yi) of the attention point Pa(xi, yi) is '1' when the absolute value of the luminance difference between the luminance value of the attention point Pai and the luminance value of the reference point Pri is greater than a threshold value t2. When the above relationship does not hold true, the attribute b(xi, yi) of the attention point Pai is '0.' The threshold value t2 is set in advance by experimentation or by another means so that the attention line La is not assessed to be on the same three-dimensional object. The three-dimensional object detection unit 33a then adds the attribute b for all of the attention points Pa on the attention line La and determines the evaluation value in the perpendicular equivalent direction to thereby assess whether an edge line is attributable to a three-dimensional object and whether a three-dimensional object is present.

The threshold value changing unit 37a changes the edge threshold value t described above based on the final edge intensity that is calculated by the edge intensity calculation unit 36. Specifically, the threshold value changing unit 37a determines that the lens is more clouded as the final edge intensity decreases and changes the edge threshold value t in the detection areas A1, A2 to a lower value. Therefore, detecting a three-dimensional object becomes easier even when the lens is clouded, and as a result, detecting an adjacent vehicle V2 becomes easier. On the other hand, the threshold value changing unit 37a determines that the lens is less clouded as the final edge intensity increases and changes the edge threshold value t in the detection areas A1, A2 to a higher value. Accordingly, suppressing noise or the like becomes easier, and as a result, effectively preventing an erroneous detection of a three-dimensional object is possible.

Figure 26:
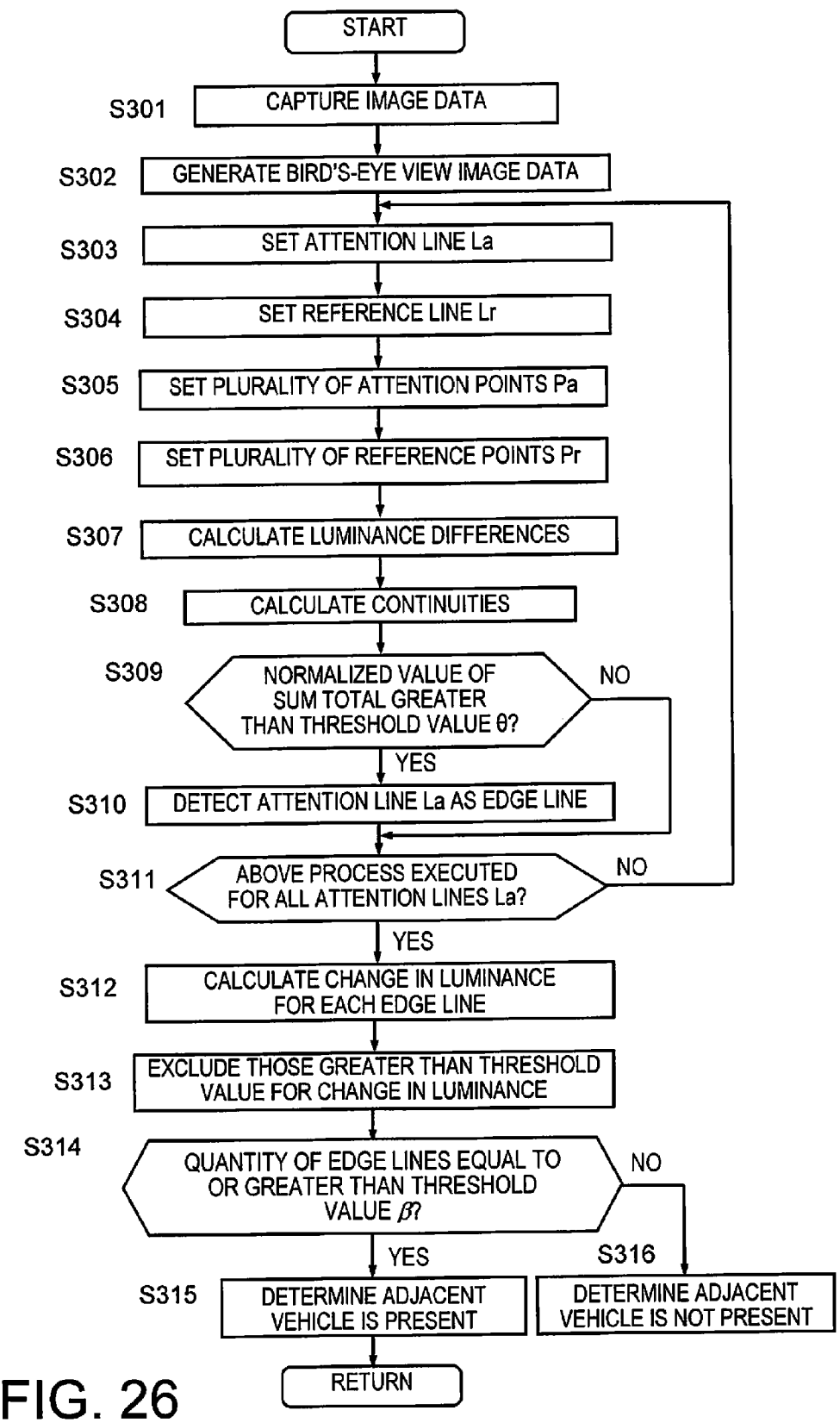
FIG. 26 is a flowchart illustrating the method for detecting an adjacent vehicle according to the second embodiment.

Next, the method for detecting an adjacent vehicle according to the second embodiment will be described with reference to FIG. 26. FIG. 26 is a flowchart illustrating the details of the method for detecting an adjacent vehicle according to the second embodiment. In FIG. 26, the operation associated with detection area A1 will be described for the sake of convenience, but the same operation is also executed for the detection area A2.

In Step S301, a predetermined area specified by the view angle a and the attachment position is captured by the camera 10, and the image data of the captured image P captured by the camera 10 is acquired by the computer 30a. Next, the viewpoint conversion unit 31 converts the viewpoint of the acquired image data and generates the bird's-eye view image data in Step S302.

Next, in Step S303, the luminance difference calculation unit 38 sets the attention line La on the detection area A1. At this time, the luminance difference calculation unit 38 sets a line corresponding to a line extending in the perpendicular direction in real space as the attention line La. Next, in Step S304, the luminance difference calculation unit 38 sets the reference line Lr on the detection area A1. The luminance difference calculation unit 38 sets as the reference line Lr a line that corresponds to a line extending in the perpendicular direction in real space and a line that is also separated by a predetermined distance in real space from the attention line La.

Next, the luminance difference calculation unit 38 sets a plurality of attention points Pa on the attention line La in Step S305. At this time, the luminance difference calculation unit 38 sets a certain number of attention points Pa that will not be problematic for the edge line detection unit 39 during edge detection. The luminance difference calculation unit 38 subsequently sets the reference points Pr so that the attention points Pa and the reference points Pr have the same height in real space in Step S306. The attention points Pa and the reference points Pr thereby substantially line up in the horizontal direction, and the edge line extending in the perpendicular direction in real space is more readily detected.

Next, in Step S307, the luminance difference calculation unit 38 calculates the luminance difference between the attention points Pa and the reference points Pr at the same height in real space. The edge line detection unit 39 then calculates the attribute s of each attention point Pa based on the luminance difference calculated by the luminance difference calculation unit 38 in accordance with formula 1 described above. In the present embodiment, the attribute s of each attention point Pa is calculated using the edge threshold value t for detecting the edges of a three-dimensional object. This edge threshold value t may be changed in the threshold value changing process mentioned below; in the case that the edge threshold value t is changed, the changed edge threshold value will be used in this Step S307.

In Step S308, the edge line detection unit 39 then calculates the continuity c of the attribute s of the attention points Pa in accordance with formula 2. In Step S309, the edge line detection unit 39 further assesses whether a value obtained by normalizing the sum of the continuity c is greater than a threshold value $\theta$ in accordance with formula 3 described above. When a determination has been made that the normalized value is greater than the threshold value $\theta$ (Step S309=Yes), the edge line detection unit 39 detects the attention line La as the edge line in Step S310. The operation then proceeds to Step S311. When a determination has been made that the normalized value is not greater than the threshold value $\theta$ (S309: No), the edge line detection unit 39 does not detect that the attention line La is an edge line, and the operation proceeds to Step S311.

In Step S311, the computer 30a determines whether the operations of Steps S303 to S310 have been executed for all of the attention lines La that can be set on the detection area A1. When a determination has been made that the above operations have not been carried out for all of the attention lines La (Step S311=No), the operation returns to Step S303, sets a new attention line La, and repeats the operation through Step S311. On the other hand, when a determination has been made that the operations have been carried out for all of the attention lines La (Step S311=Yes), the operation proceeds to Step S312.

In Step S312, the three-dimensional object detection unit 33a calculates the change in luminance along the edge line for each edge line detected in Step S310. The three-dimensional object detection unit 33a calculates the change in luminance of the edge lines in accordance with any of formulas 4, 5, and 6. Next, in Step S313, the three-dimensional object detection unit 33a excludes, from among the edge lines, the edge lines for which the change in luminance is at a predetermined threshold value tb or greater. In other words, when an edge line having a large change in luminance is not assessed to be a correct edge line, the edge line is not used for detecting a three-dimensional object. As described above, this is done in order to prevent the detection of characters on the road surface, roadside vegetation, and the like included in the detection area A1 from being determined to be edge lines. Therefore, the predetermined threshold value tb is determined by experimentation or by another means in advance and is set based on the change in luminance that occurs due to the characters on the road surface, roadside vegetation, and the like. On the other hand, the three-dimensional object detection unit 33a determines that an edge line having a change in luminance that is less than a predetermined threshold value tb is an edge line of a three-dimensional object and thereby detects the three-dimensional object present in an adjacent lane.

Next, in Step S314, a determination is made by the three-dimensional object assessment unit 33a regarding whether the quantity of edge lines is a predetermined threshold value $\beta$ or higher. Here, the threshold value $\beta$ is set in advance by experimentation or by another means; for example, when a four-wheel vehicle is set as the three-dimensional object to be detected, the threshold value $\beta$ is set in advance by experimentation or by another means based on the number of edge lines of a four-wheel vehicle that appeared in the detection area A1. When an assessment has been made that the quantity of edge lines is at the threshold value $\beta$ or greater (S314: Yes), the three-dimensional object detection unit 33a determines that a three-dimensional object is present in the detection area A1, the operation proceeds to Step S315, and an assessment is made that an adjacent vehicle is present. On the other hand, when an assessment has been made that the quantity of edge lines is not at the threshold value $\beta$ or greater (S314=No), the three-dimensional object detection unit 33a determines that a three-dimensional object is not present in the detection area A1, the operation proceeds to Step S316, and an assessment is made that an adjacent vehicle is not present within the detection area A1.

Figure 27:
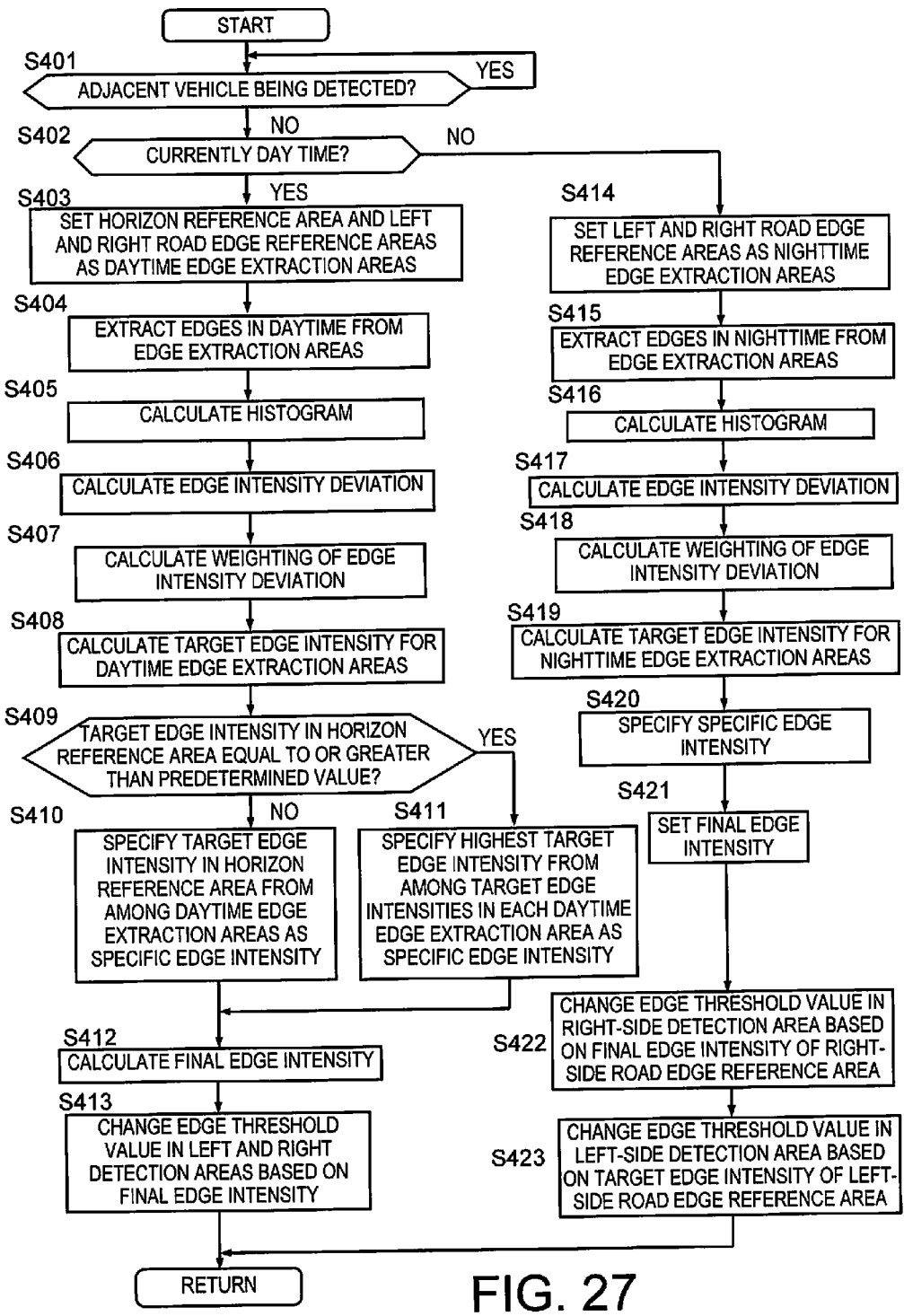
FIG. 27 is a flowchart illustrating the threshold value changing process according to the second embodiment.

Described next with reference to FIG. 27 is a threshold value changing process according to the second embodiment. The threshold value changing process according to the second embodiment is carried out in parallel with the adjacent vehicle detection process illustrated in FIG. 26 in the same way as in the first embodiment. Additionally, this threshold value changing process is for changing the edge threshold value t for detecting a three-dimensional object so that an adjacent vehicle V2 can be appropriately detected even when the lens is clouded. Accordingly, the edge threshold value t that is changed in this threshold value changing process will be used when detecting the edges of an adjacent vehicle V2 in the adjacent vehicle detection process illustrated in FIG. 26. FIG. 27 is a flowchart illustrating the threshold value changing process according to the second embodiment.

In Step S401, in the same way as Step S201 of the first embodiment, a determination is made regarding whether or not an adjacent vehicle V2 is being detected; when an adjacent vehicle V2 is being detected, the operation waits in Step S401; when an adjacent vehicle V2 is not being detected, the operation proceeds to Step S402, as illustrated in FIG. 27 Then, in Step S402, in the same way as Step S202 in the first embodiment, an assessment is made regarding whether the present is daytime or nighttime; when an assessment has been made that the present is daytime, the operation proceeds to Step S403; when an assessment has been made that the present is nighttime, the operation proceeds to Step S414.

In Steps S403 to S412, the same operation as that in Steps S203 to S212 in the first embodiment is executed. That is, the daytime edge extraction area is first set (Step S403), and the edges of the subject are extracted from the horizon reference area and the pair of left and right road edge reference areas, which are the daytime edge extraction areas (Step S404).

Next, histograms based on the intensity of the extracted edges are generated for the horizon reference area and each of the pair of left and right road edge reference areas (Step S405), and the calculation of the edge intensity deviation Sσ (Step S406) and the calculation of the weighting for the edge intensity deviation Sσ (Step S407) are conducted for the horizon reference area and the pair of left and right road edge reference areas.

Then, the intensity of the edges in the horizon reference area and the pair of left and right road edge reference areas is calculated as the target edge intensity, based on the weighting for the edge intensity deviation Sσ (Step S408); then, a determination is made regarding whether the target edge intensity in the horizon reference area is a predetermined value or greater (Step S409). When the target edge intensity in the horizon reference area is a predetermined value or greater (Step S409=Yes), the target edge intensity in the horizon reference area from among the daytime edge extraction areas is specified as the specific edge intensity (Step S410). On the other hand, when the target edge intensity in the horizon reference area is less than the predetermined value (Step S409=No), the highest target edge intensity, from among the target edge intensities in the horizon reference area and the pair of left and right road edge reference areas, is specified as the specific edge intensity (Step S411). The final intensity of the edges in the edge extraction area is then calculated as the final edge intensity based on the specific edge intensity that is specified (Step S412).

In Step S413, the threshold value changing unit 37a changes the edge threshold value t in the pair of left and right detection areas A1, A2 based on the final edge intensity calculated in Step S412. Specifically, the threshold value changing unit 37a determines that the lens is more clouded as the final edge intensity decreases and changes the edge threshold value t in the detection areas A1, A2 to a lower value. Therefore, detecting a three-dimensional object even when the lens is clouded becomes easier, and as a result, detecting an adjacent vehicle V2 becomes easier. On the other hand, the threshold value changing unit 37a determines that the lens is less clouded as the final edge intensity increases and changes the edge threshold value t in the detection areas A1, A2 to a higher value. Accordingly, suppressing noise or the like becomes easier, and as a result, effectively preventing an erroneous detection of a three-dimensional object is possible.

When an assessment has been made that the present is nighttime in Step S402, the operation proceeds to Step S414. In Steps S414 to S421, the same operation as that in Steps S214 to S221 in the first embodiment is executed. That is, the left-side road edge reference area and the right-side road edge reference area, which reference the left and right road edges, are set as the nighttime edge extraction areas (Step S414), and the edges of the subject are extracted from the pair of left and right road edge reference areas, which are set as the nighttime edge extraction areas (Step S415), as illustrated in FIG. 11. Then, histograms corresponding to each of the pair of left and right road edge reference areas are generated based on the edges that have been extracted from the pair of left and right road edge reference areas, as illustrated in FIG. 15 (Step S416); the edge intensity deviation Sσ is calculated (Step S417) for each of the pair of left and right road edge reference areas; and the weightings for these edge intensity deviations Sσ are calculated (Step S418). Then, as illustrated in FIG. 16, the intensities of the edges in the left-side road edge reference area and the right-side road edge reference area that have been set as the nighttime edge extraction areas are calculated as the target edge intensities, based on the calculated weightings of the edge intensity deviations Sσ (Step S419).

Specifically, from among the pair of left and right road edge reference areas that are set as the nighttime edge extraction areas, the target edge intensity in the left-side road edge reference area is set as the specific edge intensity for setting the difference threshold th in the left-side detection area A2, and the target edge intensity in the right-side road edge reference area is set as the specific edge intensity for setting the difference threshold th in the right-side detection area A1 (Step S420). Next, the final edge intensity for setting the difference threshold th in the right-side detection area A1 and the final edge intensity for setting the difference threshold th in the left-side detection area A2 are calculated, giving consideration to the specific edge intensity that was calculated in the past (Step S421).

In Step S422, the threshold value changing unit 37a calculates the edge threshold value t in the right-side detection area A1 based on the final edge intensity in the right-side road edge reference area calculated in Step S421 and sets the edge threshold value th in the right-side detection area A1, as illustrated in FIG. 17. In the subsequent Step S423, the threshold value changing unit 37a calculates the edge threshold value t in the left-side detection area A2 based on the final edge intensity in the left-side road edge reference area calculated in Step S421 and sets the edge threshold value t in the left-side detection area A2, as illustrated in FIG. 17.

As described above, in the second embodiment, when the edges of the subject are detected in the detection areas A1, A2 and an adjacent vehicle V2 is detected based on the edges, an area from which a predetermined quantity of edges can be expected to be extracted during the daytime or the nighttime is set as an edge extraction area, and an edge threshold value t is calculated based on the intensity of the edges extracted from the edge extraction area. In the second embodiment, in addition to the effect of the first embodiment, the edge threshold value t can thereby be set to an appropriate value corresponding to the turbidity of the lens, even when detecting an adjacent vehicle V2 based on the edges; as a result, appropriately detecting a three-dimensional object even when the lens is clouded is possible.

Embodiment 3

Figure 28:
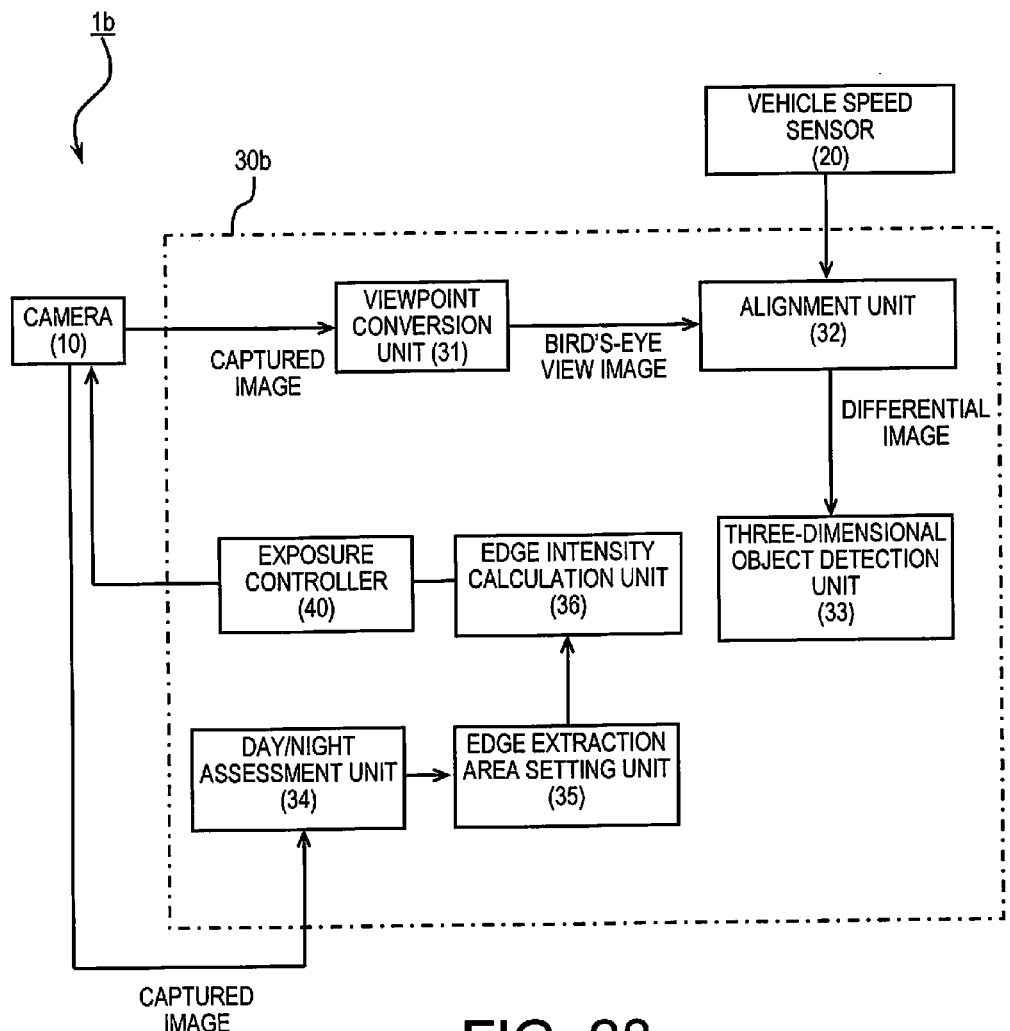
FIG. 28 is a block view illustrating the details of a computer according to the third embodiment.

Described next is a three-dimensional object detection device 1b according to the third embodiment. The three-dimensional object detection device 1b according to the third embodiment is the same as that in the first embodiment, except that a computer 30b is provided in lieu of the computer 30 of the first embodiment, as illustrated in FIG. 28; the operation is as described below. Here, FIG. 28 is a block view illustrating the details of the computer 30b according to the third embodiment.

The computer 30b according to the third embodiment assesses whether or not the lens is clouded and conducts exposure control of the camera 10 according to the turbidity of the lens in order to appropriately detect a three-dimensional object even when the lens of the camera 10 is clouded (when white thin film caused by a water stain or the like has formed on the lens surface). In order to realize this type of function, the computer 30b is provided with an exposure controller 40 in lieu of the threshold value changing unit 37 of the computer 30 according to the first embodiment. Each of the functions of the computer 30b is described below. The viewpoint conversion unit 31, the alignment unit 32, the three-dimensional object detection unit 33, the day/night assessment unit 34, and the edge extraction area setting unit 35 are configured in the same way as in the first embodiment, so their descriptions have been omitted.

When an assessment has been made that the present is daytime, the edge intensity calculation unit 36 according to the third embodiment assesses whether the target edge intensity detected in the horizon reference area within the daytime edge extraction area is a predetermined value or greater; then, the edge intensity calculation unit specifies the target edge intensity detected in the horizon reference area as a specific edge intensity that is used for exposure control when the target edge intensity detected in the horizon reference area is a predetermined value or greater. On the other hand, when the target edge intensity detected in the horizon reference area is less than the predetermined value, the edge intensity calculation unit 36 specifies the highest target edge intensity from among the target edge intensities detected in the horizon reference area and the pair of left and right road edge reference areas as the specific edge intensity that is used for exposure control.

When a determination has been made that the present is nighttime, the edge intensity calculation unit 36 specifies the target edge intensity in the left-side road edge reference area from among the pair of left and right road edge reference areas that have been set as the nighttime edge extraction areas as the specific edge intensity for setting the exposure for the left-side detection area A2; then, the edge intensity calculation unit specifies the target edge intensity in the right-side road edge reference area as the specific edge intensity for setting the exposure for the right-side detection area A1.

As described above, when, during the nighttime, a light source such as a street light is present on the right side of the host vehicle V1 while a light source is not present on the left side of the host vehicle V1, the light environment will differ greatly between the left and right detection areas A1, A2, and the ease with which a three-dimensional object can be detected will also differ greatly due to this type of light environment surrounding the host vehicle V1. Accordingly, in the present embodiment, obtaining an appropriate exposure according to the light environment in each of the pair of left and right detection areas A1, A2 is possible by specifying the target edge intensity in the left-side road edge reference area as the specific edge intensity for setting the exposure for the left-side detection area A2 and by specifying the target edge intensity in the right-side road edge reference area as the specific edge intensity for setting the exposure for the right-side detection area A1; therefore, the detection of a three-dimensional object can be carried out with a high degree of precision.

The exposure controller 40 conducts exposure control of the camera 10 based on the final edge intensity calculated by the edge intensity calculation unit 36. Specifically, the exposure controller 40 first calculates the exposure control value for controlling the exposure of the camera 10 based on the final edge intensity calculated by the edge intensity calculation unit 36. The exposure controller 40 then sets the exposure of the camera 10 to an appropriate exposure corresponding to the turbidity of the lens by setting the aperture, ISO sensitivity, and the exposure time (or the shutter speed) of the camera 10, based on the calculated exposure control value.

The exposure control value is a value for controlling the exposure of the camera 10, and the exposure controller 40 decreases the aperture value (opening the aperture to the open side), increases the ISO sensitivity, or lengthens the exposure time as the exposure control value increases. Accordingly, the higher the exposure control value, the more that the exposure amount of the imaging element in relation to the light flux from the subject increases, and clearly capturing the image of the three-dimensional object becomes possible. The exposure controller 40 can be configured to control one of the aperture values, the ISO sensitivity, or the exposure time based on the exposure control value; this exposure controller can also be configured to control the aperture value, the ISO sensitivity, and the exposure time simultaneously.

Figure 29:
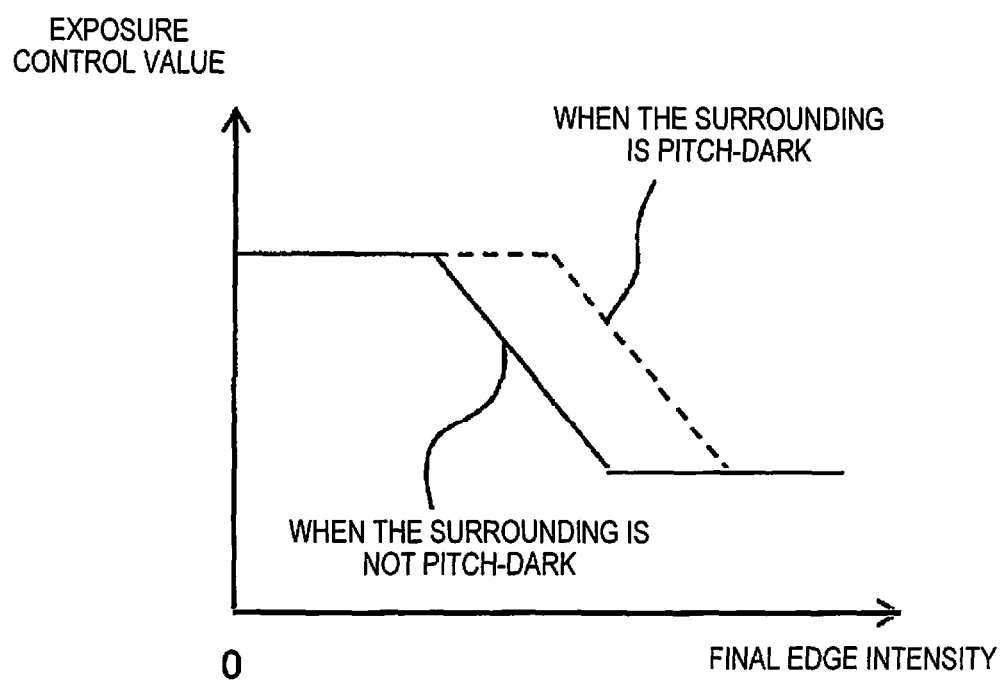
FIG. 29 is a view illustrating an example of the relationship between the final edge intensity and the exposure control value.

The exposure controller 40 determines that the lens is more clouded as the final edge intensity decreases and changes the exposure control value to a high value, as illustrated in FIG. 29. Therefore, detecting a three-dimensional object even when the lens is clouded becomes easier, and as a result, appropriately detecting an adjacent vehicle V2 is possible. On the other hand, the exposure controller 40 determines that the lens is less clouded as the final edge intensity increases and changes the exposure control value to a low value. Accordingly, noise can be effectively suppressed, and as a result, effectively preventing an erroneous detection of a three-dimensional object is possible. FIG. 29 is a view illustrating one example of the relationship between the exposure control value and the final edge intensity.

The exposure controller 40 may possibly individually control the exposure of the image areas that correspond to the pair of left and right detection areas A1, A2. For example, the exposure controller 40 can individually control the exposures for the image areas that correspond to the pair of left and right detection areas A1, A2 by mutually differentiating the exposure time in the image areas corresponding to the pair of left and right detection areas A1, A2.

Additionally, when the surrounding is pitch-dark, detecting the edges of the subject is difficult, and the final edge intensity tends to be calculated low; therefore, there are cases in which an erroneous assessment that the lens is clouded is made and the exposure control value is calculated to be a high value even if the lens is not actually clouded; as a result, an erroneous detection of a three-dimensional object occurs due to noise and the like. Accordingly, when a determination can be made that the luminance of the surrounding is ultra-low luminance and that the surrounding is pitch-dark, the exposure controller 40 changes the relationship between the exposure control value and the final edge intensity so that the exposure control value is calculated at a relatively low value, even when the final edge intensity is relatively low, as compared to when the surrounding is not pitch-dark, as illustrated in FIG. 17. Therefore, effectively preventing the occurrence of an erroneous detection of a three-dimensional object when the surrounding is pitch-dark is possible. The exposure controller 40 is able to assess that the surrounding is pitch-dark when the luminance of the entire captured image is equal to or less than a predetermined luminance with which a determination can be made that the surrounding is pitch-dark.

Figure 30:
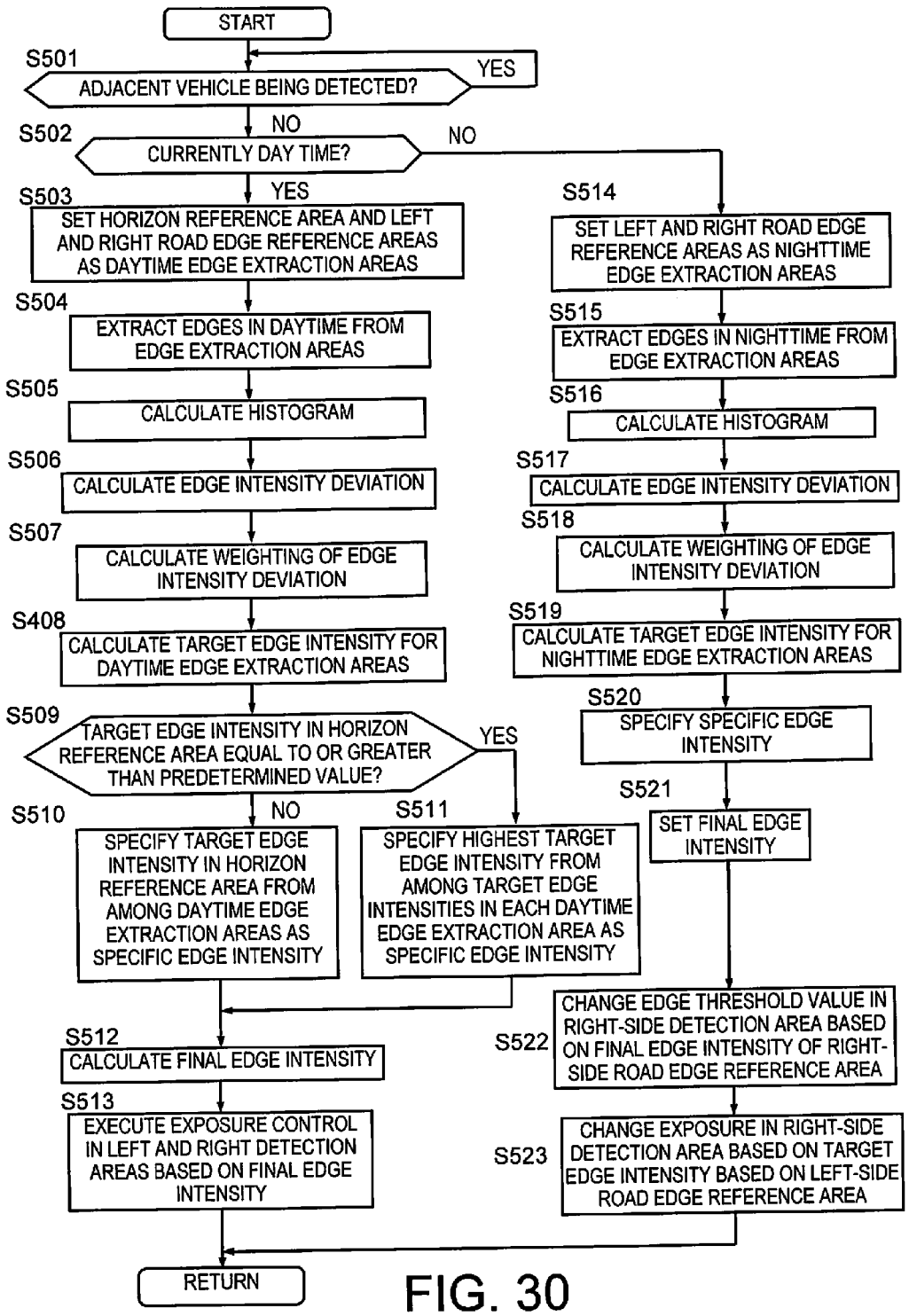
FIG. 30 is a flowchart illustrating the exposure control process according to the third embodiment.

Described next with reference to FIG. 30 is an exposure control process according to the third embodiment. FIG. 30 is a flowchart illustrating the exposure control process according to the third embodiment. The exposure control process described below is carried out in parallel with the adjacent vehicle detection process illustrated in FIG. 18. The camera 10 is therefore set with the exposure that has been set by this exposure control process; as a result, the adjacent vehicle detection process illustrated in FIG. 18 is conducted based on the captured image data that has been captured with the exposure that has been set in this exposure control process.

In Steps S501 to S512, in the same way as in Steps S201 to S212 in the first embodiment, when an assessment has been made that the present is daytime (Step S502=Yes), the horizon reference area that references the horizon near the vanishing point and the pair of left and right road edge reference areas that reference the road edge are set as the daytime edge extraction areas (Step S503), and the edges of the subject are extracted from the daytime edge extraction areas (Step S504). The intensity of the edges in the daytime edge extraction areas is then calculated as the target edge intensity (Step S508), and the final edge intensity is calculated based on the target edge intensity (Step S512).

In Step S513, the exposure controller 40 conducts exposure control of the camera 10 based on the final edge intensity that is calculated in Step S512. Specifically, the exposure controller 40 determines that the lens is more clouded as the final edge intensity decreases and calculates the exposure control value at a high value; the exposure controller determines that the lens is less clouded as the final edge intensity increases and calculates the exposure control value at a low value, as illustrated in FIG. 29. The exposure controller 40 then decreases the aperture value (the opening of the aperture to the open side), increases the ISO sensitivity, or lengthens the exposure time as the calculated exposure control value increases, thereby increasing the exposure amount of the camera 10 (the imaging element) in relation to the light flux from the subject. Therefore, the camera 10 can clearly capture the three-dimensional object, and as a result, appropriately detecting a three-dimensional object in the adjacent vehicle detection process, as illustrated in FIG. 18, is possible even when the lens is clouded. On the other hand, the exposure controller 40 increases the aperture value (the closing of the aperture to the closed side), decreases the ISO sensitivity, or shortens the exposure time as the calculated exposure control value decreases, thereby decreasing the exposure amount of the camera 10 (the imaging element) in relation to the light flux from the subject. Accordingly, the generation of noise is suppressed, and as a result, effectively preventing an erroneous detection of a three-dimensional object is possible.

Additionally, in the present embodiment, the exposure controller 40 conducts exposure control of the camera 10 so that the same exposure can be obtained in the pair of left and right detection areas A1, A2 when an assessment has been made that the present is daytime, as in this Step S513. During the daytime, since there is little variability in the light environment surrounding the host vehicle V1, regardless of whether the exposure control value is calculated based on the edges of the horizon reference area or of the pair of left and right road edge reference areas, the exposure in the pair of left and right detection areas A1, A2 can be set based on the calculated exposure control value. Accordingly, during the daytime, calculating the exposure control value based on edges that best correspond to the turbidity of the lens from among the edges that are extracted from the horizon reference area and the pair of left and right road edge reference areas is possible, and the exposure can be set for both the right-side detection area A1 and the left-side detection area A2 based on the exposure control value; therefore, appropriately detecting a three-dimensional object in the right-side detection area A1 and the left-side detection area A2 is possible.

On the other hand, when an assessment has been made that the present is nighttime in Step S502, the operation proceeds to Step S514. In Steps S514 to S521, in the same way as in Steps S214 to S221 in the first embodiment, the left-side road edge reference area and the right-side road edge reference area that reference the left and right road edges are set as the nighttime edge extraction areas (Step S514), and the edges of the subject are extracted from the nighttime edge extraction areas (Step S515). The intensity of the edges in the nighttime edge extraction areas is then calculated as the target edge intensity (Step S519), and the final edge intensity is calculated based on the target edge intensity (Step S521).

In Step S522, the exposure controller 40 sets the exposures in the right-side detection area A1 from among the pair of left and right detection areas A1, A2; in Step S523, the exposure controller 40 sets the exposure in the left-side detection area A2 from among the pair of left and right detection areas A1, A2. Specifically, the exposure controller 40 determines that the lens is more clouded as the final edge intensity calculated in Step S521 decreases and changes the exposure control value to a high value, as illustrated in FIG. 29. By increasing the exposure control value in this manner, the aperture value becomes smaller (the aperture of the camera 10 opens to the open side), the ISO sensitivity is increased, or the exposure time is lengthened in the camera 10; therefore, detecting a three-dimensional object even when the lens is clouded becomes easier, and as a result, appropriately detecting an adjacent vehicle V2 is possible. On the other hand, the exposure controller 40 determines that the lens is less clouded as the final edge intensity increases and changes the exposure control value to a low value. Accordingly, the generation of noise is suppressed, and as a result, effectively preventing an erroneous detection of a three-dimensional object is possible.

When an assessment is being made that the present is nighttime, the exposure controller 40 calculates the exposure control value in the right-side detection area A1 based on the final edge intensity in the right-side road edge reference area calculated in Step S521 and sets the exposure in the right-side detection area A1, as illustrated in FIG. 29. Similarly, the exposure controller 40 calculates the exposure control value in the left-side detection area A2 based on the final edge intensity in the left-side road edge reference area calculated in Step S521 and sets the exposure in the left-side detection area A2, as illustrated in FIG. 29. The exposure controller 40 sets the exposure in the left-side detection area A2 and the exposure in the right-side detection area A2 separately in this manner when an assessment is being made that the present is nighttime. Accordingly, appropriately detecting a three-dimensional object even when the light environment differs in the right side and the left side of the host vehicle V1 at night is possible.

Additionally, when the surrounding is pitch-dark, the exposure controller 40 changes the relationship between the exposure control value and the final edge intensity so that the exposure control value is calculated at a relatively low value even when the final edge intensity is relatively low, as compared to when the surrounding is not pitch-dark, as illustrated by the broken line in FIG. 29. Therefore, effectively preventing the occurrence of an erroneous detection of a three-dimensional object when the surrounding is pitch-dark becomes possible, and detecting the edges of the subject due to the lens being erroneously assessed as being clouded is difficult.

As described above, in the third embodiment, during the daytime or the nighttime, an area from which a predetermined quantity of edges can be expected to be extracted is set as an edge extraction area, and exposure control of the camera 10 is conducted based on the intensity of the edges in the edge extraction area. Specifically, a determination is made that the lens is more clouded as the intensity of the edges (the final edge intensity) decreases in the edge extraction area, and the exposure amount of the camera 10 (the imaging element) in relation to the light flux from the subject increases by increasing the exposure control value, as illustrated in FIG. 29. Therefore, detecting a three-dimensional object becomes easier, and appropriately detecting a three-dimensional object even when the lens is clouded is possible. Additionally, a determination is made that the lens is more less as the intensity of the edges in the edge extraction area increases, and the exposure amount of the camera 10 (the imaging element) in relation to the light flux from the subject decreases by decreasing the exposure control value. Therefore, effectively preventing an erroneous detection of a three-dimensional object caused by noise or the like when the lens is not clouded becomes possible.

In the third embodiment, when an assessment has been made that the present is daytime, exposure control of the camera 10 is conducted so that the same exposure can be obtained in the pair of left and right detection areas A1, A2; when an assessment has been made that the present is nighttime, exposure control in the pair of left and right detection areas A1, A2 is conducted separately so that an exposure corresponding to the light environment of each of the pair of left and right detection areas A1, A2 can be obtained. Accordingly, in the third embodiment, the difference in the exposures between the pair of left and right detection areas A1, A2 when an assessment has been made that the present is daytime becomes equal to or less than the difference in the exposures between the pair of left and right detection areas A1, A2 when an assessment has been made that the present is nighttime. When an assessment has been made that the present is daytime, the difference in the light environment between the right-side detection area A1 and the left-side detection area A2 will be determined to be little, so that appropriate exposures based on the final edges can be set for both the right-side detection area A1 and the left-side detection area A2; therefore, the appropriate detection of a three-dimensional object in the right-side detection area A1 and the left-side detection area A2 is possible. When an assessment has been made that the present is nighttime, the determination will be that there are cases in which there is a considerable difference in the light environment between the right-side detection area A1 and the left-side detection area A2 due to the effect of a light source or the like; therefore, appropriately detecting a three-dimensional object according to the surrounding light environment becomes possible by conducting exposure control separately for the pair of left and right detection areas A1, A2, so that an exposure corresponding to the light environment of each of the pair of left and right detection areas A1, A2 can be obtained.

Additionally, in the third embodiment, a determination is made regarding whether or not an adjacent vehicle V2 is being detected; when an adjacent vehicle V2 is being detected, the exposure of the camera 10 (the imaging element) is maintained, regardless of the intensity of the edges calculated in the edge extraction area (that is, changing the exposure of the camera 10 based on the edge intensity is prohibited). Therefore, reducing the effect of the edges attributable to an adjacent vehicle V2 is possible when assessing the turbidity of the lens by calculating the intensity of the edges in an edge extraction area that references the horizon, the road edge, and the like; as a result, appropriately detecting the intensity of the edges according to the turbidity of the lens is possible.

Embodiment 4

Figure 31:
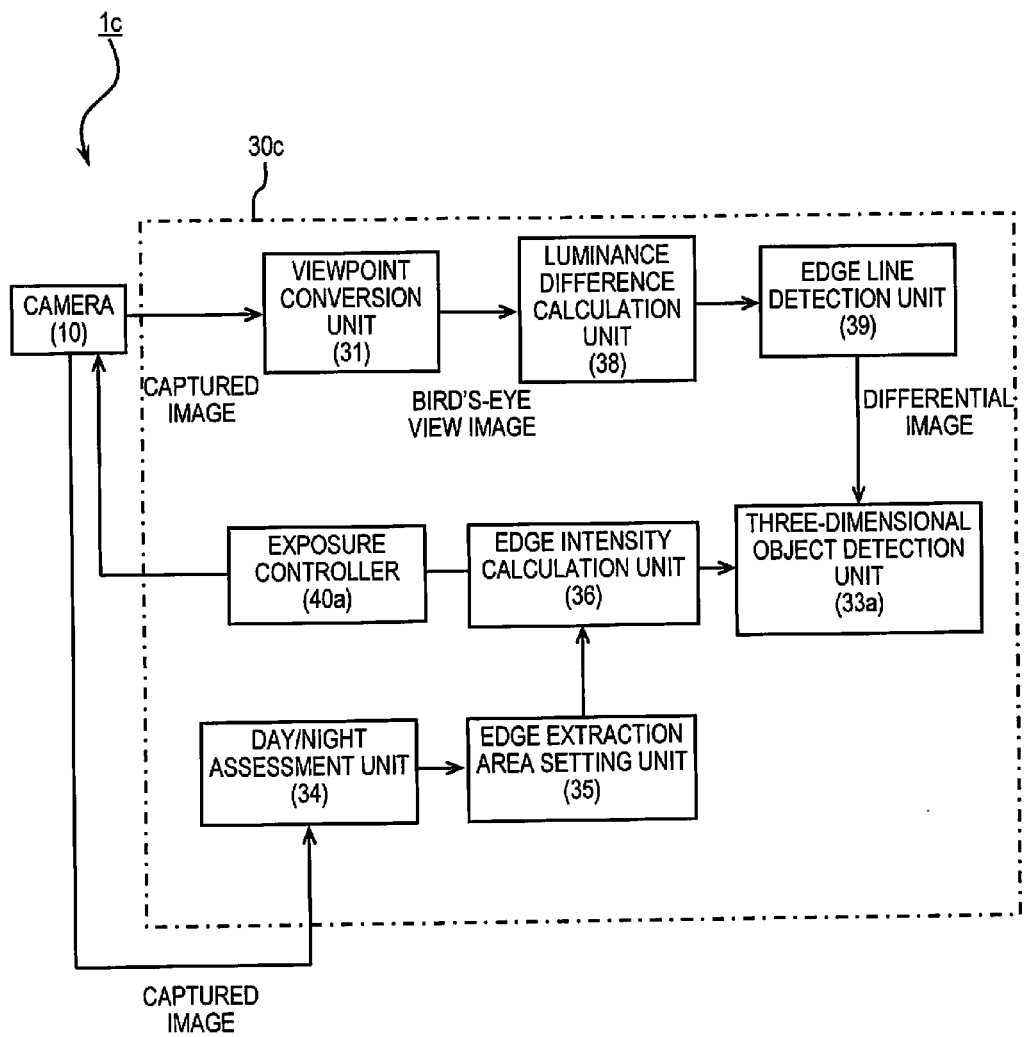
FIG. 31 is a block view illustrating the details of a computer according to the fourth embodiment.

Described next is a three-dimensional object detection device 1c according to the fourth embodiment. The three-dimensional object detection device 1c according to the fourth embodiment is the same as that in the second embodiment, except that a computer 30c is provided in lieu of the computer 30a of the second embodiment, as illustrated in FIG. 31; the operation is as described below. Here, FIG. 31 is a block view illustrating the details of the computer 30c according to the fourth embodiment.

The computer 30c according to the fourth embodiment is provided with an exposure controller 40a in lieu of the threshold value changing unit 37 of the computer 30a according to the second embodiment. The viewpoint conversion unit 31, the luminance difference calculation unit 38, the edge line detection unit 39, the three-dimensional object detection unit 33a, the day/night assessment unit 34, the edge extraction area setting unit 35, and the edge intensity calculation unit 36 are configured in the same way as in the second embodiment; the exposure controller 40 is configured in the same way as in the third embodiment; therefore, the descriptions thereof have been omitted.

In the fourth embodiment, the adjacent vehicle detection process illustrated in FIG. 26 is executed in the same way as in the second embodiment. Then, the exposure control process illustrated in FIG. 30 is executed in the same way as in the third embodiment in conjunction with the adjacent vehicle detection process illustrated in FIG. 26; captured image data is captured with the exposure set by this exposure control process; and the adjacent vehicle detection process is conducted based on the captured image data. Accordingly, in the fourth embodiment as well, capturing a three-dimensional object with an appropriate exposure corresponding to the turbidity of the lens is possible; as a result, appropriately detecting a three-dimensional object based on the captured image is possible even when the lens is clouded. The adjacent vehicle detection process and the exposure control process according to the fourth embodiment are the same processes as the adjacent vehicle detection process according to the second embodiment and the exposure control process according to the third embodiment; therefore, the description thereof have been omitted.

As described above, in the fourth embodiment, when the edges of the subject are detected in the detection areas A1, A2 and an adjacent vehicle V2 is detected based on the edges, an area from which a predetermined quantity of edges can be expected to be extracted during the daytime or the nighttime is set as an edge extraction area, and exposure control of the camera 10 is conducted based on the intensity of the edges extracted from the edge extraction area. In the fourth embodiment, in addition to the effect of the third embodiment, the exposure of the camera 10 can thereby be set to an appropriate exposure corresponding to the turbidity of the lens even when detecting an adjacent vehicle V2 based on the edges; as a result, appropriately detecting a three-dimensional object even when the lens is clouded is possible.

The embodiments described above have been described in order to facilitate an understanding of the present invention, and they are not intended to limit the present invention. Therefore, the elements disclosed in the embodiments above are intended to include all design modifications and equivalents thereto that lie within the technical range of the present invention.

For example, in the first and second embodiments described above, an example configuration was provided in which the difference threshold th or the edge threshold value t are changed based on the intensity of the edges (the final edge intensity) in the daytime edge extraction areas or in the nighttime edge extraction areas; however, no limitation is imposed thereby; for example, there is the possibility of using a configuration in which the values of a threshold value α and a threshold value β for detecting a three-dimensional object are changed in lieu of the difference threshold th and the edge threshold value t or in addition to the difference threshold th and the edge threshold value t. Alternatively, there is also the possibility of using a configuration in which a threshold value θ and a threshold value t2 for detecting the edge lines are changed or a configuration in which a threshold value tb is changed, based on the intensity of the edges (the final edge intensity) in the daytime edge extraction areas or the nighttime edge extraction areas. Additionally, there is the possibility of using a configuration in which the pixel value or the luminance value output from each pixel is changed, based on the intensity of the edges (the final edge intensity) in the daytime edge extraction areas or the nighttime edge extraction areas. For example, the detection of a three-dimensional object can be promoted by determining that the lens is more clouded as the final edge intensity decreases and by increasing the pixel value or the luminance value that is output from each pixel.

In the embodiments described above, an example configuration was provided in which a three-dimensional object is detected as an adjacent vehicle V2 when the travelling speed of the three-dimensional object satisfies a predetermined condition; however, no limitation is imposed thereby; for example, there is also the possibility of using a configuration in which the detection of an adjacent vehicle V2 is suppressed by changing the condition mentioned above based on the intensity of the edges (the final edge intensity) in the daytime edge extraction areas or the nighttime edge extraction areas. For example, in the embodiments described above, a three-dimensional object is determined to be an adjacent vehicle V2 when the absolute travelling speed of the three-dimensional object is 10 km/h or more and the relative travelling speed of the three-dimensional object in relation to the host vehicle V1 is +60 km/h or less; however, the detection of an adjacent vehicle V2 can be promoted by determining that the lens is clouded when the final edge intensity is low and, for example, by determining that a three-dimensional object is an adjacent vehicle V2 when the absolute travelling speed of the three-dimensional object is 5 km/h or more and the relative travelling speed of the three-dimensional object in relation to the host vehicle V1 is +65 km/h or less.

In addition to the embodiment described above, there is also the possibility of using a configuration in which a turbidity index indicating the turbidity of the lens is provided as a parameter for detecting a three-dimensional object; when various controls for detecting a three-dimensional object are conducted based on the turbidity index, this turbidity index is calculated based on the final edge intensity in the daytime edge extraction areas or the nighttime edge extraction areas. Since the clouding of the lens progresses over a relatively long period of time, when calculating the turbidity index based on the final edge intensity in the daytime edge extraction areas or the nighttime edge extraction areas, calculating an average value and a standard deviation of a plurality of specific edge intensities obtained over a relatively long period of time is preferable, and using the value adding the average value and the standard deviation of the calculated specific edge intensities as the final edge intensity for calculating the turbidity index is preferable.

Additionally, in the embodiments described above, an example configuration was provided in which the target edge intensity is calculated when an adjacent vehicle V2 is being detected; however, no limitation is imposed thereby; for example, there is also the possibility of using a configuration in which the value of the calculated target edge intensity changes between when an adjacent vehicle V2 is being detected and when an adjacent vehicle V2 is not being detected. Specifically, using a configuration in which the target edge intensity is calculated at a low value when an adjacent vehicle V2 is being detected, as compared to when an adjacent vehicle V2 is not being detected, is possible. Therefore, reducing the effect of the edges attributable to an adjacent vehicle V2 when calculating the intensity of the edges based on the horizon, the road edge, and the like is possible, and appropriately detecting the intensity of the target edge intensity corresponding to the turbidity of the lens is possible.

The camera 10 in the embodiments described above corresponds to the image capturing means of the present invention. The viewpoint conversion unit 31 corresponds to the image conversion means of the present invention; and the alignment unit 32, the three-dimensional object detection units 33, 33a, the luminance difference calculation unit 38, and the edge line detection unit 39 correspond to the three-dimensional object detection means of the present invention. The edge extraction area setting unit 35 and the edge intensity calculation unit 36 correspond to the first edge intensity calculation means and the second edge intensity calculation means of the present invention; the day/night assessment unit 34 corresponds to the day/night assessment means of the present invention; and the threshold value changing units 37, 37a and the exposure controllers 40, 40a correspond to the control means of the present invention.

The invention claimed is:

1. A three-dimensional object detection device comprising:
    an image capturing device mounted on a host vehicle, and comprising a lens for capturing images behind the host vehicle;
    a three-dimensional object detection unit programmed to detect a presence of a three-dimensional object rearward of the host vehicle based on captured images captured by the image capturing device;
    a first edge intensity calculation unit programmed to extract edges of a subject in a first edge extraction area that includes at least a horizon reference area that references a horizon near a vanishing point of a road and to calculate an intensity of the edges in the first edge extraction area as a first edge intensity based on a distribution of the edges extracted from the first edge extraction area, the horizontal reference area being area including the horizon as well as an area from which extraction of a predetermined quantity of edges is expected in an image area corresponding to the horizon;
    a second edge intensity calculation unit programmed to extract edges of a subject in a second edge extraction area that includes at least a road edge reference area that references a road edge, and to calculate an intensity of the edges in the second edge extraction area as a second edge intensity based on a distribution of the edges that are extracted from the second edge extraction area;

a day/night assessment unit programmed to assess whether currently daytime or nighttime exists; and a controller programmed to control detection of the three-dimensional object by the three-dimensional object detection unit based on the first edge intensity in the first edge extraction area when an assessment has been made that daytime currently exists by the day/night assessment unit, and programmed to control the detection of the three-dimensional object by the three-dimensional object detection unit based on the second edge intensity in the second edge extraction area when an assessment has been made that nighttime currently exists.

2. The three-dimensional object detection device according to claim 1, further comprising an image conversion unit programmed to perform viewpoint conversion of the captured images obtained by the image capturing device into bird's-eye view images;

the three-dimensional object detection unit being programmed to detect a presence of a three-dimensional object based on differential waveform information when a peak value of the differential waveform information is equal to or greater than a predetermined second threshold value, and in which the differential waveform information is generated by aligning in bird's-eye view positions of the bird's-eye view images obtained at different times by the image conversion unit in bird's-eye view, and counting a number of pixels that indicate a predetermined difference of equal to or greater than a first threshold value to form a frequency distribution; and the controller is further programmed to control the detection of the three-dimensional object by the three-dimensional object detection unit by setting one of the first threshold value and the second threshold value based on the first edge intensity in the first edge extraction area when an assessment has been made that currently daytime exists by the day/night assessment unit, and programmed to control the detection of the three-dimensional object by the three-dimensional object detection unit by setting one of the first threshold value and the second threshold value based on the second edge intensity in the second edge extraction area when an assessment has been made that currently nighttime exists.

3. The three-dimensional object detection device according to claim 1, further comprising an image conversion unit programmed to perform viewpoint conversion of the captured images obtained by the image capturing device into bird's-eye view images;

the three-dimensional object detection unit programmed to detect a presence of a three-dimensional object based on edge information by detecting components having a luminance difference between adjacent pixel areas of equal to or greater than a predetermined first threshold value from the bird's-eye view images obtained from the image conversion unit, and determine the three-dimensional object exists when a quantity of the edge information based on the edge components is equal to or greater than a predetermined second threshold value; and the controller is further programmed to control the detection of the three-dimensional object by the three-dimensional object detection unit by setting one of the first threshold value and the second threshold value based on the first edge intensity in the first edge extraction area when an assessment has been made that currently daytime exists by the day/night assessment unit and controls the detection of the three-dimensional object by the three-dimensional object detection unit by setting one of the first threshold value and the second threshold value based on the second edge intensity in the second edge extraction area when an assessment has been made that currently nighttime exists.

4. The three-dimensional object detection device according to claim 2, wherein the controller is further programmed to change one of the first threshold value and the second threshold value to a higher value as one of the first edge intensity and the second edge intensity increases and programmed to change one of the first threshold value and the second threshold value to a lower value one of as the first edge intensity and the second edge intensity decreases.

5. The three-dimensional object detection device according to claim 2, wherein the three-dimensional object detection unit is further programmed to detect the three-dimensional object in a left-side detection area and a right-side detection area that are set to the left and right rear of the host vehicle;

when changing the first threshold value based on one of the first edge intensity and the second edge intensity, the controller is further programmed to change the first threshold value so that a difference between the first threshold values in the left-side detection area and the right-side detection area when an assessment has been made that the currently daytime exists is equal to or less than a difference between the first threshold values in the left-side detection area and the right-side detection area when an assessment has been made that currently nighttime exists; and when changing the second threshold value based on one of the first edge intensity and the second edge intensity, the controller is further programmed to change the second threshold value so that a difference between the second threshold values in the left-side detection area and the right-side detection area when an assessment has been made that the currently daytime exists is equal to or less than a difference between the second threshold values in the left-side detection area and the right-side detection area when an assessment has been made that currently nighttime exists.

6. The three-dimensional object detection device according to claim 2, wherein the three-dimensional object detection unit programmed to detect the three-dimensional object in a left-side detection area and a right-side detection area that are set at the left and right rear of the host vehicle;

the second edge intensity calculation unit is further programmed to set a left-side road edge reference area and a right-side road edge reference area that reference the left and right road edges as the second edge extraction areas, programmed to calculate the second edge intensity in the left-side road edge reference area based on the intensity of the edges in the left-side road edge reference area, and programmed to calculate the second edge intensity in the right-side road edge reference area based on the intensity of the edges in the right-side road edge reference area; and the controller is further programmed to set the value of one of the first threshold value and the second threshold value in the left-side detection area based on the second edge intensity in the left-side road edge reference area, and programmed to set the value of one of the first threshold value and the second threshold value in the right-side detection area based on the second edge intensity in the right-side road edge reference area.

7. The three-dimensional object detection device according to claim 2, wherein
the controller is further programmed to prohibit a change in the value of the first threshold value or the second threshold value when the three-dimensional object is being detected by the three-dimensional object detection unit.

8. The three-dimensional object detection device according to claim 2, wherein
the controller being further programmed to increase the value of one of the first threshold value and the second threshold value when the luminance of the captured image is less than a predetermined value, as compared to when the luminance of the captured image is equal to or greater than the predetermined value.

9. The three-dimensional object detection device according to claim 1, wherein
the controller being further programmed to control the detection of the three-dimensional object by the three-dimensional object detection unit by conducting exposure control of the image capturing device based on the first edge intensity in the first edge extraction area when an assessment has been made that currently daytime exists by the day/night assessment unit and controls the detection of the three-dimensional object by the three-dimensional object detection unit by conducting exposure control of the image capturing device based on the second edge intensity in the second edge extraction area when an assessment has been made that currently nighttime exists.

10. The three-dimensional object detection device according to claim 9, wherein
an image conversion unit programmed to perform viewpoint conversion of the captured images obtained by the image capturing device into bird's-eye view images;
the three-dimensional object detection unit being programmed to detect a presence of a three-dimensional object based on differential waveform information when a peak value of the differential waveform information is equal to or greater than a predetermined second threshold value, and in which the differential waveform information is generated by aligning in bird's-eve view positions of the bird's-eye view images obtained at different times by the image conversion unit in bird's-eye view, and counting a number of pixels that indicate a predetermined difference in a differential image of the aligned bird's-eye view images to form a frequency distribution.

11. The three-dimensional object detection device according to claim 9, wherein
an image conversion unit programmed to perform viewpoint conversion of the captured images obtained by the image capturing device into bird's-eye view images;
the three-dimensional object detection unit programmed to detect a presence of a three-dimensional object based on edge information from the bird's-eye view images obtained by the image conversion unit.

12. The three-dimensional object detection device according to claim 9, wherein
the three-dimensional object detection unit is further programmed to detect the three-dimensional object in a left-side detection area and a right-side detection area that are set to the left and right rear of the host vehicle; and
the controller is further programmed to conduct exposure control of the image capturing device so that a difference in exposures between the left-side detection area and the right-side detection area when an assessment has been made that currently daytime exists becomes equal to or less than a difference in the exposures between the left-side detection area and the right-side detection area when an assessment has been made that currently nighttime exists.

13. The three-dimensional object detection device according to claim 9, wherein
the three-dimensional object detection unit is further programmed to detect the three-dimensional object in a left-side detection area and a right-side detection area that are set to the left and right rear of the host vehicle;
the second edge intensity calculation unit is further programmed to set a left-side road edge reference area and a right-side road edge reference area that reference the left and right road edges as the second edge extraction areas, programmed to calculate the second edge intensity in the left-side road edge reference area based on the intensity of the edges in the left-side road edge reference area, and programmed to calculate the second edge intensity in the right-side road edge reference area based on the intensity of the edges in the right-side road edge reference area; and
the controller is further programmed to set an exposure in the left-side detection area based on the second edge intensity in the left-side road edge reference area, and programmed to set an exposure in the right-side detection area based on the second edge intensity in the right-side road edge reference area.

14. The three-dimensional object detection device according to claim 9, wherein
the controller is further programmed to maintain an exposure of the image capturing device regardless of the first edge intensity or the second edge intensity when the three-dimensional object is being detected by the three-dimensional object detection unit.

15. The three-dimensional object detection device according to claim 9, wherein
the control controller being further programmed to decrease an exposure amount of the image capturing device when the luminance of the captured image is less than a predetermined value, as compared to when the luminance of the captured image is equal to or greater than the predetermined value.

16. The three-dimensional object detection device according to claim 9, wherein
the controller is further programmed to conduct exposure control of the image capturing device by changing one of an aperture value of the image capturing device to a value on an open side, a capturing sensitivity of the image capturing device to a higher value, and an exposure time of the image capturing device to a longer time as the value of one of the first edge intensity and the second edge intensity decreases.

17. The three-dimensional object detection device according to claim 1, wherein
the first edge intensity calculation unit is further programmed to set an area that references the horizon near the vanishing point as the horizon reference area.

18. The three-dimensional object detection device according to claim 1, wherein the first edge intensity calculation unit is further programmed to set, in addition to the horizon reference area, a road edge reference area that references the road edge as the first edge extraction area, and further programmed to calculate the intensity of the edges in the horizon reference area as the first edge intensity when the intensity of the edges in the horizon reference area is equal to or greater than a predetermined value, and further programmed to calculate the intensity of the edges in the area with the highest edge intensity, from among the horizon reference area and the road edge reference area, as the first edge intensity when the intensity of the edges in the horizon reference area is less than the predetermined value.

19. A three-dimensional object detection method comprising:
   converting viewpoints of captured images into bird's-eye view images;
   aligning positions of the bird's-eye view images that are obtained at different times in a bird's-eye view;
   generating differential waveform information by counting a number of pixels that indicate a predetermined difference that is equal to or greater than a predetermined first threshold value in a differential image of aligned bird's-eye view images to form a frequency distribution, and
   detecting a presence of a three-dimensional object based on the differential waveform information when a peak value of the differential waveform information is equal to or greater than a predetermined second threshold value;
   assessing whether currently present daytime or nighttime exists;
   extracting edges of a subject in a first edge extraction area, including at least a horizon reference area that references the horizon near a vanishing point of a road, when the assessment has been made that currently daytime exists, the horizontal reference area being area including the horizon as well as an area from which extraction of a predetermined quantity of edges is expected in an image area corresponding to the horizon;
   calculating an intensity of the edges in the first edge extraction area as a first edge intensity based on a distribution of the edges extracted from the first edge extraction area, when the assessment has been made that currently daytime exists;
   setting one of the first threshold value and the second threshold value based on the first edge intensity, when the assessment has been made that currently daytime exists;
   extracting edges of a subject in a second edge extraction area, including a road edge reference area that references the road edge, when an assessment has been made that currently nighttime exists;
   calculating an intensity of the edges in the second edge extraction area as a second edge intensity based on a distribution of the edges extracted from the second edge extraction area, when the assessment has been made that currently nighttime exists; and
   setting one of the first threshold value and the second threshold value based on the second edge intensity, when the assessment has been made that currently nighttime exists.

20. A three-dimensional object detection method comprising:
   converting viewpoints of captured images into bird's-eye view images;
   detecting a edge components having a luminance difference between adjacent pixel areas of equal to or greater than a predetermined first threshold value are detected from the bird's-eye view images;
   detecting a presence of a three-dimensional object based on the edge information when a quantity of the edge information based on edge components is equal to or greater than a predetermined second threshold value;
   assessing whether currently daytime or nighttime exists;
   extracting edges of a subject in a first edge extraction area, including at least a horizon reference area that references the horizon near a vanishing point of a road, when an assessment has been made that currently daytime exists, the horizontal reference area being area including the horizon as well as an area from which extraction of a predetermined quantity of edges is expected in an image area corresponding to the horizon;
   calculating an intensity of the edges in the first edge extraction area as a first edge intensity based on a distribution of the edges extracted from the first edge extraction area, when the assessment has been made that currently daytime exists; and
   setting one of the first threshold value and the second threshold value based on the first edge intensity, when the assessment has been made that currently daytime exists;
   extracting edges of a subject in a second edge extraction area, including a road edge reference area that references the road edge, when an assessment has been made that currently nighttime exists;
   calculating an intensity of the edges in the second edge extraction area as a second edge intensity based on a distribution of the edges extracted from the second edge extraction area, when the assessment has been made that currently nighttime exists; and
   setting one of the first threshold value and the second threshold value based on the second edge intensity, when the assessment has been made that currently nighttime exists.

21. A three-dimensional object detection method comprising:
   converting viewpoints of captured images from an image capturing device into bird's-eye view images;
   generating differential waveform information based on a difference between the bird's-eye view images obtained at different times, and
   detecting a presence of a three-dimensional object based on the differential waveform information;
   assessing whether currently daytime or nighttime exists;
   extracting edges of a subject in a first edge extraction area, including at least a horizon reference area that references the horizon near a vanishing point of a road, when the assessment has been made that currently daytime exists, the horizontal reference area being area including the horizon as well as an area from which extraction of a predetermined quantity of edges is expected in an image area corresponding to the horizon;
   calculating an intensity of the edges in the first edge extraction area as a first edge intensity based on a distribution of the edges extracted from the first edge extraction area, when the assessment has been made that currently daytime exists;

conducting exposure control of the image capturing device based on the first edge intensity, when the assessment has been made that currently daytime exists;

extracting edges of a subject in a second edge extraction area, including a road edge reference area that references the road edge, when an assessment has been made that currently nighttime exists;

calculating an intensity of the edges in the second edge extraction area as a second edge intensity based on a distribution of the edges extracted from the second edge extraction area, when an assessment has been made that currently nighttime exists; and conducting exposure control of the image capturing device based on the second edge intensity, when an assessment has been made that currently nighttime exists.

22. A three-dimensional object detection method in which converting viewpoints of captured images from an image capturing device into bird's-eye view images;

detecting edge information based on the bird's-eye view images;

detecting a presence of a three-dimensional object based on the edge information;

assessing whether currently daytime or nighttime exists;

extracting edges of a subject in a first edge extraction area, including at least a horizon reference area that references the horizon near a vanishing point of a road, when the assessment has been made that currently daytime exists, the horizontal reference area being area including the horizon as well as an area from which extraction of a predetermined quantity of edges is expected in an image area corresponding to the horizon;

calculating an intensity of the edges in the first edge extraction area as a first edge intensity based on a distribution of the edges extracted from the first edge extraction area, when the assessment has been made that currently daytime exists;

conducting exposure control of the image capturing device based on the first edge intensity, when the assessment has been made that currently daytime exists;

extracting edges of a subject in a second edge extraction area, including a road edge reference area that references the road edge, when an assessment has been made that currently nighttime exists;

calculating an intensity of the edges in the second edge extraction area as a second edge intensity based on a distribution of the edges extracted from the second edge extraction area, when an assessment has been made that currently nighttime exists; and conducting exposure control of the image capturing device based on the second edge intensity in the second edge extraction area, when an assessment has been made that currently nighttime exists.

* * * * *